United States Patent
Ohta

(10) Patent No.: US 9,772,694 B2
(45) Date of Patent: Sep. 26, 2017

(54) COORDINATE CALCULATION APPARATUS AND STORAGE MEDIUM HAVING COORDINATE CALCULATION PROGRAM STORED THEREIN

(71) Applicant: NINTENDO CO., LTD., Kyoto (JP)

(72) Inventor: Keizo Ohta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 662 days.

(21) Appl. No.: 14/170,943

(22) Filed: Feb. 3, 2014

(65) Prior Publication Data
US 2014/0145952 A1 May 29, 2014
US 2017/0003761 A9 Jan. 5, 2017

Related U.S. Application Data

(63) Continuation of application No. 12/713,622, filed on Feb. 26, 2010, now Pat. No. 8,704,759.

(30) Foreign Application Priority Data

Mar. 9, 2009 (JP) ................................. 2009-054954
Sep. 30, 2009 (JP) ................................. 2009-226048
Dec. 28, 2009 (JP) ................................. 2009-297473

(51) Int. Cl.
*G06F 3/0346* (2013.01)
*A63F 13/211* (2014.01)
(Continued)

(52) U.S. Cl.
CPC ............ *G06F 3/0346* (2013.01); *A63F 13/02* (2013.01); *A63F 13/04* (2013.01); *A63F 13/211* (2014.09);
(Continued)

(58) Field of Classification Search
CPC ..................................................... G06F 3/0346
(Continued)

(56) References Cited

U.S. PATENT DOCUMENTS 5,138,154 A 8/1992 Hotelling
5,181,181 A 1/1993 Glynn
(Continued)

FOREIGN PATENT DOCUMENTS

EP 1310770 5/2003
EP 1596272 11/2005
(Continued)

OTHER PUBLICATIONS

Office Action dated Jul. 3, 2014 in related U.S. Appl. No. 12/472,936 (22 pages).
(Continued)

*Primary Examiner* — Kent Chang
*Assistant Examiner* — Scott Au
(74) *Attorney, Agent, or Firm* — Nixon & Vanderhye PC

(57) ABSTRACT

A coordinate calculation apparatus calculates a coordinate point representing a position on a display screen based on an orientation of an input device. The coordinate calculation apparatus includes direction acquisition means, orientation calculation means, first coordinate calculation means, and correction means. The direction acquisition means acquires information representing a direction of the input device viewed from a predetermined position in a predetermined space. The orientation calculation means calculates the orientation of the input device in the predetermined space. The first coordinate calculation means calculates a first coordinate point for determining the position on the display screen based on the orientation of the input device. The correction means corrects the first coordinate point such that the first coordinate point calculated when the input device is
(Continued)

directed in a predetermined direction takes a predetermined reference value.

20 Claims, 30 Drawing Sheets

(51) Int. Cl.
  *A63F 13/5255* (2014.01)
  *A63F 13/428* (2014.01)
  *A63F 13/98* (2014.01)
  *A63F 13/219* (2014.01)
  *A63F 13/22* (2014.01)

(52) U.S. Cl.
  CPC ............ *A63F 13/219* (2014.09); *A63F 13/22* (2014.09); *A63F 13/428* (2014.09); *A63F 13/5255* (2014.09); *A63F 2300/105* (2013.01); *A63F 2300/1018* (2013.01); *A63F 2300/1031* (2013.01); *A63F 2300/1087* (2013.01); *A63F 2300/6045* (2013.01); *A63F 2300/6676* (2013.01)

(58) Field of Classification Search
  USPC .................................................. 345/157–167
  See application file for complete search history.

(56) References Cited

U.S. PATENT DOCUMENTS

| | | | |
|---|---|---|---|
| 5,440,326 | A | 8/1995 | Quinn |
| 5,598,187 | A | 1/1997 | Ide et al. |
| 5,698,784 | A | 12/1997 | Hotelling et al. |
| 5,825,350 | A | 10/1998 | Case, Jr. et al. |
| 5,898,421 | A | 4/1999 | Quinn |
| 6,636,826 | B1 | 10/2003 | Abe et al. |
| 7,138,979 | B2 | 11/2006 | Robin et al. |
| 7,216,055 | B1 | 5/2007 | Horton et al. |
| 7,405,725 | B2 | 7/2008 | Mohri et al. |
| 8,223,121 | B2 | 7/2012 | Shaw et al. |
| 8,277,316 | B2 | 10/2012 | Haigh-Hutchinson |
| 2001/0025289 | A1 | 9/2001 | Jenkins et al. |
| 2002/0188416 | A1 | 12/2002 | Zhou et al. |
| 2003/0115930 | A1 | 6/2003 | Kappi et al. |
| 2004/0095317 | A1 | 5/2004 | Zhang et al. |
| 2004/0140962 | A1 | 7/2004 | Wang et al. |
| 2005/0162382 | A1 | 7/2005 | Choi et al. |
| 2005/0174324 | A1 | 8/2005 | Liberty et al. |
| 2005/0243062 | A1 | 11/2005 | Liberty |
| 2005/0270494 | A1 | 12/2005 | Banning |
| 2006/0132431 | A1 | 6/2006 | Eliezer et al. |
| 2006/0152488 | A1 | 7/2006 | Salsman et al. |
| 2006/0258465 | A1 | 11/2006 | Lin et al. |
| 2006/0274032 | A1 | 12/2006 | Mao et al. |
| 2006/0287085 | A1 | 12/2006 | Mao et al. |
| 2007/0060228 | A1 | 3/2007 | Akasaka et al. |
| 2007/0176899 | A1 | 8/2007 | Yoo et al. |
| 2007/0225938 | A1* | 9/2007 | Ohta ............... G06F 3/0346 702/152 |
| 2007/0233424 | A1* | 10/2007 | Ohta ............... A63F 13/10 702/154 |
| 2007/0257885 | A1 | 11/2007 | Liberty |
| 2007/0259717 | A1 | 11/2007 | Mattice et al. |
| 2007/0265075 | A1 | 11/2007 | Zalewski |
| 2008/0042973 | A1 | 2/2008 | Zhao et al. |
| 2008/0068336 | A1 | 3/2008 | Choi et al. |
| 2008/0076566 | A1 | 3/2008 | Miyamoto |
| 2008/0105050 | A1 | 5/2008 | Kraetz |
| 2008/0125223 | A1 | 5/2008 | Ohta |
| 2008/0132334 | A1 | 6/2008 | Nonaka et al. |
| 2008/0174550 | A1 | 7/2008 | Laurila et al. |
| 2008/0190201 | A1 | 8/2008 | Makino |
| 2008/0204407 | A1 | 8/2008 | Ueno |
| 2008/0211768 | A1 | 9/2008 | Breen et al. |
| 2008/0278445 | A1 | 11/2008 | Sweetser et al. |
| 2008/0309615 | A1 | 12/2008 | Sato |
| 2009/0183193 | A1 | 7/2009 | Miller, IV |
| 2009/0322679 | A1 | 12/2009 | Sato et al. |
| 2009/0326850 | A1 | 12/2009 | Ohta |
| 2009/0326858 | A1 | 12/2009 | Ueda et al. |
| 2010/0097316 | A1 | 4/2010 | Shaw et al. |
| 2010/0225582 | A1* | 9/2010 | Ohta et al. .................... 345/158 |
| 2010/0225583 | A1 | 9/2010 | Ohta |
| 2011/0307213 | A1 | 12/2011 | Zhao et al. |
| 2013/0023341 | A1* | 1/2013 | Yamanouchi ................... 463/31 |

FOREIGN PATENT DOCUMENTS

| | | |
|---|---|---|
| EP | 1 762 287 | 3/2007 |
| EP | 1 839 714 | 10/2007 |
| EP | 1923108 | 5/2008 |
| EP | 1 927 383 | 6/2008 |
| EP | 1 933 226 | 6/2008 |
| EP | 1 961 465 | 8/2008 |
| JP | 5-46318 | 2/1993 |
| JP | 7-104923 | 4/1995 |
| JP | 9-106322 | 4/1997 |
| JP | 11-085387 | 3/1999 |
| JP | 2000-97637 | 4/2000 |
| JP | 2000-180171 | 6/2000 |
| JP | 2000-308756 | 11/2000 |
| JP | 2003-344018 | 12/2003 |
| JP | 2004-264892 | 9/2004 |
| JP | 2007-61489 | 3/2007 |
| JP | 2007-509448 | 4/2007 |
| JP | 2007-232662 | 9/2007 |
| JP | 2008-2992 | 1/2008 |
| JP | 2008-68060 | 3/2008 |
| JP | 2008-134883 | 6/2008 |
| JP | 2008-142511 | 6/2008 |
| JP | 4265814 | 2/2009 |
| JP | 2009-048658 | 3/2009 |
| WO | 92/06465 A1 | 4/1992 |
| WO | 2005-040991 | 5/2005 |
| WO | 2007/097324 | 8/2007 |
| WO | 2008/026357 | 3/2008 |
| WO | 2008/035531 A1 | 3/2008 |
| WO | 2009/072504 | 6/2009 |

OTHER PUBLICATIONS

European Patent Office, "Communication Pursuant to Article 94(3) EPC," issued in connection with European Patent Application No. 09 160 279.7, dated Dec. 21, 2015 (9 pages).
U.S. Appl. No. 14/170,943, filed Feb. 3, 2014, Coordinate Calculation Apparatus and Storage Medium Having Coordinate Calculation Program Stored Therein.
Office Action dated Dec. 4, 2014 in related U.S. Appl. No. 12/472,936 (6 pages).
Wikipedia "Circular Motion," Jun. 20, 2008, 4 pages, http://en.wikipedia.org/w/index.php?title=circular_motion&oldid=220559899.
Wikipedia "Rotation Matrix," Jun. 29, 2008, 16 pages, http://en.wikipedia.org/w/index.php?title=Rotation_Matrix&oldid=222541866#Infinitesimal_rotations.
Search Report in corresponding European Application No. 09160279.7 dated Apr. 3, 2013.
Search Report in corresponding European Application No. 09160277.1 dated Apr. 3, 2013.
Apr. 15, 2013 European Search Report for EP 09163725.6, 10 pages.
Jul. 11, 2013 Search Report for EP10154549.9, 7 pages.

* cited by examiner

| | INPUT DEVICE | SCREEN |
|---|---|---|
| REFERENCE ORIENTATION |  |  |
| RIGHTWARD |  |  |
| UPWARD |  |  |

** COORDINATE CALCULATION APPARATUS AND STORAGE MEDIUM HAVING COORDINATE CALCULATION PROGRAM STORED THEREIN

CROSS REFERENCE TO RELATED APPLICATION

This application is a continuation of U.S. application Ser. No. 12/713,622, filed Feb. 26, 2010, and claims priority to the disclosures of Japanese Patent Application Nos. 2009-54954, 2009-226048, and 2009-297473, filed Mar. 9, 2009, Sep. 30, 2009, and Dec. 28, 2009, respectively, all of which are incorporated herein by reference.

BACKGROUND

Field

Exemplary embodiments of the present invention relates to coordinate calculation apparatuses or storage media having a coordinate calculation program stored therein, and more particularly to a coordinate calculation apparatus for calculating a two-dimensional coordinate point or a storage medium having stored therein a coordinate calculation program for calculating a two-dimensional coordinate point.

Description of the Background Art

Until now, there have been devised game apparatuses using an orientation of an input device as an input. For example, Patent Document 1 (Japanese Laid-Open Patent Publication No. 2000-308756) discloses a game apparatus using an input device including an acceleration sensor and a gyroscope. This game apparatus controls a sword held by a game character in accordance with movement of the input device. Specifically, data representing an action of wielding the sword is generated based on an output from the acceleration sensor, and data representing an orientation of the sword is generated based on an output from the gyroscope.

In a conceivable example of using an orientation of the input device as an input, the position of a cursor displayed on the screen is calculated from the orientation. It is convenient for the user to specify positional coordinates on the screen by an orientation of the input device in such a manner. However, in Patent Document 1, orientation data is only used for an input by a broad action such as that for wielding the sword, and therefore an input requiring accuracy, such as a coordinate input, cannot be made using orientation data.

Here, a case is assumed where positional coordinates on the screen are calculated from an orientation of the input device. In this case, positional coordinates to be calculated preferably indicate a position (on the screen) at which the input device points. However, even when the orientation of the input device remains the same, if the position of the input device changes, the position at which the input device points changes as well. Accordingly, when positional coordinates are calculated only from an orientation of the input device, the position at which the input device points cannot be calculated, so that appropriate positional coordinates cannot be calculated. In the case where there is a deviation between calculated positional coordinates and a position at which the input device points, the user may perceive the operation to be unnatural and user-unfriendly. In this manner, appropriate positional coordinates might not be calculated by the method in which positional coordinates on the screen are calculated simply using an orientation of the input device.

SUMMARY

Therefore, an object of exemplary embodiments of the present invention is to provide a coordinate calculation apparatus capable of appropriately calculating a position on the screen using an orientation of an input device or a storage medium having stored therein a coordinate calculation program for appropriately calculating a position on the screen using an orientation of an input device.

Exemplary embodiments of the present invention have the following features (1) through (20) to attain the object mentioned above.

(1) Exemplary embodiments of the present invention are directed to a coordinate calculation apparatus for calculating a coordinate point representing a position on a display screen based on an orientation of an input device. The coordinate calculation apparatus includes direction acquisition means, orientation calculation means, first coordinate calculation means, and correction means. The direction acquisition means acquires information representing a direction of the input device viewed from a predetermined position in a predetermined space. The orientation calculation means calculates the orientation of the input device in the predetermined space. The first coordinate calculation means calculates a first coordinate point for determining the position on the display screen based on the orientation of the input device. The correction means corrects the first coordinate point such that the first coordinate point calculated when the input device is directed in a predetermined direction takes a predetermined reference value.

The "input device" mentioned above refers to an input device 8 including a controller 5 and a gyroscope unit 7 in an embodiment to be described later, but any input device may be employed so long as it can be held and moved by the user. For example, the input device may include only the controller 5.

The "coordinate calculation apparatus" refers to a game apparatus for performing a game process in the embodiment to be described later, but its concept encompasses any information processing apparatus for calculating a position on a display screen using an orientation of an input device as an input.

The "information representing a direction of the input device viewed from a predetermined position in a predetermined space" refers to information about a marker coordinate point in the embodiment to be described later, but any information can be employed so long as it allows calculation of a position on a display screen at which an input device points. Also, the "direction acquisition means" may acquire the information through reception from outside the coordinate calculation apparatus (or through reception from the input device) (as in steps S3 and S51 in the embodiment to be described later) or may acquire the information through calculation based on data received from outside the coordinate calculation apparatus.

The "orientation calculation means" may be any means for calculating an orientation of an input device regardless of its method for calculating the orientation. For example, in the embodiment to be described later, an orientation is calculated using outputs from a gyroscope, an acceleration sensor, and image pickup means, but the "orientation calculation means" may calculate the orientation only using the gyroscope or the acceleration sensor.

The "first coordinate point" may be any coordinate point that allows determination of a position on a display screen, and for example, the "first coordinate point" may be a coordinate point representing a position in a plane different from the display screen as in the embodiment to be described later or may be a coordinate point representing the very position on the display screen to be calculated. Specifically, in the embodiment to be described later, the "first coordinate calculation means" is a CPU 10 performing processes (steps S7 and S56) for calculating coordinate points in a virtual plane, but it may directly calculate a coordinate point on the display screen based on an orientation of an input device.

The "predetermined direction" refers to a direction in which the input device points at the center of the screen in the embodiment to be described later, but this is not restrictive, and for example, the "predetermined direction" may be a direction in which the input device points at a lower left portion of the screen. Also, the "predetermined reference value" refers to a value corresponding to a position on the screen to be calculated when the input device is oriented in the predetermined direction, and any concrete value can be employed. For example, in the embodiment to be described later, the "predetermined reference value" is a value (origin (0,0)) corresponding to a (center) position on the screen to be calculated when the input device is oriented in the predetermined direction (the direction in which to point at the center of the screen). Note that the process of the "correction means" corresponds to step S42 in the embodiment to be described later, but in the case where calculation and correction of the first coordinate point are performed in one calculation operation (equation (16) to be described later), the process executes such a calculation operation.

According to the above feature (1), the first coordinate point corresponding to the orientation of the input device directed in the predetermined direction takes the reference value, and the position on the screen determined by the first coordinate point is a position corresponding to the reference value. Specifically, according to the above feature (1), suitable setting of the reference value allows suitable setting of a position on the screen when the position at which the input device points is a specific position. For example, when the input device points at the center of the screen, a position on the screen calculated from the orientation of the input device can be set as the center position of the screen. Thus, according to the above feature (1), a deviation between the position at which the input device points and the position on the screen calculated from the orientation can be reduced, and the position on the screen can be appropriately calculated using the orientation of the input device. Also, the user can be prevented from perceiving the operation to be unnatural due to the deviation.

(2) The coordinate calculation apparatus may further include second coordinate calculation means for calculating a second coordinate point on the display screen based on the direction of the input device. In this case, the correction means corrects the first coordinate point such that the position on the display screen determined by the corrected first coordinate point matches a position represented by the second coordinate point calculated when the input device is directed in the predetermined direction.

The "second coordinate point" represents the position on the display screen, and in the embodiment to be described later, it is calculated based on a marker coordinate point (step S52), but it may be calculated based on the direction of the input device.

According to the above feature (2), in the state where the input device is directed in the predetermined direction, it is possible to match the position on the display screen determined by the corrected first coordinate point with the position represented by the second coordinate point. Accordingly, in the above state, the position on the screen calculated based on the orientation of the input device matches a position calculated based on the direction of the input device. Here, a position at which the input device points can be calculated as the position calculated based on the direction of the input device. Thus, by calculating the position based on the orientation of the input device so as to match the position at which the input device points, a deviation between the position based on the orientation of the input device and the position at which the input device points can be reduced, making it possible to appropriately calculate the position on the screen based on the orientation. Also, the coordinate calculation apparatus conceivably employs both the method in which a position is calculated based on the orientation of the input device and the method in which a position is calculated based on the direction of the input device. Even in such a case, according to the above feature (2), the same position can be calculated by both methods in the aforementioned state, and therefore it is possible to allow the user to perceive the operation to be less unnatural when switching between the two methods.

(3) The coordinate calculation apparatus may further include correction amount determination means for determining a correction amount in accordance with a difference between a position determined by the first coordinate point calculated when the input device is directed in the predetermined direction and a position represented by the second coordinate point calculated at the same time. In this case, the correction means corrects the first coordinate point in accordance with the correction amount.

The "correction amount" does not have to be calculated directly using the aforementioned difference so long as it is determined so as to correspond to that difference. For example, as in the case of an offset in the embodiment to be described later, the "correction amount" may be calculated based on the difference between the first coordinate point calculated when the input device is directed in the predetermined direction (when the input device points at the center of the screen) and the first coordinate point (the origin of the X'Y'-coordinate system) corresponding to the position (the center position of the screen) represented by the second coordinate point calculated at the same time.

According to the above feature (3), by calculating the correction amount in accordance with the aforementioned difference, it becomes possible to readily perform correction such that the position determined by the first coordinate point matches the position represented by the second coordinate point.

(4) The coordinate calculation apparatus may further include process execution means for performing predetermined information processing in which the position on the display screen is used as an input. In this case, the correction amount determination means determines the correction amount prior to the predetermined information processing in response to the input device being directed in the predetermined direction. The first coordinate calculation means calculates the first coordinate point while the predetermined information processing is being repeatedly performed. The correction means corrects the first coordinate point in accordance with the correction amount each time the first coordinate calculation means calculates the first coordinate point.

For example, the "predetermined information processing" may be a process for displaying a cursor or a game object in the position of a coordinate point on the screen or a process for moving an object in accordance with the positional relationship between the object and the coordinate point on the screen.

According to the above feature (4), the coordinate calculation apparatus determines the correction amount prior to the predetermined information processing. Then, when performing the predetermined information processing, the coordinate calculation apparatus corrects the first coordinate point in accordance with the predetermined correction amount. As a result, the predetermined information processing is performed using the position on the screen corrected to an appropriate value, and therefore operability in the predetermined information processing can be improved without the predetermined information processing result feeling unnatural to the user.

(5) The coordinate calculation apparatus may further include instruction image display means for displaying a predetermined instruction image in a position represented by the second coordinate point on the display screen. In this case, when the instruction image is placed within a predetermined range on the screen, the correction amount determination means determines the correction amount based on the first coordinate point calculated at the time of placement of the instruction image within the predetermined range and the second coordinate point corresponding to a predetermined position within the predetermined range.

In addition to a cursor in the embodiment to be described later, the "instruction image" may be an image displayed in the position of the second coordinate point, such as an image of a game character to be operated by the user.

According to the above feature (5), the correction amount is determined when the position of the instruction image (the position at which the input device points) falls within a predetermined range. Thus, according to the above feature (5), the correction amount can be determined, for example, while the user is performing an operation using the instruction image, and therefore the correction amount can be determined without the user performing any additional operation.

(6) The coordinate calculation apparatus may further include button image display means for displaying a button image within the predetermined range allowing the user to give a predetermined instruction. In this case, the correction amount determination means performs a process for determining the correction amount only when the button image is displayed.

The "predetermined instruction" is an instruction to adjust the cursor in the embodiment to be described later, but any instruction may be employed, including, for example, an instruction to start the predetermined information processing (e.g., a game process for inputting a position on the screen).

According to the above feature (6), the process for determining the correction amount is performed when the instruction image is placed within the area of the button image. As a result, the correction amount is determined when the user places the instruction image within the area of the button image in order to give an instruction using the button image. Accordingly, it is possible to cause the user to naturally perform an operation for determining the correction amount unconsciously.

(7) The first coordinate calculation means may calculate as the first coordinate point a coordinate value in accordance with the direction and the amount of change from a predetermined orientation to the orientation calculated by the orientation calculation means.

In the embodiment to be described later, the "predetermined orientation" is an orientation in which (the Z-axis of) the input device is directed horizontally, but any orientation may be employed.

According to the above feature (7), the position on the screen is moved by a distance corresponding to the amount of rotation from the predetermined orientation to a direction corresponding to a rotational direction of the input device. Accordingly, the user can readily control the position on the screen by changing the orientation of the input device.

(8) The first coordinate calculation means may calculate as the first coordinate point a coordinate point representing an intersectional position between a line extending from a predetermined reference point toward a direction of a vector indicating the orientation of the input device and a predetermined plane. In this case, the correction means corrects the first coordinate point by dislocating a coordinate system for the first coordinate point such that the first coordinate point calculated when the input device is directed in the predetermined direction takes the predetermined reference value. Also, the coordinate calculation apparatus further includes position calculation means for calculating a coordinate point representing the position on the display screen based on the first coordinate point corrected by the correction means.

The "predetermined reference point", the "vector indicating the orientation of the input device", and the "predetermined plane" are set within a virtual space for calculating the first coordinate point (FIG. 18). For example, the "predetermined reference point" represents the position of the input device, and the "predetermined plane" is set to correspond to the screen.

In the embodiment to be described later, the process performed by the "position calculation means" corresponds to a process for calculating the position on the screen from the first coordinate point representing a position in a plane within the virtual space (step S43).

According to the above feature (8), it is possible to readily calculate a coordinate point (first coordinate point) in the plane that changes in accordance with the orientation of the input device. Also, by changing (moving) the origin of the coordinate system, a given amount of correction can be readily achieved.

(9) The correction means may perform correction by dislocating the coordinate system for the first coordinate point within the predetermined plane.

According to the above feature (9), the correction calculation can be performed by simply adding (subtracting) a predetermined value to (from) the first coordinate point calculated by the first calculation means, which makes it possible to perform the correction process at high speed in a simplified manner.

(10) The correction means may perform correction by rotating the coordinate system for the first coordinate point about the predetermined reference point.

According to the above feature (10), the distance between the reference point and the plane for the coordinate system can be kept constant regardless of the correction amount (FIG. 26). Accordingly, the position on the screen can be calculated more accurately.

(11) The first coordinate calculation means may calculate a two-dimensional coordinate point as the first coordinate point. In this case, the correction means corrects the first coordinate point only for one component.

The "one component of the first coordinate point" is a component (Y'-component) corresponding to the vertical direction of the screen in the embodiment to be described later, but it may be a component corresponding to the horizontal direction of the screen.

According to the above feature (11), the position on the screen based on the orientation can be corrected only in one direction. Accordingly, for example, exemplary embodiments of the present invention are applicable to the case where correction is performed only in the vertical direction of the screen as in the embodiment to be described later.

(12) The input device may include image pickup means. In this case, the information representing the direction of the input device acquired by the direction acquisition means is information representing a position of a predetermined imaging target within an image taken by the image pickup means.

The "predetermined imaging target" is a marker portion 6 in the embodiment to be described later, but it may be any object that can be recognized in an image by the coordinate calculation apparatus. Also, the "position of a predetermined imaging target within an image taken by the image pickup means" is represented by a marker coordinate point in the embodiment to be described later.

According to the above feature (12), the direction of the input device can be readily identified by using an image taken by the image pickup means included in the input device.

(13) The input device may include an acceleration sensor and/or an angular rate sensor. In this case, the orientation calculation means calculates the orientation of the input device based on a detection result or results by the acceleration sensor and/or the angular rate sensor.

According to the above feature (13), the orientation of the input device can be readily calculated by using a detection result or results by the acceleration sensor and/or the angular rate sensor.

(14) The orientation calculation means may calculate the orientation of the input device based on an angular rate detected by the angular rate sensor, and may correct the orientation based on an acceleration rate detected by the acceleration sensor.

According to the above feature (14), the orientation of the input device based on the angular rate is corrected based on the acceleration rate, so that the orientation can be calculated more accurately.

(15) The input device may include image pickup means. In this case, the orientation calculation means calculates the orientation of the input device based on an angular rate detected by the angular rate sensor, and corrects the orientation at least for a rotation about a gravitational direction based on a position of a predetermined imaging target within an image taken by the image pickup means.

According to the above feature (15), the orientation of the input device based on the angular rate is corrected using information about the image taken by the image pickup means, so that the orientation can be calculated more accurately.

(16) Also, a coordinate calculation apparatus for calculating a coordinate point representing a position on a display screen based on an orientation of an input device may be configured as follows. Specifically, the coordinate calculation apparatus may include direction acquisition means, orientation calculation means, reference determination means, and first coordinate calculation means. The direction acquisition means acquires a direction of the input device viewed from a predetermined position in a predetermined space. The orientation calculation means calculates the orientation of the input device in the predetermined space. The reference determination means determines as a reference orientation the orientation of the input device when the input device is directed in a predetermined direction. The first coordinate calculation means calculates a first coordinate point for determining the position on the display screen such that a predetermined reference value is taken when the input device takes the reference orientation, the first coordinate point being calculated in accordance with the direction and the amount of change from the reference orientation to the orientation calculated by the orientation calculation means.

The process performed by the "reference determination means" corresponds to a process for determining (storing) an offset (step S57) in the embodiment to be described later, but the reference orientation itself may be stored.

In the embodiment to be described later, the process performed by the "first coordinate point calculation means" includes a process for calculating the first coordinate point (step S7) by a first method to be described later and a process for correcting the calculated first coordinate point (step S42). However, in another embodiment, the process performed by the "first coordinate point calculation means" does not necessarily include the process for calculating the first coordinate point by the first method as in the embodiment to be described later, and it may include a process for calculating the first coordinate point based on a difference between the reference orientation and the orientation calculated by the orientation calculation means.

According to the above feature (16), the reference orientation is determined when the input device is directed in the predetermined direction, and the first coordinate point is calculated such that the position on the screen that corresponds to the reference orientation takes a specific value. Accordingly, in the case where the input device takes the reference orientation by suitably setting the reference value, the position on the screen at which the input device points can match a calculated position (or a deviation therebetween can be reduced). Thus, as in the case of the above feature (1), the position on the screen can be appropriately calculated using the orientation of the input device. Also, it is possible to prevent the user from perceiving the operation to be unnatural due to the deviation.

(17) The coordinate calculation apparatus may further include second coordinate calculation means for calculating a second coordinate point on the display screen based on the direction of the input device. In this case, the reference determination means calculates the reference orientation such that a position on the display screen that corresponds to the reference value matches a position represented by the second coordinate point calculated when the input device is directed in the predetermined direction.

According to the above feature (17), as in the case of the above feature (2), in the state where the input device is directed in the predetermined direction, it is possible to match the position on the display screen determined by the first coordinate point with the position represented by the second coordinate point. Accordingly, as in the case of the above feature (2), the position on the screen can be appropriately calculated based on the orientation. Also, in the case where both the method in which a position is calculated based on the orientation of the input device and the method in which a position is calculated based on the direction of the input device are employed, it is possible to allow the user to perceive the operation to be less unnatural when switching between the two methods.

(18) The first coordinate point may be a coordinate point representing an intersectional position between a line extending from a predetermined reference point toward a direction of a vector indicating the orientation of the input device and a predetermined plane. In this case, the reference determination means sets a coordinate system within the predetermined plane such that the first coordinate point takes the reference value in the case of the reference orientation. The first coordinate calculation means calculates a first coordinate point represented by the coordinate system set by the reference determination means. Also, the coordinate calculation apparatus further includes position calculation means for calculating the position on the display screen based on the first coordinate point calculated by the first coordinate calculation means.

According to the above feature (18), as in the case of the above feature (8), it is possible to readily calculate a coordinate point (first coordinate point) in the plane that changes in accordance with the orientation of the input device.

(19) The reference determination means may set the predetermined plane within a plane set to be fixed with respect to the predetermined reference point.

According to the above feature (19), the coordinate system for the first coordinate point is set within a single plane regardless of the value taken by the reference orientation, and therefore the coordinate system can be readily set.

(20) The reference determination means may set the predetermined plane to be maintained at a constant distance from the predetermined reference point.

According to the above feature (20), the distance between the reference point and the plane for the coordinate system can be kept constant regardless of the value taken by the reference orientation, and therefore the position on the screen can be calculated more accurately.

Also, exemplary embodiments of the present invention may be embodied in the form of a storage medium having stored therein a coordinate calculation program for causing a computer of an information processing apparatus to function as the respective means described above.

According to exemplary embodiments of the present invention, when the input device is directed in a predetermined direction, a position on the screen based on the orientation of the input device can be appropriately calculated to match a position at which the input device points. As a result, a deviation between a position at which the input device points and a position on the screen calculated from the orientation can be reduced, thereby preventing the user from perceiving the operation to be unnatural due to the deviation.

These and other objects, features, aspects and advantages of exemplary embodiments of the present invention will become more apparent from the following detailed description of exemplary embodiments of the present invention when taken in conjunction with the accompanying drawings.

DESCRIPTION OF THE PREFERRED EMBODIMENTS

[Entire Structure of Game System]

Figure 1:
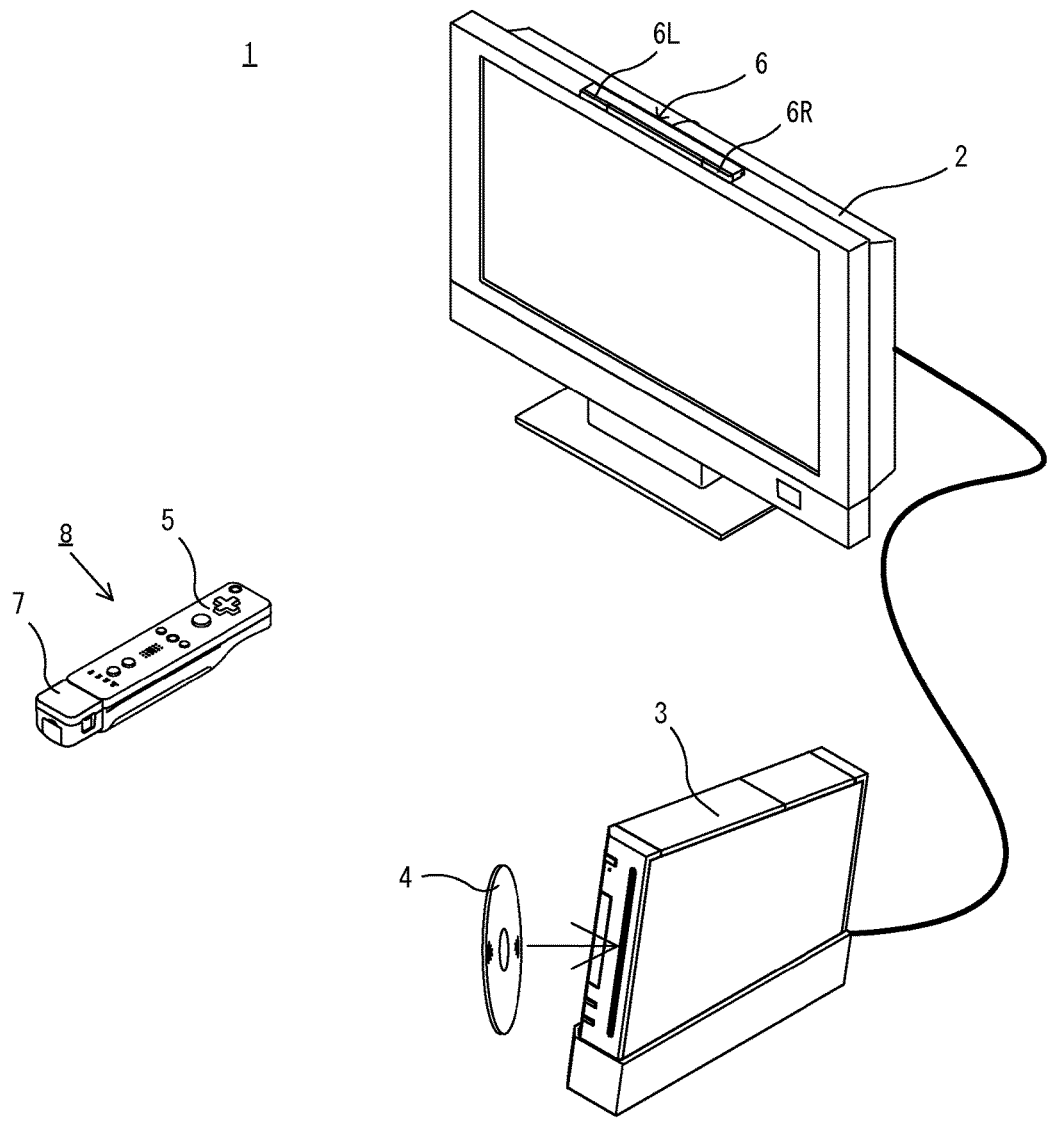
FIG. 1 is an external view of a game system.

With reference to FIG. 1, a game system 1 including a game apparatus typifying a coordinate calculation apparatus according to an embodiment of the present invention will be described. FIG. 1 is an external view of the game system 1. In the following description, a stationary game apparatus is taken as an example for describing a game apparatus and a game program of the present embodiment. As shown in FIG. 1, the game system 1 includes a television receiver (hereinafter, simply referred to as a "television") 2, a game apparatus 3, an optical disc 4, an input device 8, and a marker section 6. In this system, the game apparatus 3 performs a game process based on a game operation using the input device 8.

In the game apparatus 3, the optical disc 4 typifying an information storage medium used for the game apparatus 3 in a replaceable manner is detachably inserted. A game program executed by the game apparatus 3 is stored in the optical disc 4. The game apparatus 3 has, on the front surface thereof, an insertion opening for the optical disc 4. The game apparatus 3 reads and executes the game program stored in the optical disc 4 which is inserted through the insertion opening, so as to perform the game process.

The game apparatus 3 is connected to the television 2, which is an exemplary display device, through a connecting cord. A game image obtained as a result of the game process performed by the game apparatus 3 is displayed on the television 2. Further, the marker section 6 is provided on the periphery (in FIG. 1, on a portion above a screen) of a screen of the television 2. The marker section 6 includes two markers 6R and 6L on both ends thereof. Specifically, the marker 6R (as well as the marker 6L) includes one or more infrared LEDs, and emits an infrared light forward from the television 2. The marker section 6 is connected to the game apparatus 3, and the game apparatus 3 is able to control each infrared LED of the marker section 6 so as to light up each infrared LED.

The input device 8 provides the game apparatus 3 with operation data representing the content of an operation performed on the input device 8 itself. In the present embodiment, the input device 8 includes a controller 5 and a gyroscope unit 7. As described in detail below, the input device 8 is structured such that the gyroscope unit 7 is detachably connected to the controller 5. Radio communication is made between the controller 5 and the game apparatus 3. In the present embodiment, the radio communication between the controller 5 and the game apparatus 3 is made using, for example, the Bluetooth (Registered Trademark) technology. In another embodiment, the connection between the controller 5 and the game apparatus 3 may be a wired connection.

[Internal Structure of Game Apparatus 3]

Figure 2:
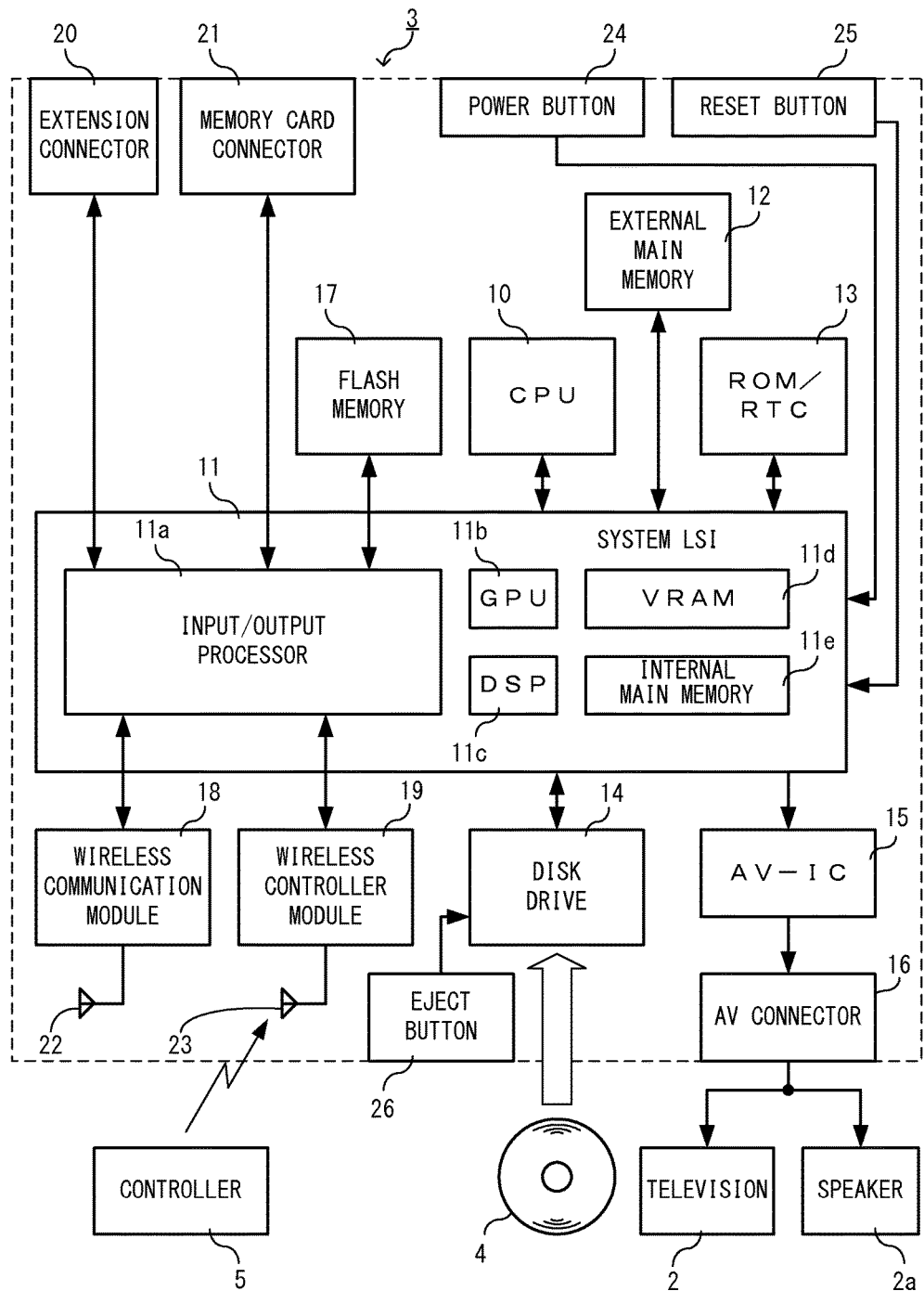
FIG. 2 is a functional block diagram of a game apparatus.

Next, an internal structure of the game apparatus 3 will be described with reference to FIG. 2. FIG. 2 is a block diagram illustrating a structure of the game apparatus 3. The game apparatus 3 includes a CPU 10, a system LSI 11, an external main memory 12, a ROM/RTC 13, a disk drive 14, an AV-IC 15, and the like.

The CPU 10, functioning as a game processor, performs game processes by executing the game program stored in the optical disc 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. The internal structure of the system LSI will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disk drive 14 reads program data, texture data, and the like from the optical disk 4, and writes the read data into an internal main memory 11e to be described below or the external main memory 12.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The GPU 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data using data stored in the VRAM 11d.

The DSP 11c, functioning as an audio processor, generates audio data using sound data and sound waveform (tone quality) data stored in the internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the components connected thereto, and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11a regularly accesses the flash memory 17, and detects the presence or absence of any data which needs to be transmitted to the network, and when detected, transmits the data to the network through the wireless communication module 18 and the antenna 22. Further, the input/output processor 11a receives data transmitted from another game apparatus, and/or downloads data from a download server, through the network, the antenna 22, and the wireless communication module 18, and the received data and/or the downloaded data are stored to the flash memory 17. The CPU 10 executes a game program so as to read data stored in the flash memory 17 and use the data on the game program. The flash memory 17 may store saved data (game result data or intermediate-stage data) of a game played using the game apparatus 3 in addition to data transmitted from the game apparatus 3 to another game apparatus or the various servers, and data received by the game apparatus 3 from another game apparatus or the various servers.

The input/output processor 11a receives operation data transmitted from the controller 5 through the antenna 23 and the wireless controller module 19, and (temporarily) stores the received operation data to a buffer area of the internal main memory 11e or the external main memory 12.

Further, the input/output processor 11a is connected to the extension connector 20 and the memory card connector 21. The extension connector 20 is a connector for an interface, such as USB or SCSI, and allows communication with the network by connecting thereto a medium such as an external storage medium, connecting thereto another peripheral device such as a controller, and/or connecting thereto a wired communication connector, without using the wireless communication module 18. The memory card connector 21 is a connector for connecting thereto an external storage medium such as a memory card. For example, the input/output processor 11a accesses an external storage medium through the extension connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots a boot program of the game apparatus 3. The eject button 26 is connected to the disk drive 14. When the eject button 26 is pressed, the optical disc 4 is ejected from the disk drive 14.

[Structure of Input Device 8]

Figure 3:
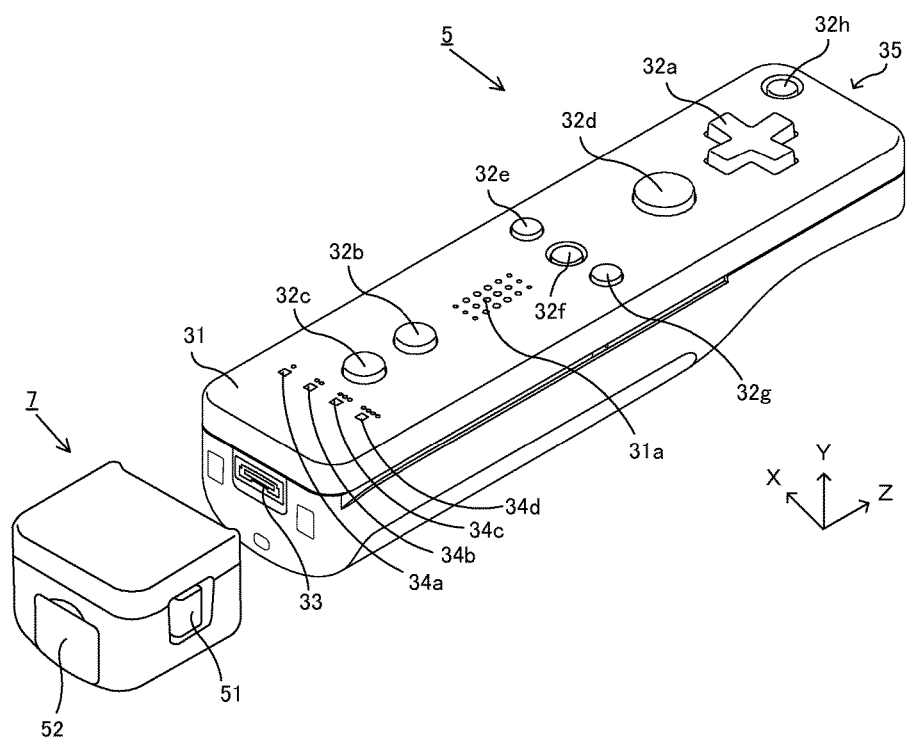
FIG. 3 is a perspective view illustrating an external structure of an input device.
Figure 4:
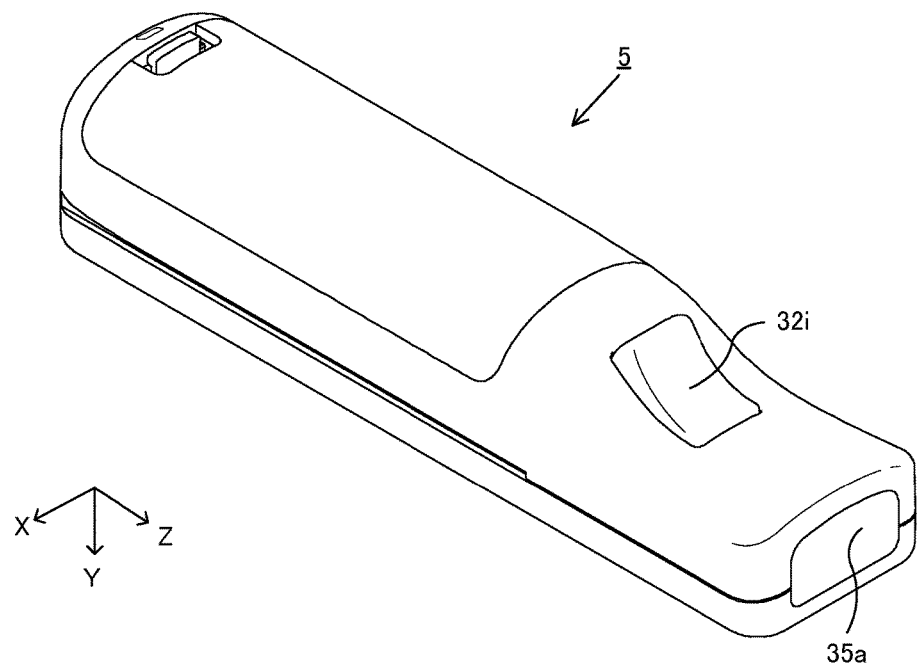
FIG. 4 is a perspective view illustrating an external structure of a controller.

Next, with reference to FIGS. 3 to 6, the input device 8 will be described. FIG. 3 is a perspective view illustrating an external structure of the input device 8. FIG. 4 is a perspective view illustrating an external structure of the controller 5. The perspective view of FIG. 3 shows the controller 5 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. A player can perform game operations by pressing buttons provided on the controller 5, and moving the controller 5 to change the position and the orientation thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In an exemplary embodiment of the present invention, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the player.

On the rear surface of the housing 31, the connector 33 is provided. The connector 33 is used for connecting the controller 5 to another device (for example, the gyroscope unit 7 or another controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing the player of the controller type which is currently being set for the controller 5 being used, and for informing the player of remaining battery power of the controller 5, for example. Specifically, when a game operation is performed using the controller 5, one of the plurality of LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted from the markers 6R and 6L.

On the top surface of the housing 31, sound holes 31a for externally outputting a sound from a speaker 49 (shown in FIG. 5) incorporated in the controller 5 is provided between the first button 32b and the home button 32f.

Figure 5:
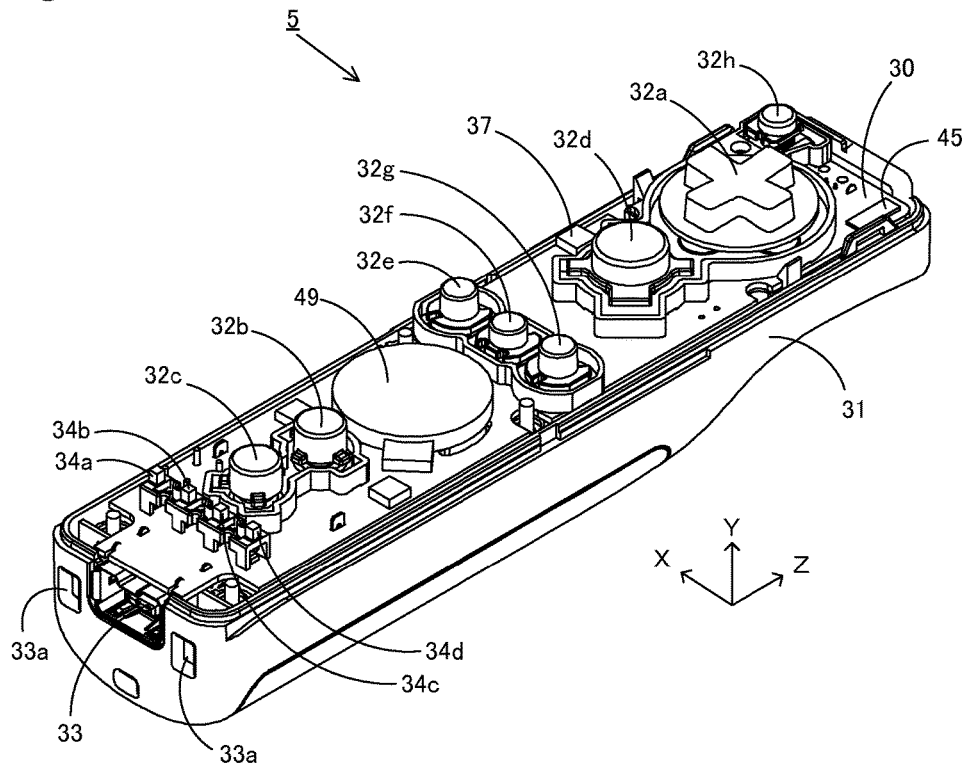
FIG. 5 is a diagram illustrating an internal structure of the controller.
Figure 6:
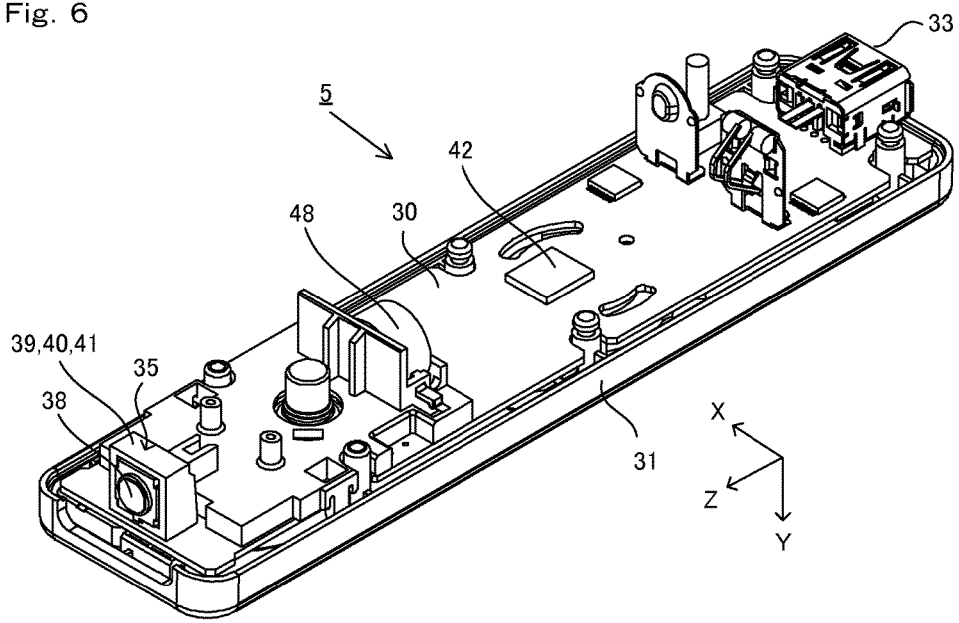
FIG. 6 is another diagram illustrating an internal structure of the controller.

Next, with reference to FIGS. 5 and 6, an internal structure of the controller 5 will be described. FIG. 5 and FIG. 6 are diagrams illustrating the internal structure of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated around the Z-axis may be facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by actuation of the vibrator 48 based on a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned offset from the center toward the end of the controller 5, and therefore the vibration of the vibrator 48 can lead to enhancement of the vibration of the entire controllers. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Further, the gyroscope unit 7 includes gyroscopes (gyroscopes 55 and 56 shown in FIG. 7) for detecting angular rates around three axes, respectively. The gyroscope unit 7 is detachably attached to the connector 33 of the controller 5. The gyroscope unit 7 has, at the front edge (an edge portion oriented to the Z-axis positive direction shown in FIG. 3), a plug (a plug 53 shown in FIG. 7) connectable to the connector 33. Further, the plug 53 has hooks (not shown) on both sides, respectively. In a state where the gyroscope unit 7 is attached to the controller 5, the plug 53 is connected to the connector 33, and the hooks engage with the fastening holes 33a, respectively, of the controller 5. Therefore, the controller 5 and the gyroscope unit 7 are securely fixed to each other. Further, the gyroscope unit 7 has a button 51 on each side surface (surfaces oriented to the X-axis direction shown in FIG. 3). When the button 51 is pressed, the hook is disengaged from the fastening hole 33a. Therefore, when the plug 53 is removed from the connector 33 while the button 51 is being pressed, the gyroscope unit 7 can be disconnected from the controller 5.

Further, a connector having the same shape as the connector 33 is provided at the rear edge of the gyroscope unit 7. Therefore, another device which can be attached to (the connector 33 of) the controller 5 can be attached as well to the connector of the gyroscope unit 7. In FIG. 3, a cover 52 is detachably provided over the connector.

FIGS. 3 to 6 show only examples of the shape of the controller 5 and the gyroscope unit 7, the shape of each operation button, the number and the positions of acceleration sensors and vibrators, and so on. The present invention can be realized with other shapes, numbers, and positions. Further, although in the present embodiment the imaging direction of the image pickup means is the Z-axis positive direction, the imaging direction may be any direction. That is, the imagining information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 7:
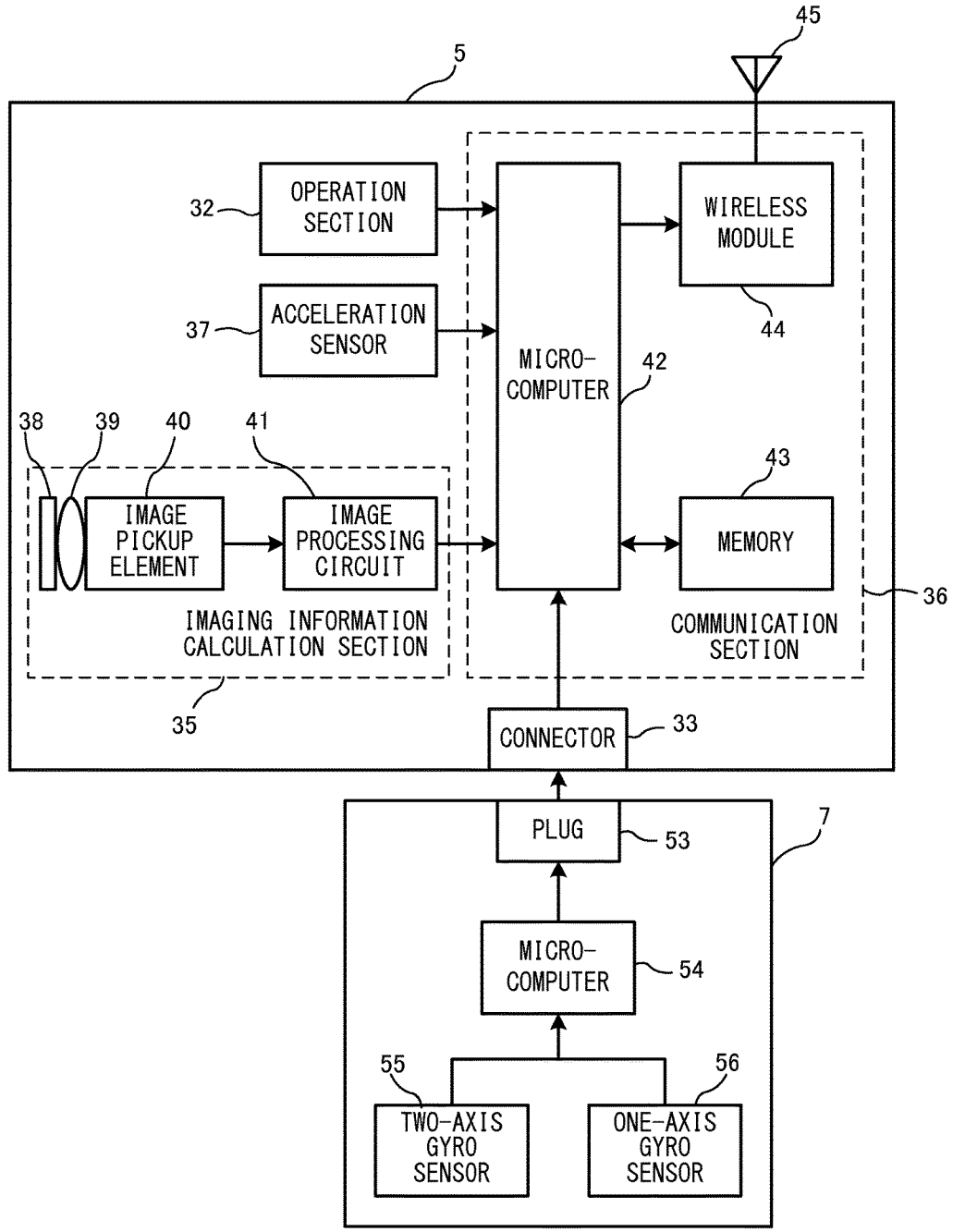
FIG. 7 is a block diagram illustrating a structure of the input device.

FIG. 7 is a block diagram illustrating a structure of the input device 8 (the controller 5 and the gyroscope unit 7). The controller 5 includes an operation section 32 (the operation buttons 32a to 32i), the connector 33, the imaging information calculation section 35, a communication section 36, and the acceleration sensor 37. The controller 5 transmits, as operation data, data representing the content of an operation performed on the controller 5 itself, to the game apparatus 3.

The operation section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40. The image pickup element 40 is a solid-state imaging device such as, for example, a CMOS sensor or a CCD sensor, which receives the infrared light collected by the lens 39, and outputs an image signal. The markers 6R and 6L of the marker section 6 provided near the display screen of the television 2 each include an infrared LED for outputting an infrared light forward from the television 2. Therefore, the infrared filter 38 enables the image pickup element 40 to receive only the infrared light transmitted through the infrared filter 38 and generate image data, so that an image of each of the markers 6R and 6L can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged (the marker 6R and the marker 6L). The image processing circuit 41 outputs data representing coordinate points of the calculated positions, to the microcomputer 42 of the communication section 36. The data representing the coordinate points is transmitted as operation data to the game apparatus 3 by the microcomputer 42. Hereinafter, the coordinate points are referred to as "marker coordinate points". The marker coordinate point changes depending on the orientation (angle of tilt) and/or the position of the controller 5 itself, and therefore the game apparatus 3 is allowed to calculate the orientation and the position of the controller 5 using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. For example, the three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects an acceleration in the straight line direction along each axis, and an output from the acceleration sensor 37 represents a value of the linear acceleration for each of the three axes. In other words, the detected acceleration is represented as a three-dimensional vector (ax,ay,az) in an XYZ-coordinate system (controller coordinate system) defined relative to the input device 8 (controller 5). Hereinafter, a vector representing components of the acceleration values detected for the three axes, respectively, by the acceleration sensor 37 is referred to as an acceleration vector.

Data (acceleration data) representing the acceleration detected by the acceleration sensor 37 is outputted to the communication section 36. The acceleration detected by the acceleration sensor 37 changes depending on the orientation (angle of tilt) and the movement of the controller 5, and therefore the game apparatus 3 is allowed to calculate the orientation and the movement of the controller 5 using the acquired acceleration data. In the present embodiment, the game apparatus 3 calculates, for example, the orientation and the angle of tilt of the controller 5 based on the acquired acceleration data.

When a computer such as a processor (for example, the CPU 10) of the game apparatus 3 or a processor (for example, the microcomputer 42) of the controller 5 processes an acceleration signal outputted from the acceleration sensor 37, additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the orientation of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another preferable parameter).

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyroscope unit 7 is inputted to the microcomputer 42 through the connector 33. Hereinafter, a structure of the gyroscope unit 7 will be described.

The gyroscope unit 7 includes the plug 53, a microcomputer 54, the two-axis gyroscope 55, and the one-axis gyroscope 56. As described above, the gyroscope unit 7 detects angular rates around three axes (X-, Y-, and Z-axes in the present embodiment), respectively, and transmits data (angular rate data) representing the detected angular rates, to the controller 5.

The two-axis gyroscope 55 detects an angular rate (per unit time) around each of the X-axis and the Z-axis. Further, the one-axis gyroscope 56 detects an angular rate (per unit time) around the Y-axis. In an exemplary embodiment of the present invention, the directions of rotation around the X-axis, the Y-axis, and the Z-axis relative to the imaging direction (the Z-axis positive direction) of the controller 5 are referred to as a pitch direction, a yaw direction, and a roll direction, respectively. That is, the two-axis gyroscope 55 detects angular rates in the pitch direction (the direction of rotation around the X-axis) and the roll direction (the direction of rotation around the Z-axis), and the one-axis gyroscope 56 detects an angular rate in the yaw direction (the direction of rotation around the Y-axis).

In the present embodiment, the two-axis gyroscope 55 and the one-axis gyroscope 56 are used to detect the angular rates around the three axes. However, in another embodiment, the number of gyroscopes and a combination thereof to be used may be optionally selected, provided that the angular rates around the three axes can be detected.

Further, in the present embodiment, the three axes around which the gyroscopes 55 and 56 detect the angular rates are set to correspond to three axes (X-, Y-, and Z-axes), respectively, for which the acceleration sensor 37 detects accelerations, such that calculation in the orientation calculation process described below is facilitated. However, in another embodiment, the three axes around which the gyroscopes 56 and 57 detect the angular rates may not necessarily correspond to the three axes for which the acceleration sensor 37 detects accelerations.

Data representing the angular rates detected by the gyroscopes 56 and 57 are outputted to the microcomputer 54. That is, data representing the angular rates around the three axes, i.e., the X-, Y-, and Z-axes, are inputted to the microcomputer 54. The microcomputer 54 transmits the data representing the angular rates around the three axes, as angular rate data, to the controller 5 through the plug 53. The transmission from the microcomputer 54 to the controller 5 is sequentially performed at a predetermined cycle, and the game is typically processed at a cycle of 1/60 seconds (corresponding to one frame time), and the transmission is preferably performed at a cycle shorter than a cycle of 1/60 seconds.

The controller 5 will be described again. Data outputted from the operation section 32, the imaging information calculation section 35, and the acceleration sensor 37 to the microcomputer 42, and data transmitted from the gyroscope unit 7 to the microcomputer 42 are temporarily stored to the memory 43. The data are transmitted as the operation data to the game apparatus 3. At the time of the transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process. The wireless transmission from the communication section 36 to the wireless controller module 19 is sequentially performed at a predetermined time interval. Since the game process is generally performed at a cycle of 1/60 sec. (corresponding to one frame time), data is preferably transmitted at a cycle of a shorter time period. The communication section 36 of the controller 5 outputs, to the wireless controller module 19 of the game apparatus 3, the respective operation data at intervals of 1/200 seconds, for example.

When the controller 5 is used, the player can perform not only a conventionally typical game operation of pressing the respective operation buttons, but also an operation of tilting the controller 5 at a desired angle of tilt. Other than these operations, the player can perform an operation of designating a desired position on a screen using the controller 5, or perform an operation of moving the controller 5 itself.

[Outline of Orientation Calculation Process]

Next, an orientation calculation process performed by the game apparatus 3 for calculating an orientation of the input device 8 will be outlined with reference to FIGS. 8 to 12. In the present embodiment, the game apparatus 3 acquires data (operation data) from the input device 8 including the gyroscopes 55 and 56, the acceleration sensor 37, and the image pickup means (the image pickup element 40), so as to calculate an orientation of the input device 8. In the present embodiment, the input device 8 includes both the acceleration sensor 37 and the image pickup element 40. However, in another embodiment, the input device 8 may include either the acceleration sensor 37 or the image pickup element 40.

The game apparatus 3 includes (1) orientation calculation means, (2) first correction means, and (3) second correction means. In the present embodiment, each of these means is realized by the game program (the coordinate calculation program) executed by the computer (the CPU 10) of the game apparatus 3, which causes the computer to function as such means. In another embodiment, some or all of the aforementioned means may be realized as dedicated circuits of the game apparatus 3.

(1) Orientation Calculation Means

The orientation calculation means calculates an orientation of the input device 8 based on angular rates detected by the gyroscopes 55 and 56 (step S4 described below). The orientation may be calculated based on the angular rates in any manner. For example, a manner in which each angular rate (per unit time) is sequentially added to the initial orientation may be used. Specifically, each angular rate which is sequentially outputted from the gyroscopes 55 and 56 is integrated so as to calculate, from the result of the integration, the amount of change in orientation from the initial state, so that the current orientation can be calculated. Hereinafter, the orientation of the input device 8 calculated by the orientation calculation means based on the angular rates is referred to as the "first orientation". Note that the orientation obtained by correcting the first orientation is also referred to as the first orientation.

Erroneous detection made by the gyroscopes 55 and 56 may cause error between the first orientation calculated based on the angular rates detected by the gyroscopes 55 and 56 and the actual orientation of the input device 8. In the present embodiment, the game apparatus 3 corrects the first orientation using an acceleration detected by the acceleration sensor 37. Further, the first orientation is corrected using an image (pickup image) taken by the image pickup element 40.

(2) First Correction Means

The first correction means corrects the first orientation based on the acceleration data detected by the acceleration sensor 37 (step S5 described below). In the present embodiment, the first correction means corrects the first orientation so as to approach a second orientation. Here, the second orientation represents an orientation determined based on the acceleration data, and specifically the second orientation represents an orientation of the input device 8 obtained based on the assumption that the direction of an acceleration represented by the acceleration data is the vertically downward direction. That is, the second orientation represents an orientation calculated based on the assumption that the acceleration represented by the acceleration data is the gravitational acceleration. Hereinafter, a correction process (first correction process) performed by the first correction means will be described with reference to FIGS. 8 to 10.

Figure 8A:
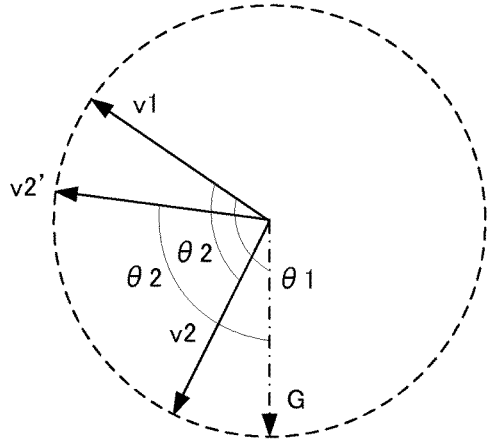
FIGS. 8A and 8B are diagrams illustrating vectors representing a first orientation and a second orientation.
Figure 8B:
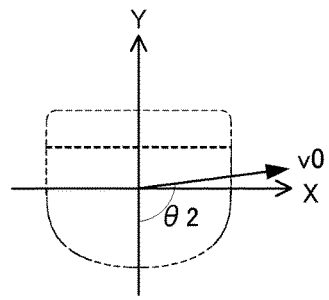

FIG. 8A and FIG. 8B are diagrams illustrating the correction of the first orientation performed using the second orientation. Although the orientation is actually processed in a three-dimensional space, a case where the orientation is processed in a two-dimensional plane will be described with reference to FIGS. 8 to 10 in the present embodiment for making the drawings easily understandable. A vector G shown in FIG. 8A represents the vertically downward direction defined in a spatial coordinate system having, as a reference point, a predetermined position in a space including the input device 8, that is, the vector represents the direction of gravity. Further, a vector v1 shown in FIG. 8A represents the direction, in the spatial coordinate system, of a vector representing the downward direction (that is, the Y-axis negative direction shown in FIGS. 3 to 5) of the input device 8 when the controller 5 is in the first orientation. When the input device 8 is in a reference orientation, the vector representing the orientation coincides with the vector G. Therefore, the vector v1 represents the first orientation in the spatial coordinate system. The first orientation may be also represented as a rotation of the vector v1 relative to the vector G, and is represented as an angle θ1 in the two-dimensional plane shown in FIG. 8A. The first orientation is calculated based on an angular rate, and therefore the vector v1 is calculated by rotating the immediately preceding orientation at the angular rate. The second orientation is calculated based on the acceleration data. A vector v2 shown in FIG. 8A represents the direction of acceleration represented by the acceleration data (the direction of an acceleration in a view coordinate system). The acceleration data represents an acceleration applied to the input device 8, and is obtained as a vector in a coordinate system defined for the input device 8. FIG. 8B shows a relationship between axes of the acceleration sensor and an acceleration vector. As shown in FIG. 8B, when θ2 represents an angle between an acceleration vector v0 obtained from the acceleration sensor and the Y-axis negative direction of the sensor, the vector v2 obtained by rotating the vector v1 by θ2 is an acceleration vector in the spatial coordinate system shown in FIG. 8A. The second orientation is "an orientation of the input device 8 obtained based on the assumption that the direction of an acceleration represented by the acceleration data is the vertically downward direction" as described above. Therefore, the rotation of angle θ2 from the vector v2 to the vector v1 represents the second orientation. When the second orientation is represented as a vector representing the downward direction of the input device 8 in the spatial coordinate system, as represented by the vector v1, the second orientation can be represented as a vector v2' obtained by rotating the vector G by θ2. Further, when the second orientation is represented as a three-dimensional orientation, the second orientation may be represented as a three-dimensional rotation matrix or the like. When the first orientation is accurately calculated based on the angular rate, and the acceleration data accurately represents the direction of gravity, the direction of the vector v2 representing the direction of acceleration coincides with the vertically downward direction in the spatial coordinate system, that is, the direction of gravity. In other words, when the first orientation is not accurately calculated based on the angular rate, and/or when the acceleration data does not accurately represent the direction of gravity, the vector v2 representing the direction of acceleration does not coincide with the vector G representing the direction of gravity as shown in FIG. 8A. For example, in static state where it is anticipated that the direction represented by the acceleration data coincides with the direction of gravity, the vector v2 may represent data corresponding to the orientation of the input device 8 more accurately than the vector v1. Further, even in the case where the input device is not static, acceleration vectors conceivably represent almost the direction of gravity on average, considering the accuracy of an average orientation within a certain period of time, and therefore the orientation based on the acceleration vector is more reliable than the orientation calculated based on the angular rate, which becomes more erroneous over time. On the other hand, when the orientation has been accurately calculated in the immediately preceding calculation, the orientation may be calculated more accurately by using the angular rate, rather than the acceleration, in the following calculation. Specifically, although error, for each calculation, in the orientation calculated based on the angular rate is smaller than that in the orientation calculated based on the acceleration, the error in orientation calculated based on the angular rate is increased over the passage of time. On the other hand, when the orientation is calculated based on the acceleration, error for each calculation may be larger in some cases but the orientation can be independently calculated in each calculation, and therefore error is not accumulated. Therefore, the first correction means makes correction considering both the first orientation and the second orientation.

Figure 9:
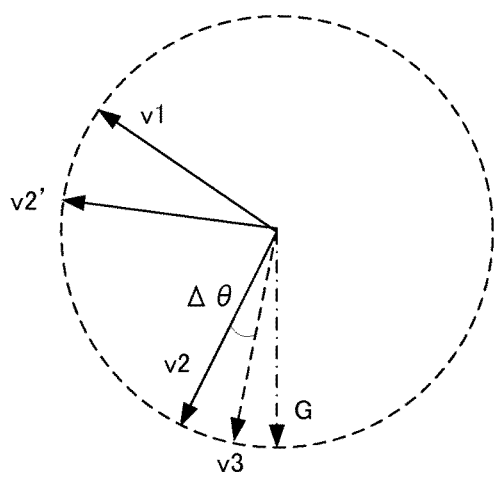
FIG. 9 is a diagram illustrating a vector v3 representing an amount of correction.

The first correction means corrects the first orientation so as to approach the second orientation. Specifically, the first correction means makes correction such that the angle θ1 approaches the angle θ2. This correction can be regarded as a correction in which the vector v1 approaches the vector v2'. However, in the case where the vector v2 has been obtained in the calculation process, even when the vector v2' is not calculated, the correction can be made. In the present embodiment, the correction is made using a vector v3 representing an amount of correction. FIG. 9 is a diagram illustrating the vector v3 representing an amount of correction. The vector v3 shown in FIG. 9 is a vector representing an amount of correction used for correcting the first orientation. Specifically, an angle Δθ between the vector v2 and the vector v3 represents the amount of correction. The vector v3 is set between the vector G and the vector v2 as described below in detail (see FIG. 9). The vector v1 approaches the vector v2' by rotating the vector v1 by Δθ.

Figure 10:
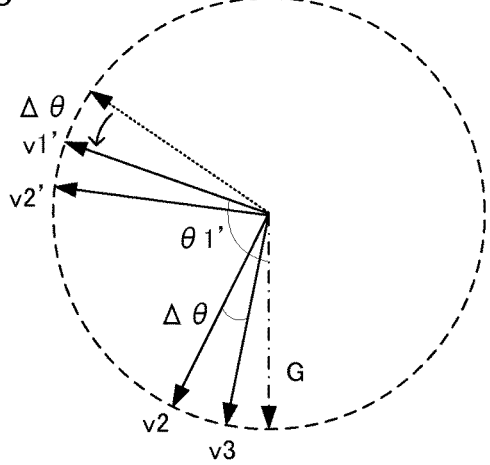
FIG. 10 is a diagram illustrating a vector representing the first orientation corrected in a first correction process.

The first correction process is performed by rotating the first orientation (the vector v1) by the amount of correction. FIG. 10 is a diagram illustrating a vector representing the first orientation corrected in the first correction process. As shown in FIG. 10, the corrected first orientation (the vector v1') is obtained by rotating the uncorrected first orientation (the vector v1) by the angle Δθ. Thus, the angle θ1' representing the corrected first orientation is between the angle θ1 and the angle θ2, and it is indicated that the correction in which the angle θ1 approaches the angle θ2 is made.

In the present embodiment, although the first correction means makes the correction in which the first orientation approaches the second orientation, the corrected first orientation does not coincide with the second orientation. The reason for this is to prevent the first orientation from being corrected so as to abruptly change even when the acceleration data is rapidly changed due to erroneous detection, vigorous operation, or the like. However, in another embodiment, the first correction means may make a correction in which the corrected first orientation coincides with the second orientation. Further, in the present embodiment, a rate at which the first correction means causes the first orientation to approach the second orientation is determined depending on the magnitude of an acceleration represented by the acceleration data (more specifically, the difference between the magnitude of the gravitational acceleration and the magnitude of the acceleration represented by the acceleration data), as described below in detail. However, in another embodiment, the rate may be a predetermined fixed value.

(3) Second Correction Means

The second correction means corrects the first orientation based on an image of a predetermined subject taken by the image pickup means (step S6 described below). In the present embodiment, the predetermined subject is the marker section 6 (the infrared LEDs thereof). In the present embodiment, the second correction means corrects the first orientation so as to approach a third orientation. The third orientation is an orientation calculated based on the image of the predetermined subject, and, specifically, the third orientation is an orientation of the input device 8, which is calculated based on a direction and/or a position of the predetermined subject in the image. Hereinafter, the correction process (the second correction process) made by the second correction means will be described with reference to FIG. 11 and FIG. 12.

Figure 11:
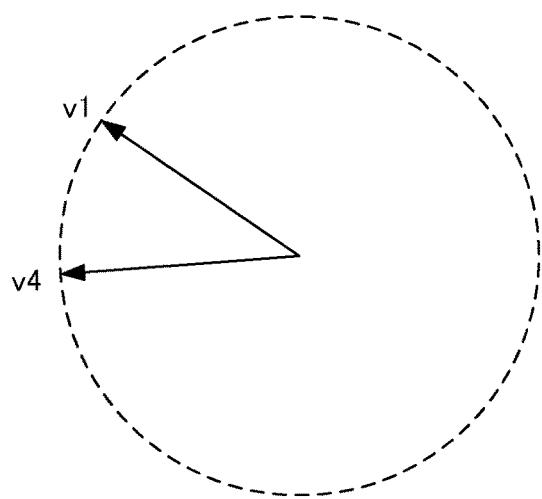
FIG. 11 is a diagram illustrating vectors representing the first orientation and a third orientation.

FIG. 11 is a diagram illustrating correction of the first orientation made by using the third orientation. Although the orientation is actually processed in the three-dimensional space, a case where the orientation is processed in the two-dimensional plane will be described in the present embodiment with reference to FIGS. 11 and 12 for making the drawings easily understandable. A vector v1 shown in FIG. 11 represents the first orientation in the spatial coordinate system. A vector v4 shown in FIG. 11 represents the third orientation in the spatial coordinate system. The position and the orientation of the marker section 6 are preset, and therefore the orientation of the input device 8 can be calculated relative to the orientation and the position of the marker in the image. Assuming that the third orientation is accurately obtained, when the first orientation is accurately calculated based on an angular rate, the vector v1 representing the first orientation coincides with the vector v4 representing the third orientation. That is, when the first orientation is not accurately calculated based on an angular rate, the vector v1 representing the first orientation does not coincide with the vector v4 representing the third orientation as shown in FIG. 11.

Figure 12:
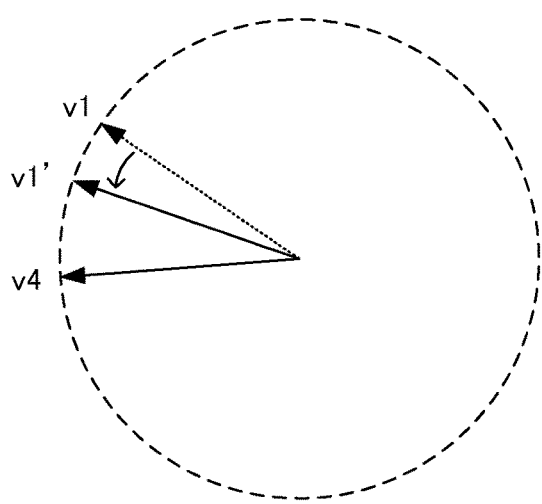
FIG. 12 is a diagram illustrating the first orientation corrected in a second correction process.

In the second correction process, the first orientation (the vector v1) approaches the third orientation (the vector v4) at a predetermined rate. FIG. 12 is a diagram illustrating the first orientation corrected in the second correction process. As shown in FIG. 12, the corrected first orientation (the vector v1') is obtained by the uncorrected first orientation (the vector v1) approaching the third orientation (the vector v4) at a predetermined rate.

In some cases, the image pickup means might fail to take an image of the marker section 6 depending on the orientation and/or the position of the input device 8, and, in such a case, the second correction means is not able to perform the second correction process. Assuming that the second correction means corrects the first orientation so as to coincide with the third orientation, when a state in which the second correction process is not allowed to be performed shifts to a state where the second correction process is allowed to be performed, the first orientation may be abruptly changed. When the first orientation is abruptly changed regardless of the player's intention as described above, the player may feel unnatural about operation (even if the orientation has been accurately corrected). In order to prevent the abrupt change, in the present embodiment, the first orientation is corrected so as to approach the third orientation at a predetermined rate. Thus, the abrupt change of the first orientation can be prevented, thereby preventing the player from feeling unnatural about operation. However, when, for example, it is anticipated that the input device 8 is used in an orientation in which the image pickup means is always allowed to take an image of the marker section 6, the second correction means may correct the first orientation so as to coincide with the third orientation in another embodiment.

Although in the present embodiment the game apparatus 3 performs both the first correction process and the second correction process, the game apparatus 3 may be configured to perform either the first correction process or the second correction process in another embodiment. Further, although in the present embodiment the game apparatus 3 firstly performs the first correction process, and subsequently performs the second correction process, the game apparatus 3 may firstly perform the second correction process, and subsequently perform the first correction process.

As described above, in the present embodiment, an orientation of the input device 8 which is calculated based on angular rates detected by the gyroscopes 55 and 56 is corrected using an acceleration detected by the acceleration sensor 37, and is further corrected using the pickup image taken by the image pickup means. Thus, error in an orientation calculated by the gyroscope can be reduced, and the orientation of the input device 8 can be calculated with enhanced accuracy.

A rotation (rotation in the yaw direction) around the direction of gravity cannot be detected based on a detection result from the acceleration sensor 37, and therefore the first correction means is not able to make any correction associated with the yaw direction. However, the correction based on the detection result from the acceleration sensor 37 is advantageous in that the correction can be made in any orientation of the input device 8 (because the acceleration can be always detected). On the other hand, when the marker section 6 is not positioned in the direction in which the input device 8 is allowed to take an image, the marker coordinate point is not detected, and therefore the second correction means might not be able to make the correction depending on the orientation of the input device 8. However, the correction using the pickup image is advantageous in that the accurate calculation of the orientation (particularly, the orientation associated with the roll direction) can be made. In the present embodiment, two types of corrections having the advantages different from each other enable an orientation of the input device 8 to be calculated with enhanced accuracy.

[Details of the Process Performed by Game Apparatus 3]

Figure 13:
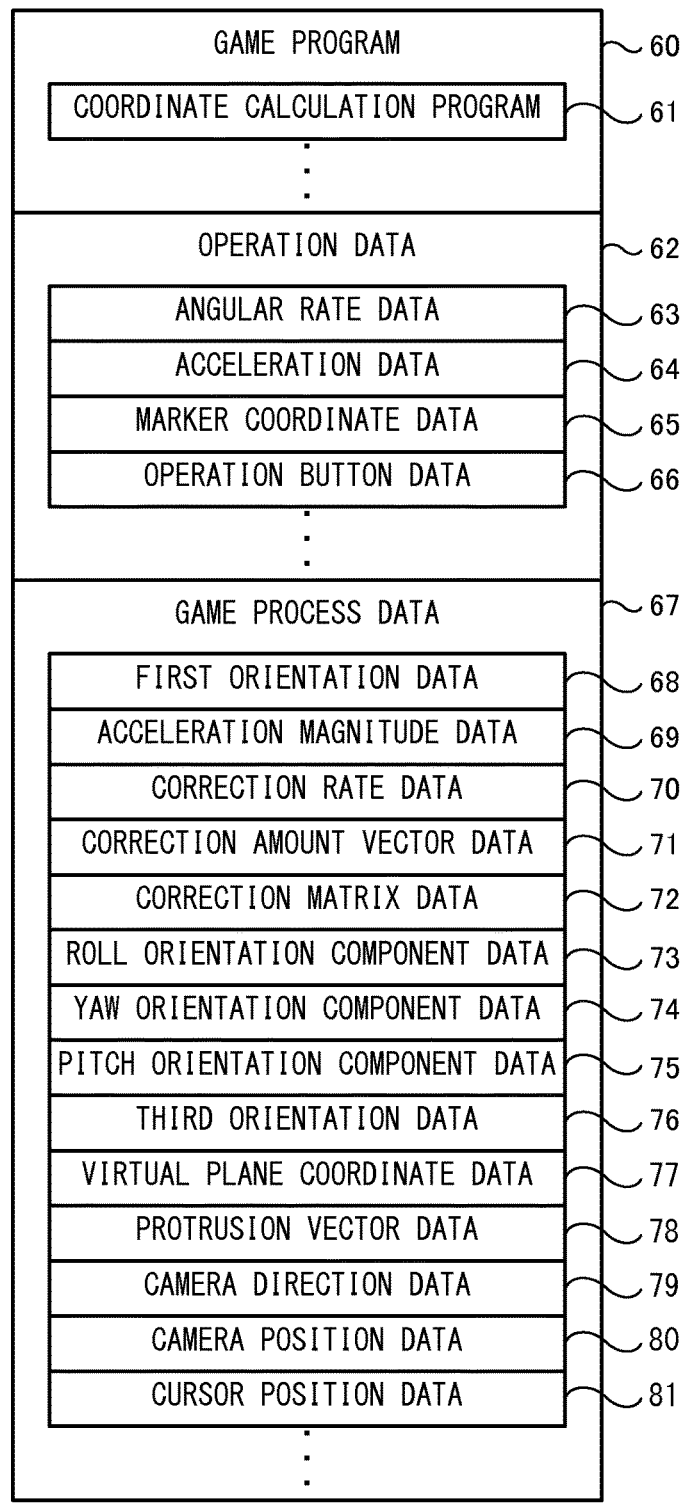
FIG. 13 is a diagram illustrating main data to be stored to a main memory of the game apparatus.

Next, the process performed by the game apparatus 3 will be described in detail. Firstly, main data used in the process performed by the game apparatus 3 will be described with reference to FIG. 13. FIG. 13 is a diagram illustrating main data to be stored in the main memory (the external main memory 12 or the internal main memory 11e) of the game apparatus 3. As shown in FIG. 13, a game program 60, operation data 62, and game process data 67 are stored in the main memory of the game apparatus 3. In addition to the data shown in FIG. 13, data necessary for the game process, such as image data of various objects appearing in a game, data representing various parameters of the objects, and the like, are stored in the main memory.

Part or all of the game program 60 is read from the optical disc 4 and stored to the main memory at an appropriate time after the game apparatus 3 is powered on. The game program 60 includes a coordinate calculation program 61. The coordinate calculation program 61 is a program for performing the process for calculating an orientation of the input device 8, and also calculating a two-dimensional coordinate point on the screen of the television 2) based on the calculated orientation.

The operation data 62 is operation data transmitted from the controller 5 to the game apparatus 3. As described above, the operation data is transmitted from the controller 5 to the game apparatus 3 at intervals of 1/200 seconds, and the operation data 62 stored in the main memory is updated at the same intervals. In the present embodiment, only the latest operation data (having been most recently obtained) may be stored in the main memory.

The operation data 62 includes angular rate data 63, acceleration data 64, marker coordinate data 65, and operation button data 66. The angular rate data 63 is data representing angular rates detected by the gyroscopes 55 and 56 of the gyroscope unit 7. The angular rate data 63 represents the angular rates around three axes, that is, the X-axis, the Y-axis, and the Z-axis shown in FIG. 3. Further, the acceleration data 64 is data representing an acceleration (acceleration vector) detected by the acceleration sensor 37. The acceleration data 64 represents a three-dimensional acceleration vector Va1 whose components are accelerations associated with the directions of three axes, that is, the X-axis, the Y-axis, and the Z-axis shown in FIG. 3. Further, in the present embodiment, a magnitude of the acceleration vector Va1 which is detected by the acceleration sensor 37 when the controller 5 is in static state is "1". That is, the magnitude of the gravitational acceleration detected by the acceleration sensor 37 is "1".

The marker coordinate data 65 represents a coordinate point calculated by the image processing circuit 41 of the imaging information calculation section 35, that is, the data represents the marker coordinate point. The marker coordinate point is expressed by a two-dimensional coordinate system (x'y'-coordinate system shown in FIG. 17) for representing, in the plane, a position corresponding to the pickup image. When images of two markers 6R and 6L are taken by the image pickup element 40, two marker coordinate points are calculated. On the other hand, when one of the marker 6R or the marker 6L is not positioned within a range in which the image pickup element 40 is allowed to take an image, the image pickup element 40 only takes an image of one marker, and only one marker coordinate point is calculated. Further, when neither the marker 6R nor the marker 6L is positioned within the range in which the image pickup element 40 is allowed to take an image, the image pickup element 40 does not take any image of the markers, so that no marker coordinate point is calculated. Therefore, the marker coordinate data 65 may represent two marker coordinate points, one marker coordinate point, or no marker coordinate point.

The operation button data 66 is data representing an input state of each of the operation buttons 32a to 32i.

The game process data 67 is data used for a game process (FIG. 14) described below. The game process data 67 includes first orientation data 68, acceleration magnitude data 69, correction rate data 70, correction amount vector data 71, correction matrix data 72, roll orientation component data 73, yaw orientation component data 74, pitch orientation component data 75, third orientation data 76, virtual plane coordinate data 77, protrusion vector data 78, camera direction data 79, camera position data 80, and cursor position data 81. The game process data 67 includes various data (e.g., data representing a game parameter) used for the game process, in addition to the data shown in FIG. 13.

The first orientation data 68 is data representing the first orientation calculated using the angular rate data 63. In the present embodiment, the first orientation is represented as 3×3 matrix M1 shown in equation (1) as follows.

$$M1 = \begin{bmatrix} Xx & Yx & Zx \\ Xy & Yy & Zy \\ Xz & Yz & Zz \end{bmatrix} \quad (1)$$

The matrix M1 is a rotation matrix representing a rotation from a predetermined reference orientation to the current orientation of the input device 8. Hereinafter, the matrix M1 representing the first orientation is referred to as the "first orientation matrix M1". The first orientation represented by the first orientation matrix M1 is an orientation in an xyz-coordinate system (the spatial coordinate system described above) having, as a reference point, a predetermined position in a space including the input device 8. In the xyz-coordinate system, under the assumption that the input device 8 is positioned in front of the marker section 6, the direction from the input device 8 toward the marker section 6 is defined as the z-axis positive direction, the vertically upward direction (the direction opposite to the direction of gravity) is defined as the y-axis positive direction, and the direction to the left of the input device 8 facing the marker section 6 is defined as the x-axis positive direction. The predetermined reference orientation is an orientation in which the imaging direction of the input device 8 positioned in front of the marker section 6 faces the center of the marker section 6, and the button surface of the controller 5 faces vertically upward (that is, the predetermined reference orientation is an orientation in which the X-axis, the Y-axis, and the Z-axis based on the input device 8 correspond to the x-axis, the y-axis, and the z-axis, respectively). Although in the present embodiment the first orientation is represented using the matrix, the first orientation may be presented using a third-order vector or three angles in another embodiment.

The acceleration magnitude data 69 is data representing a magnitude (length) L of the acceleration vector Va1 represented by the acceleration data 64.

The correction rate data 70 is data representing a rate (correction rate A) at which the first orientation is corrected using the second orientation. The correction rate A represents a value in the range of 0≤A≤C1 (C1 is a predetermined constant in the range of 0≤C1≤1). As described below in detail, the greater the correction rate A is, the closer the corrected first orientation is to the second orientation.

The correction amount vector data 71 is data representing a vector (vector v3 shown in FIG. 9; hereinafter referred to as a correction amount vector) indicating an amount of correction for correcting the first orientation. The correction amount vector Vg is calculated based on the correction rate A and the vector Va2, which corresponds to the acceleration vector Va1 converted to the xyz-coordinate system.

The correction matrix data 72 is data representing a rotation matrix (referred to as a correction matrix) Ma used for correcting the first orientation. That is, in the first correction process, the first orientation is corrected by multiplying, by the correction matrix Ma, the first orientation matrix M1 representing the first orientation. The correction matrix Ma is calculated based on the vector Va2 and the correction amount vector Vg.

The roll orientation component data 73 is data representing an orientation component (roll orientation component) M3r associated with the roll direction, among all orientation components included in the third orientation calculated based on an image taken of a subject. Further, the yaw orientation component data 74 is data representing an orientation component (yaw orientation component) M3y associated with the yaw direction, among the orientation components included in the third orientation, and the pitch orientation component data 75 is data representing an orientation component (pitch orientation component) M3p associated with the pitch direction, among the orientation components included in the third orientation. The roll direction, the yaw direction, and the pitch direction described above are rotation directions relative to the imaging direction (Z-axis positive direction) of the input device 8. In the present embodiment, the orientation components M3r, M3y, and M3p are each represented as a 3×3 matrix, as with the first orientation.

The third orientation data 76 is data representing the third orientation calculated from an image taken of a subject. In the present embodiment, the third orientation is represented as a 3×3 matrix M3, as with the first orientation. Hereinafter, the matrix M3 representing the third orientation is referred to as the "third orientation matrix M3". In the present embodiment, the marker coordinate data is transmitted as the operation data from the input device 8, and the third orientation matrix M3 is calculated based on the marker coordinate data 65. Specifically, the third orientation matrix M3 is obtained by combining the orientation components M3r, M3y, and M3p.

The virtual plane coordinate data 77 is data representing a two-dimensional coordinate point (referred to as a "virtual plane coordinate point") which indicates a position in a given plane (the plane Q shown in FIG. 18) within a given virtual space. The virtual plane coordinate point is calculated based on the orientation of the input device 8. In the present embodiment, the virtual plane coordinate point is used for a game process, and a display range in a display target (such as a game map or a Web page), which should be displayed on the screen of the television 2, is determined based on the virtual plane coordinate point.

Figure 23:
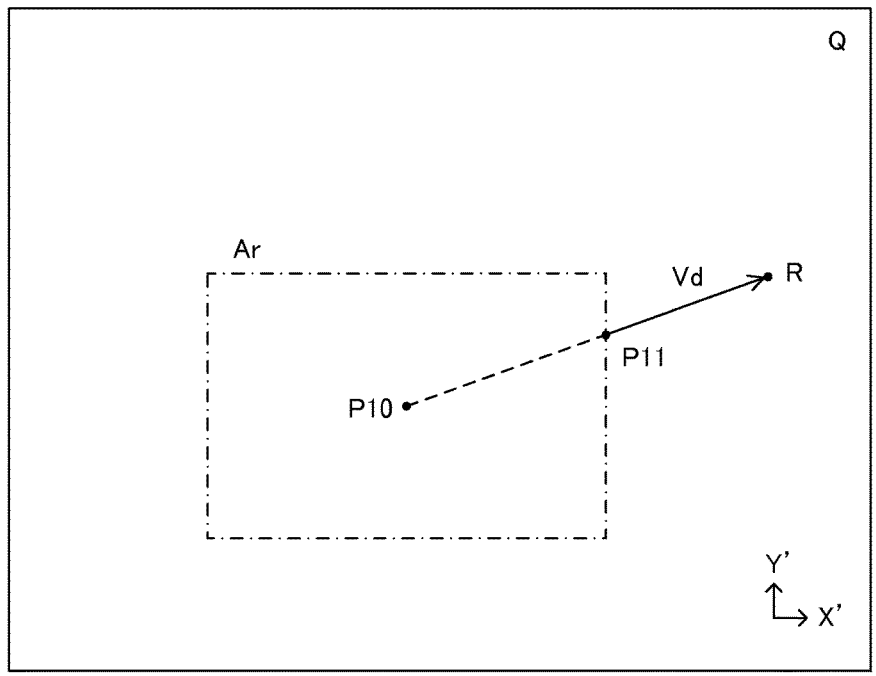
FIG. 23 is a diagram illustrating a plane Q arranged within a first virtual space.

The protrusion vector data 78 is data representing a vector (referred to as a "protrusion vector") which indicates the direction and the amount of protrusion of the virtual plane coordinate point from a given area (area Ar shown in FIG. 23) in the plane Q (see FIG. 23). In the present embodiment, the display range to be displayed on the screen is determined based on the protrusion vector.

The camera direction data 79 is data indicating the direction (orientation) of the virtual camera. Also, the camera position data 80 is data indicating the position of the virtual camera in the virtual space. Here, in the present embodiment, the display target and the virtual camera are set in a virtual space (different from the virtual space in which the plane Q is arranged), and an image is generated using that virtual camera. Therefore, the display range to be displayed on the screen of the television 2 is determined by the position and the direction of the virtual camera. Note that in the present embodiment, the direction (orientation) of the virtual camera is expressed by a 3×3 rotation matrix, as in the case of the first orientation of the input device 8. However, in another embodiment, the orientation of the virtual camera may be expressed by a three-dimensional vector or three angles.

The cursor position data 81 is data indicating the position of a cursor on the screen of the television 2. In the present embodiment, a coordinate point (screen coordinate point) representing a position on the screen is calculated based on the virtual plane coordinate point, and the cursor is displayed in that position. That is, the cursor position data 81 indicates the screen coordinate point calculated based on the virtual plane coordinate point.

Figure 14:
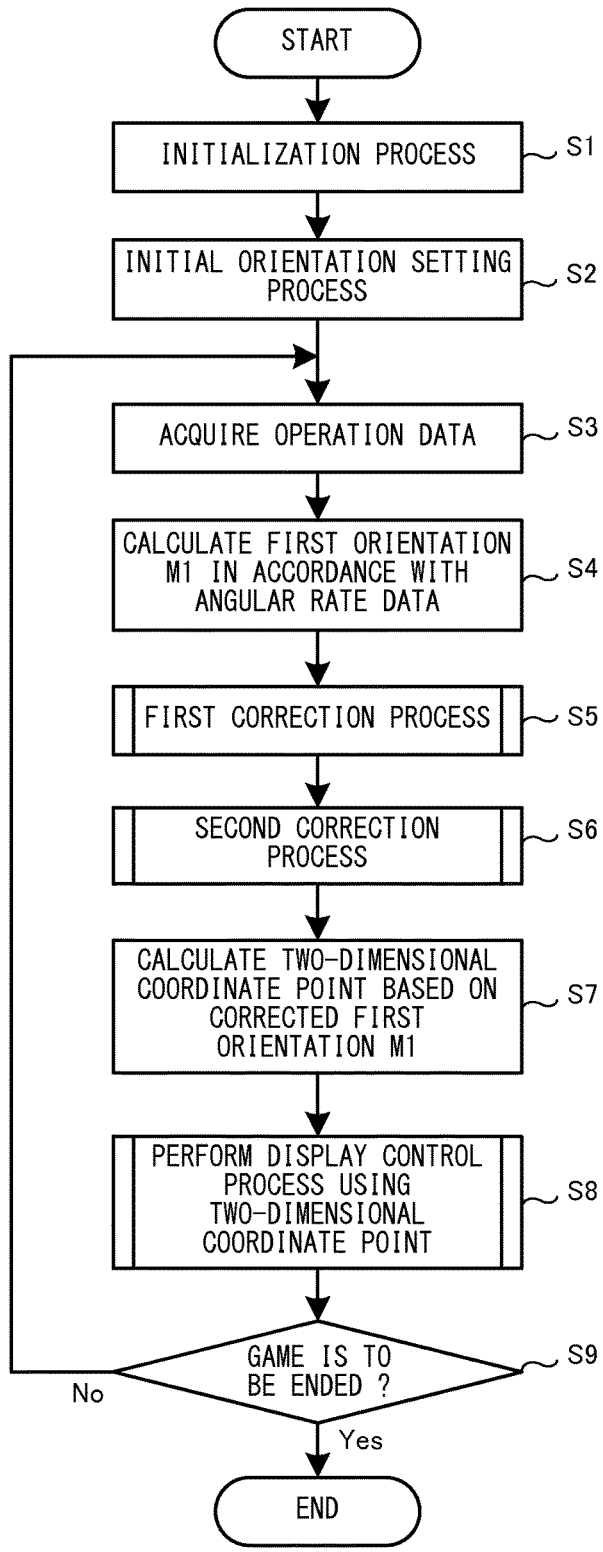
FIG. 14 is a main flow chart showing a flow of a process performed by the game apparatus.

Next, the process performed by the game apparatus 3 will be described in detail with reference to FIG. 14 to FIG. 17. FIG. 14 is a main flow chart showing a flow of the process performed by the game apparatus 3. When the game apparatus 3 is powered on, the CPU 10 of the game apparatus 3 executes a boot program stored in a boot ROM not shown, so as to initialize each unit, including the main memory. The game program stored in the optical disc 4 is loaded to the main memory, and the CPU 10 starts executing the game program. The flow chart of FIG. 14 illustrates a process performed when the processes described above are completed.

Firstly, in step S1, the CPU 10 executes an initialization process for the game. In the initialization process, values of various parameters used for the game process are initialized, a virtual game space is constructed, and a player object and other objects are arranged at initial positions in the game space. Following step S1, the process of step S2 is performed.

In step S2, the CPU 10 performs an initial orientation setting process. Specifically, a predetermined value is set for an initial orientation of the input device 8 taken as the first orientation, in accordance with a predetermined operation performed by the player (for example, an operation of pressing the A button 32d). The reference orientation is an orientation in which the Z-axis is parallel to the vertical direction, and the imaging direction of the input device 8 is toward the center (the middle point between the markers 6R and 6L) of the marker section 6, and therefore it is preferable that the player performs the predetermined operation while holding the input device 8 such that the initial orientation is the reference orientation. However, when the input device is almost in static state, and an image of the marker section can be taken, the initial orientation can be calculated. When the predetermined operation is performed, the CPU 10 stores data of the matrix representing the initial orientation, as the first orientation data, to the main memory. Following step S2, a process loop of steps S3 to S9 is repeatedly performed during the game play. One process loop is performed every frame time (for example, every 1/60 seconds).

Although in the present embodiment the initial orientation setting process (step S2) is performed once before the game is started (before the process loop of steps S3 to S9 is performed), the initial orientation setting process may be performed at any time while the game is being played, in another embodiment. That is, the CPU 10 may perform the initial orientation setting process each time the player performs the predetermined operation during the game play.

In step S3, the CPU 10 obtains the operation data. That is, the operation data transmitted from the controller 5 is received through the wireless controller module 19. The angular rate data, the acceleration data, the marker coordinate data, the operation button data included in the received operation data are stored to the main memory. Following step S3, the process of step S4 is performed.

In step S4, the CPU 10 calculates the first orientation based on the angular rate data 63 stored in the main memory. Any method may be used to calculate the orientation of the input device 8 based on the angular rate. In the present embodiment, the first orientation is calculated using the most recent angular rate (the angular rate obtained in the current process loop) and the first orientation obtained in the immediately preceding calculation (the first orientation calculated in the process loop immediately preceding the current process loop). Specifically, the CPU 10 sets, as the first orientation, an orientation obtained by rotating the first orientation obtained in the immediately preceding calculation, at the most recent angular rate, for a unit time period. The first orientation obtained in the immediately preceding calculation is represented by the first orientation data 68 stored in the main memory, and the most recent angular rate is represented by the angular rate data 63 stored in the main memory. Data representing the orientation (the 3×3 matrix) calculated in step S4 is stored to the main memory as an update to the first orientation data 68. Following step S4, the process of step S5 is performed.

In step S5, the CPU 10 performs the first correction process described above. The first correction process is a process for correcting the first orientation using the acceleration data. Hereinafter, the first correction process will be described in detail with reference to FIG. 15.

Figure 15:
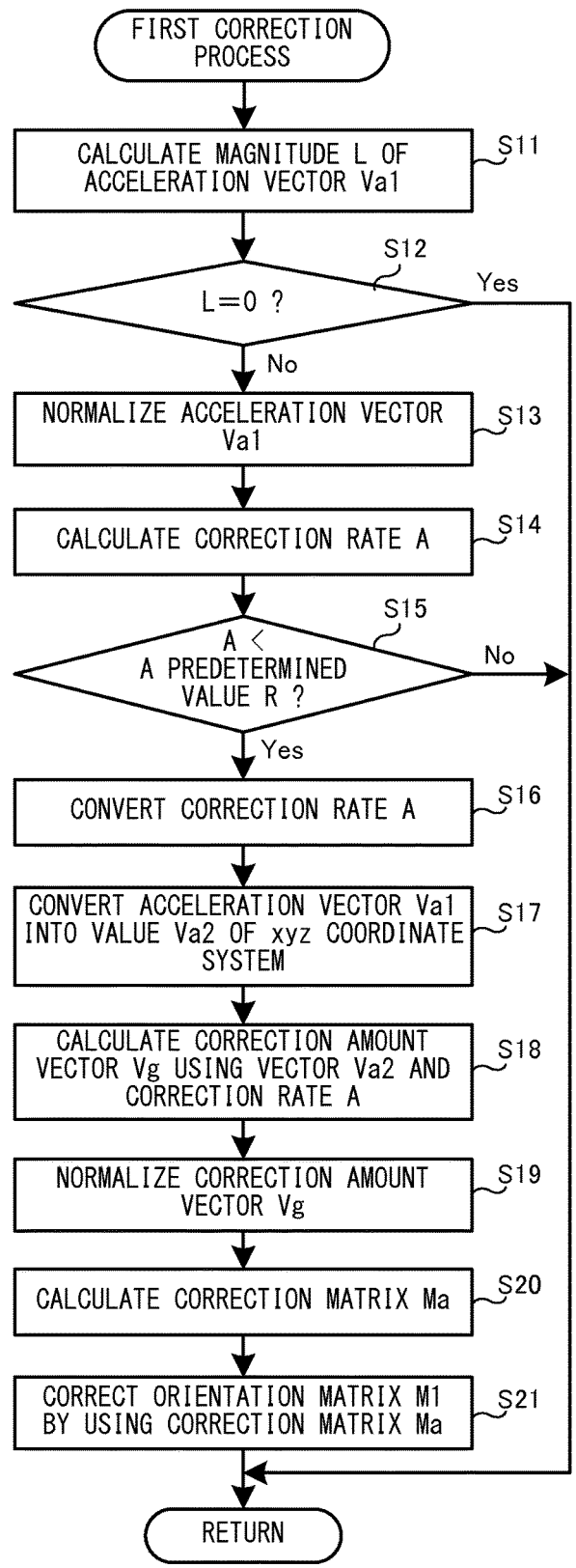
FIG. 15 is a flow chart showing a flow of the first correction process (step S5) shown in FIG. 14.

FIG. 15 is a flow chart showing a flow of the first correction process (step S5) shown in FIG. 14. In the first correction process, initially, the CPU 10 calculates a magnitude L of an acceleration detected by the acceleration sensor 37 in step S11. Specifically, the acceleration data 64 stored in the main memory is read, and the magnitude L of the acceleration vector Va1 represented by the acceleration data 64 is calculated. Data representing the calculated magnitude L is stored as the acceleration magnitude data 69 to the main memory. Following step S11, the process of step S12 is performed.

In step S12, the CPU 10 determines whether or not the magnitude of the acceleration detected by the acceleration sensor 37 is 0. That is, the acceleration magnitude data 69 stored in the main memory is read, and whether or not the magnitude L represented by the acceleration magnitude data 69 is 0 is determined. When a determination result of step S12 is negative, the process of step S13 is performed. On the other hand, when the determination result of step S12 is affirmative, the processes of subsequent steps S13 to S21 are skipped, and the CPU 10 ends the first correction process. Thus, in the present embodiment, when the magnitude of the acceleration detected by the acceleration sensor 37 is 0, the correction using the acceleration is not made. This is because when the magnitude of the acceleration is 0, the direction of gravity cannot be calculated based on the detection result from the acceleration sensor 37, and when the magnitude of the acceleration vector represents 0, the processes of subsequent steps S13 to S21 are difficult to perform.

In step S13, the CPU 10 normalizes the acceleration vector Va1 detected by the acceleration sensor 37. Specifically, the acceleration data 64 stored in the main memory is read, and the acceleration vector Va1 represented by the acceleration data 64 is transformed so as to have a magnitude of 1. The CPU 10 stores, to the main memory, data representing the acceleration vector Va1 having been normalized. Following step S13, the process of step S14 is performed.

In step S14, the CPU 10 calculates the correction rate A representing a rate at which the first orientation is corrected in the first correction process. The correction rate A is calculated based on the magnitude L of the acceleration vector Va1 not having been normalized. Specifically, the CPU 10 reads the acceleration magnitude data 69 stored in the main memory. The correction rate A is calculated using the magnitude L represented by the acceleration magnitude data 69 in accordance with equation (2) as follows.

$$A = |L-1| \quad (2)$$

Data representing the correction rate A calculated in accordance with equation 2 is stored as the correction rate data 70 to the main memory. The correction rate A calculated in accordance with equation (2) does not represent a final value but represents a value being calculated, and the value is converted in the following step S16 so as to obtain a final value of the correction rate A. Following step S14, the process of step S15 is performed.

In step S15, the CPU 10 determines whether or not the correction rate A calculated in step S14 is smaller than a predetermined value R. The predetermined value R is preset to, for example, 0.4. As described above, in the present embodiment, the magnitude of the gravitational acceleration detected by the acceleration sensor 37 represents "1", and further the correction rate A represents an absolute value of the difference between "1" and the magnitude L of the acceleration vector Va1 (as represented by equation (2)). Therefore, when the correction rate A is greater than or equal to the predetermined value R, the magnitude L of the acceleration vector Va1 differs from the magnitude of the gravitational acceleration by the predetermined value R or more. When the determination result of step S15 is affirmative, the process of step S16 is performed. On the other hand, when the determination result of step S15 is negative, the processes of subsequent steps S16 to S21 are skipped, and the CPU 10 ends the first correction process.

As described above, in the present embodiment, only when the difference between the magnitude L of an acceleration detected by the acceleration sensor 37 and the magnitude (=1) of the gravitational acceleration is smaller than a predetermined reference (the predetermined value R), the correction is made, and when the difference between the magnitude L and the magnitude of the gravitational acceleration is greater than or equal to the predetermined reference, the correction is not made. In a state where the input device 8 is being moved, an acceleration caused due to inertia generated by movement of the input device 8 is detected by the acceleration sensor 37 in addition to the gravitational acceleration, and the magnitude L of the detected acceleration vector Va1 represents a value other than "1", and when the input device 8 is being vigorously moved, the magnitude L represents a value which is substantially away from "1". Therefore, when the difference between the magnitude L and the magnitude of the gravitational acceleration is greater than or equal to the predetermined reference, it is assumed that the input device 8 is being vigorously moved. On the other hand, when the input device 8 is being vigorously moved, the acceleration vector Va1 detected by the acceleration sensor 37 contains a lot of components (components of an acceleration due to the inertia) other than the gravitational acceleration, and therefore the value of the acceleration vector Va1 is presumably unreliable as a value representing the direction of gravity. Therefore, in the determination process of step S15, whether or not the input device 8 is being vigorously moved is determined, in other words, whether or not the value of the acceleration vector Va1 is reliable as a value representing the direction of gravity is determined. In the present embodiment, when it is determined in the determination process of step S15 that the value of the acceleration vector Va1 is not reliable as a value representing the direction of gravity, the correction is not made, and only when the value of the acceleration vector Va1 is reliable of a value representing the direction of gravity, the correction is made. Thus, it is possible to prevent inaccurate correction of the first orientation due to the first orientation being corrected using the acceleration vector Va1 which is not reliable as a value representing the direction of gravity.

In step S16, the CPU 10 converts the value of the correction rate A. In the present embodiment, the correction rate A is converted such that the closer the magnitude L of the detected acceleration vector Va1 is to the magnitude of the gravitational acceleration, the closer the correction rate A is to 1. Specifically, the CPU 10 reads the correction rate data 70 stored in the main memory, and converts the correction rate A represented by the correction rate data 70 in accordance with equations (3) to (5) as follows.

$$A2=1-(A1/R) \quad (3)$$

$$A3=A2 \times A2 \quad (4)$$

$$A4=A3 \times C1 \quad (5)$$

In equations (3) to (5), variable A1 represents a non-converted correction rate (a value represented by the correction rate data 70 currently stored in the main memory), and variable A4 is a correction rate to be finally obtained through the conversion in step S16. In equation (3), the correction rate A2 is obtained through the conversion such that the closer the magnitude of the non-converted correction rate A1 is to the magnitude (=1) of the gravitational acceleration, the closer the magnitude of the converted correction rate A1 is to 1. In equation (4), the correction rate A3 is obtained through the conversion such that the closer the non-converted correction rate A2 is to 1, the greater the weight of the converted correction rate A2 is. In equation (5), the amount of correction is adjusted. That is, the greater the value of constant C1 is, the greater the amount of correction is. Constant C1 is preset to a value (for example, 0.03) in the range of 0<C1≤1. Data representing the correction rate A4 obtained through the conversion using equations (3) to (5) is stored to the main memory as an update to the correction rate data 70. Following step S16, the process of step S17 is performed.

Although in the present embodiment the conversions are performed using equations (3) to (5), part or all of the conversions using equations (3) to (5) may be eliminated in another embodiment. However, as for equations (3) to (5), equation elimination or suchlike can result in a calculation in which the more reliable the value of the acceleration vector is, the closer the correction rate is to zero. To perform such a calculation, it is necessary to replace the acceleration vector Va2 with the direction-of-gravity vector (0,−1,0) in equation (7).

In step S17, the CPU 10 converts the acceleration vector Va1 represented by the XYZ-coordinate system into a value Va2 in the xyz-coordinate system. The acceleration vector Va2 in the xyz-coordinate system is calculated by converting the acceleration vector Va1 having been normalized, using the first orientation matrix M1 representing the first orientation obtained in the immediately preceding frame. That is, the CPU 10 reads data of the (normalized) acceleration vector Va1 stored to the main memory in step S13, and the first orientation data 68. The acceleration vector Va2 in the xyz-coordinate system is calculated using the acceleration vector Va1 and the first orientation matrix M1 represented by the first orientation data 68. More specifically, the acceleration vector Va1 having been normalized is represented as Va1=(nx,ny,nz), and the components of the first orientation matrix M1 are represented as variables, respectively, in equation (1), and the acceleration vector Va2 to be represented by the xyz-coordinate system is represented as Va2=(vx,vy,vz). In this case, the acceleration vector Va2 is calculated in accordance with equation (6) as follows.

$$vx=Xx \times nx+Yx \times ny+Zx \times nz$$

$$vy=Xy \times nx+Yy \times ny+Zy \times nz$$

$$vz=Xz \times nx+Yz \times ny+Zz \times nz \quad (6)$$

As represented in equation (6), the acceleration vector Va2 is obtained by rotating the acceleration vector Va1 using the first orientation matrix M1, which is a rotation matrix. The acceleration vector Va2 calculated in step S17 is stored to the main memory. Following step S17, the process of step S18 is performed.

In step S18, the CPU 10 calculates the correction amount vector Vg using the correction rate A and the acceleration vector Va2 represented by the xyz-coordinate system. The correction amount vector Vg is calculated using the correction rate obtained through the conversion in step S16, and the vector (0,−1,0) representing the vertically downward direction (the direction of gravity) in the xyz-coordinate system. Specifically, the CPU 10 reads the correction rate data 70 stored in the main memory, and calculates the correction amount vector Vg=(gx,gy,gz) using the correction rate A represented by the correction rate data 70 in accordance with equation (7) as follows.

$$gx=(0-vx) \times A+vx$$

$$gy=(-1-vy) \times A+vy$$

$$gz=(0-vz) \times A+vz \quad (7)$$

As represented in equation (7), the correction amount vector Vg is a vector having an end point at which a line segment connecting from an end point of the acceleration vector Va2 to an end point of the direction-of-gravity vector (0,−1,0) is internally divided at A: (1−A). Therefore, the greater the value of the correction rate A is, the closer the correction amount vector Vg is to the direction-of-gravity vector. The CPU 10 stores data representing the correction amount vector Vg calculated in equation (7) to the main memory as the correction amount vector data 71. Following step S18, the process of step S19 is performed.

In step S19, the CPU 10 normalizes the correction amount vector Vg calculated in step S18. That is, the correction amount vector data 71 stored in the main memory is read, and a vector represented by the correction amount vector data 71 is normalized. Data representing the normalized vector is stored to the main memory as an update to the correction amount vector data 71. The correction amount vector Vg calculated in step S19 corresponds to the vector v3 shown in FIG. 9. Following step S19, the process of step S20 is performed.

In step S20, the CPU 10 calculates the correction matrix Ma for correcting the first orientation. The correction matrix Ma is calculated based on the acceleration vector Va2 represented by the xyz-coordinate system, and the correction amount vector Vg obtained through the normalization in step S19. Specifically, the CPU 10 reads the acceleration vector Va2 stored to the main memory in step S17, and the correction amount vector data 71. A rotation matrix for rotating the acceleration vector Va2 so as to coincide with the correction amount vector Vg is calculated, and the calculated rotation matrix is set as the correction matrix Ma. That is, the correction matrix Ma is a rotation matrix for performing rotation by an angle Δθ shown in FIG. 9. Data representing the correction matrix Ma calculated in step S20 is stored to the main memory as the correction matrix data 72. Following step S20, the process of step S21 is performed.

In step S21, the CPU 10 corrects the first orientation matrix M1 representing the first orientation using the correction matrix Ma. Specifically, the CPU 10 reads the first orientation data 68 and the correction matrix data 72 stored in the main memory. The first orientation matrix M1 represented by the first orientation data 68 is converted using the correction matrix Ma represented by the correction matrix data 72 (a product of the first orientation matrix M1 and the correction matrix Ma is calculated). The converted first orientation matrix M1 represents the corrected first orientation. That is, in the process of step S21, the vector v1 shown in FIG. 10 is rotated by the angle Δθ. The CPU 10 stores data representing the converted first orientation matrix M1 to the main memory as an update to the first orientation data 68. Following step S21, the CPU 10 ends the first correction process.

As described above, in the first correction process, calculated is the correction amount vector Vg between the acceleration vector detected by the acceleration sensor 37 and the direction-of-gravity vector (vector G shown in FIG. 8A) (steps S18 and S19), and the first orientation is corrected by a correction amount (the correction matrix Ma; the angle Δθ shown in FIG. 9) represented by the correction amount vector Vg (step S21). Thus, the first orientation (the vector v1 or the angle θ1 shown in FIG. 8A) calculated by the gyroscopes 55 and 56 is corrected so as to approach the second orientation (the angle θ2 shown in FIG. 8A) determined by the acceleration sensor 37. Through this correction, the first orientation is corrected so as to represent amore accurate value.

Further, in the first correction process, the higher the reliability of the acceleration vector Va1 is (the smaller the difference between the magnitude L of the acceleration vector Va1 and the magnitude of the gravitational acceleration is), the greater the value of the correction rate A is, so that the first orientation is corrected so as to more closely approach the second orientation. In other words, the higher the reliability of the acceleration vector Va1 is, the greater the amount of correction is, so that the second orientation is deeply reflected in the corrected first orientation. Thus, in the present embodiment, the amount of correction for the first correction process is determined based on the reliability of the acceleration sensor vector Va1, and therefore the amount of correction is appropriately determined in accordance with the reliability, which leads to accurate calculation of the orientation of the input device 8.

In the present embodiment, the correction amount vector Vg calculated in step S18 is a vector having an end point at which a line segment connecting from an end point of the acceleration vector Va2 to an end point of the direction-of-gravity vector is internally divided at A: (1−A), and the greater the value of the correction rate A is, the closer the correction amount vector Vg is to the direction-of-gravity vector. In another embodiment, depending on the method for calculating the correction rate A, the correction amount vector Vg may be determined such that the correction amount vector Vg is a vector having an end point at which a line segment connecting from an end point of the direction-of-gravity vector to an end point of the acceleration vector Va2 is internally divided at (1−A): A, and the smaller the value of the correction rate A is, the closer the correction amount vector Vg is to the direction-of-gravity vector. In this case, in step S20, a rotation matrix for rotating the correction amount vector Vg so as to coincide with the direction of gravity is calculated, and the calculated rotation matrix is set as the correction matrix Ma. Also in this case, the correction can be similarly performed as in the present embodiment.

Returning to the description of FIG. 14, in step S6, following step S5, the CPU 10 performs the second correction process described above. The second correction process is a process for correcting the first orientation using the marker coordinate data. Hereinafter, the second correction process will be described in detail with reference to FIG. 16.

Figure 16:
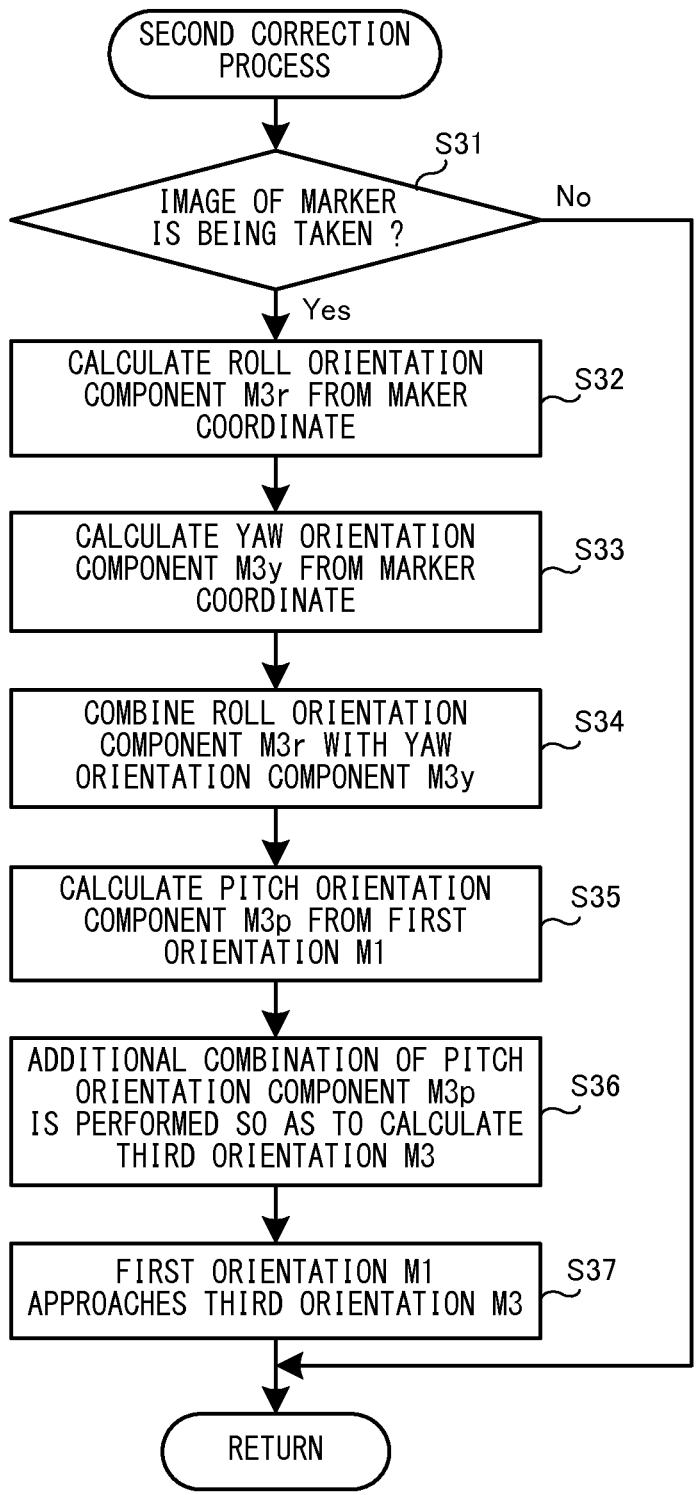
FIG. 16 is a flow chart showing a flow of the second correction process (step S6) shown in FIG. 14.

FIG. 16 is a flow chart showing a flow of the second correction process (step S6) shown in FIG. 14. In the first correction process, firstly, in step S31, the CPU 10 determines whether or not an image of the marker section 6 is taken by the image pickup means (the image pickup element 40) of the input device 8. The determination of step S31 can be performed by referring to the marker coordinate data 65 stored in the main memory. When the marker coordinate data 65 represents two marker coordinate points, it is determined that the image of the marker section 6 is taken, and when the marker coordinate data 65 only represents one marker coordinate point, or when the marker coordinate point is not obtained, it is determined that the image of the marker section 6 is not taken. When the determination result of step S31 is affirmative, the processes of subsequent steps S32 to S37 are performed. On the other hand, when the determination result of step S31 is negative, the processes of subsequent steps S32 to S37 are skipped, and the CPU 10 ends the second correction process. Thus, when the image of the marker section 6 is not taken by the image pickup element 40, the orientation of the input device 8 cannot be calculated using data obtained from the image pickup element 40. Therefore, in this case, the correction is not made in the second correction process.

In step S32, the CPU 10 calculates the roll orientation component M3r based on the marker coordinate data. The roll orientation component M3r is calculated based on the direction of the marker section 6 in the pickup image, that is, based on a tilt of a line connecting between two marker coordinate points represented by the marker coordinate data 65. Hereinafter, an exemplary method for calculating the roll orientation component M3r will be described with reference to FIG. 17.

Figure 17:
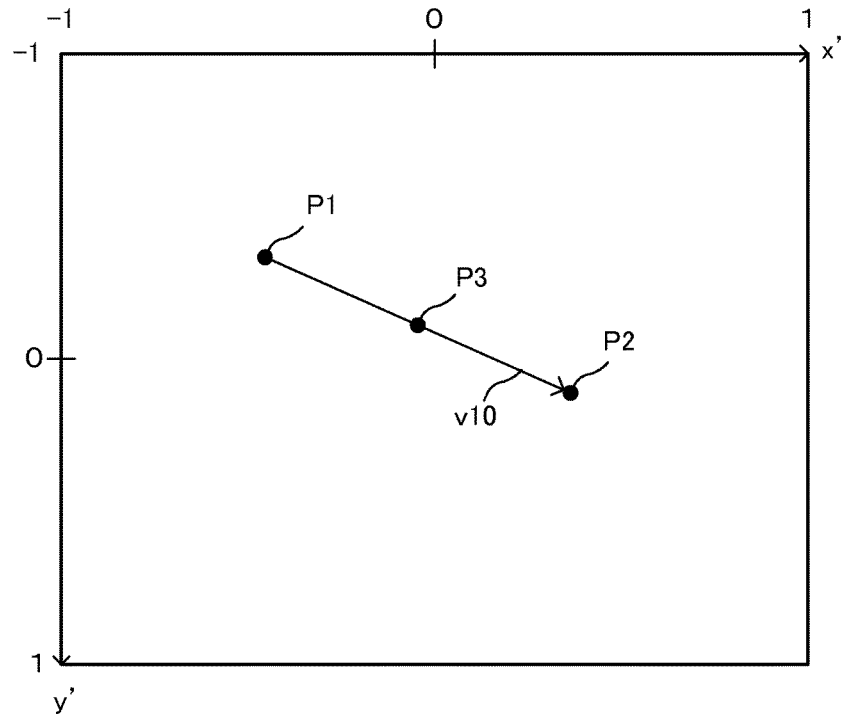
FIG. 17 is a diagram illustrating a two-dimensional coordinate point corresponding to a pickup image.

FIG. 17 is a diagram illustrating a two-dimensional coordinate system for the pickup image. As shown in FIG. 17, in the present embodiment, in a two-dimensional coordinate system (x'y' coordinate system) for representing positions in the pickup image, the range of the pickup image is represented so as to satisfy −1≤x'≤1, and −1≤y'≤1. In the x'y' coordinate system, when the input device 8 is in the reference orientation (an orientation in which the imaging direction of the input device 8 is toward the center of the marker section 6, and the button surface of the controller 5 is oriented to the vertically upward direction), the vertically downward direction in the pickup image corresponds to the y'-axis positive direction, and the rightward direction therein corresponds to the x'-axis positive direction. Further, a point P1 and a point P2 shown in FIG. 17 represent marker coordinate positions, and a point P3 is a middle point between the point P1 and the point P2. The vector v10 shown in FIG. 17 is a vector starting from the point P1 and ending at the point P2.

In order to calculate the roll orientation component M3r, the CPU 10 firstly reads the marker coordinate data 65, and calculates the vector v10 based on the two marker coordinate points represented by the marker coordinate data 65.

Further, a vector (hx,hy) obtained by normalizing the vector v10 is calculated. The vector (hx,hy) represents the x'-axis positive direction when the input device 8 is in the reference orientation, and changes its direction in accordance with the input device 8 rotating in the roll direction. The vector (hx,hy) represents the orientation associated with the roll direction, and the roll orientation component M3r can be calculated based on the vector (hx,hy). Specifically, the CPU 10 calculates the roll orientation component M3r in accordance with equation (8) as follows.

$$M3r = \begin{bmatrix} hx & -hy & 0 \\ hy & hx & 0 \\ 0 & 0 & 1 \end{bmatrix} \quad (8)$$

Data representing a matrix calculated in accordance with equation (8) is stored to the main memory as the roll orientation component data 73. Following step S32, the process of step S33 is performed.

In step S33, the CPU 10 calculates the yaw orientation component M3y based on the marker coordinate data. The yaw orientation component M3y is calculated based on the direction and the position of the marker section 6 in the pickup image. Hereinafter, an exemplary method for calculating the yaw orientation component M3y will be described with reference to FIG. 17.

Firstly, the CPU 10 reads the marker coordinate data 65, and calculates a middle point between the two marker coordinate points represented by the marker coordinate data 65. In the present embodiment, the middle point represents the position of the marker section 6. Further, the CPU 10 calculates a coordinate point (px,py) by rotating a coordinate point representing the calculated middle point, by a rotation angle associated with the roll direction of the input device 8, around the origin of the x'y' coordinate system (in the direction opposite to the rotation direction of the input device 8). In other words, the coordinate point representing the middle point is rotated around the origin such that the vector (hx,hy) represents the x-axis positive direction. When the input device 8 and the marker section 6 are positioned at the same lateral (the x-axis direction) position (that is, the input device 8 is in front of the marker section 6), the orientation associated with the yaw direction can be calculated from the coordinate point (px,py) obtained through the rotation described above.

Next, the CPU 10 calculates the rotation angle θy associated with the yaw direction based on the coordinate point (px,py) obtained by rotating the middle point, and an angle (limit angle) θy', in the yaw direction, which is obtained when the marker section 6 is at the edge in the x'-axis direction. The limit angle θy' and an x-coordinate value px' which corresponds to the limit angle θy' and is obtained by rotating the middle point, can be obtained in advance. Therefore, the rotation angle θy associated with the yaw direction can be calculated taking advantage of equality between the ratio of px to px' and the ratio θy to θy'. Specifically, the rotation angle θy associated with the yaw direction can be calculated using equation (9) as follows.

$$\theta y = px \times \theta y'/px' \quad (9)$$

When the length of the marker section 6 in the lateral direction is not considered, the limit angle θy' may be ½ of the angle of view of the controller 5, and the value of the px' may be "1".

Finally, the CPU 10 calculates, as the yaw orientation component M3y, the rotation matrix for performing rotation by the angle θy calculated using equation (9). Specifically, the yaw orientation component M3y is calculated in accordance with equation (10) as follows.

$$M3y = \begin{bmatrix} \cos\theta y & 0 & -\sin\theta y \\ 0 & 1 & 0 \\ \sin\theta y & 0 & \cos\theta y \end{bmatrix} \quad (10)$$

Data representing the matrix calculated in accordance with equation (10) is stored to the main memory as the yaw orientation component data 74. Following step S33, the process of step S34 is performed.

In step S34, the CPU 10 combines the roll orientation component M3r with the yaw orientation component M3y. That is, the roll orientation component data 73 and the yaw orientation component data 74 are read from the main memory, and multiplies the roll orientation component M3r represented by the data 73, by the yaw orientation component M3y represented by the data 74. Following step S34, the process of step S35 is performed.

In step S35, the CPU 10 calculates the pitch orientation component M3p based on the first orientation. It is possible to calculate the pitch orientation component M3p based on the y-coordinate value of the coordinate point (px,py) in the same manner as that used for the yaw orientation component M3y although the manner is not used in the present embodiment. However, the method for calculating the orientation in the yaw direction (the pitch direction) using the coordinate point (px,py) can be used when the input device 8 and the marker section 6 are positioned at the same lateral (vertical in the case of the pitch direction) position. In the game system 1 of the present embodiment, the player may operate the input device 8 almost straight in front of the marker section 6 (the television 2) in the lateral direction, and therefore it is possible to calculate the orientation in the yaw direction in the manner used in step S33 based on the assumption that "the input device 8 and the marker section 6 are positioned on the same lateral position". On the other hand, the player may stand or sit to operate the input device 8, and further the marker section 6 may be positioned above or below the screen of the television 2. Therefore, in the game system 1 of the present embodiment, it is not always assumed that "the input device 8 and the marker section 6 are positioned at the same vertical position", and therefore the orientation in the pitch direction may not necessarily be calculated using the coordinate point (px,py).

In the present embodiment, the first orientation is used as it is for the pitch orientation component M3p (therefore, in the second correction process, no correction is made for the pitch direction). Specifically, the CPU 10 reads the first orientation data 68 from the main memory. The rotation angle θp associated with the pitch direction is calculated in accordance with equation (11) using components of the first orientation matrix M1 represented by the first orientation data 68.

$$\cos(\theta p) = (Zx \times Zx + Zz \times Zz)^{1/2}$$

$$\sin(\theta p) = Zy \quad (11)$$

Variables Zx, Zy, and Zz in equation (11) represent the components of the first orientation matrix M1 represented in equation (1). The first orientation matrix M1 used here is the first orientation matrix M1 obtained through the first correction process performed in the current process loop. Further, the CPU 10 calculates a matrix of the pitch orientation component M3p using cos(θp) and sin(θp) calculated in equation (11), in accordance with equation (12).

$$M3p = \begin{bmatrix} 1 & 0 & 0 \\ 0 & \cos\theta p & \sin\theta p \\ 0 & -\sin\theta p & \cos\theta p \end{bmatrix} \quad (12)$$

Data representing the matrix calculated by equation (12) is stored to the main memory as the pitch orientation component data 75. Following step S35, the process of step S36 is performed.

In step S36, the CPU 10 calculates the third orientation based on the orientation components of the roll direction, the yaw direction, and the pitch direction. The third orientation is obtained by further combining the pitch orientation component M3p with the combination result of the roll orientation component M3r and the yaw orientation component M3y. Specifically, the CPU 10 reads the pitch orientation component data 75 from the main memory, and multiplies the matrix calculated in step S34 by the pitch orientation component M3p represented by the pitch orientation component data 75. Data representing the calculated matrix is stored to the main memory as the third orientation data 76. Following step S36, the process of step S37 is performed.

In step S37, the CPU 10 corrects the first orientation using the third orientation. The correction of step S37 is made such that the first orientation matrix M1 approaches the third orientation matrix M3 at a predetermined rate (constant C2 described below). The CPU 10 reads the first orientation data 68 and the third orientation data 76 from the main memory. The correction is made using the first orientation matrix M1 represented by the first orientation data 68 and the third orientation matrix M3 represented by the third orientation data 76, in accordance with equation (13).

$$M1=(M3-M1')\times C2+M1' \quad (13)$$

In equation (13), variable M1' represents an uncorrected first orientation matrix. Further, constant C2 is preset to a value in the range of 0<C2≤1, for example, 0.1. Data representing the corrected first orientation matrix M1 calculated in accordance with equation (13) is stored to the main memory as an update to the first orientation data 68. Following step S37, the CPU 10 ends the second correction process.

As described above, in the second correction process, the third orientation is calculated from the pickup image (the marker coordinate point), and the first orientation is corrected so as to approach the third orientation. Through this correction, the first orientation can be corrected so as to represent a more accurate value. Although in the present embodiment the third orientation only associated with the roll direction and the yaw direction is calculated from the pickup image, the third orientation associated with the pitch direction can be calculated from the pickup image as described above, and, in another embodiment, the third orientation associated with the roll direction, the yaw direction, and the pitch direction may be calculated from the pickup image. Further, in the second correction process, the third orientation associated with at least one of the roll direction, the yaw direction, and the pitch direction may be calculated.

Returning to the description of FIG. 14, in step S7, following step S6, the CPU 10 calculates a two-dimensional coordinate point (virtual plane coordinate point) based on the corrected first orientation. As will be described in detail later, in the present embodiment, the two-dimensional coordinate point is used as an input by the player in the game process to be described later (step S8). Hereinafter, the details of step S7 will be described with reference to FIGS. 18 and 19.

Figure 18:
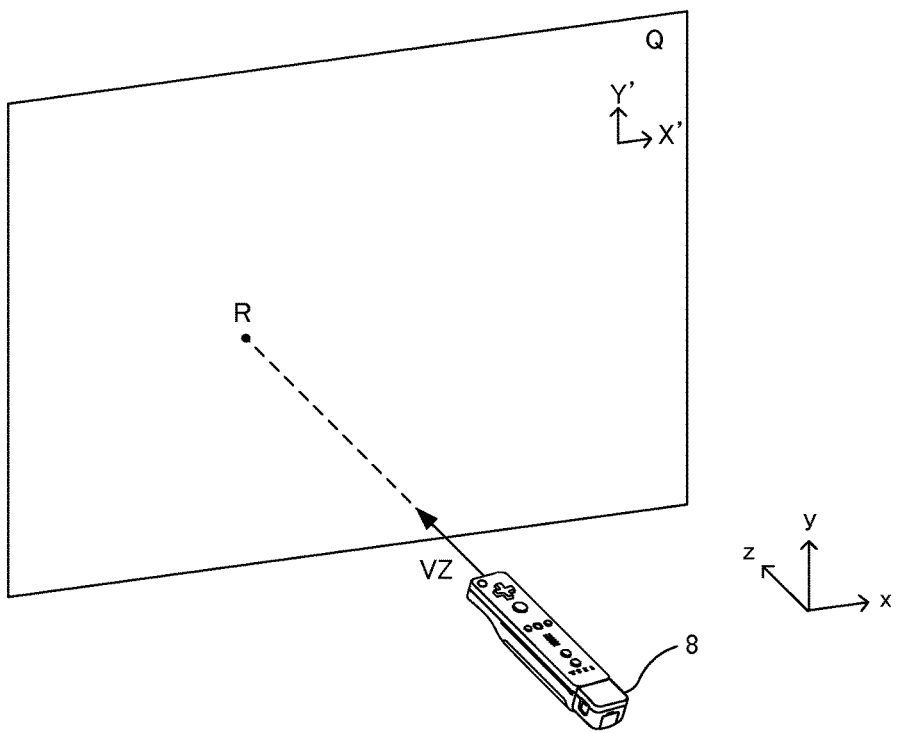
FIG. 18 is a view illustrating an input device and a predetermined plane in a predetermined virtual space.

FIG. 18 is a view where an input device and a predetermined plane are virtually arranged in a predetermined virtual space. In the present embodiment, as shown in FIG. 18, the CPU 10 performs coordinate calculation assuming that a three-dimensional virtual space is defined and the input device 8 and the predetermined plane Q are virtually arranged. The plane Q corresponds to the screen of the television 2. The CPU 10 calculates coordinates at the position in the plane Q that is pointed by the input device 8 in the Z-axis direction (Z-axis vector VZ shown in FIG. 18) in the virtual space. Specifically, the coordinates to be calculated are those at the intersection R between a line segment continuing from the Z-axis vector VZ in the virtual space, which represents the orientation of the input device 8, and the predetermined plane Q in the virtual space. Note that the "line segment continuing from the Z-axis vector VZ" is intended to mean a line segment passing in parallel to and along the Z-axis vector VZ. As will be described in detail later, in the present embodiment, a cursor or suchlike is displayed at the position on the screen that corresponds to the calculated coordinates. Thus, the position of the cursor on the screen is controlled in accordance with the orientation of the input device 8, and the player can move the cursor through an operation for changing the orientation of the input device 8.

Note that as shown in FIG. 18, in the present embodiment, the position of the virtual space is expressed by the aforementioned spatial coordinate system (xyz-coordinate system). Thus, the first orientation data 68 can be used without modification as data representing the orientation of the input device 8, which facilitates calculation in the virtual space. Positions in the plane Q are also expressed by the X'Y'-coordinate system. In this case, the plane Q is set to be parallel to the xy-plane of the spatial coordinate system, and the X'Y'-coordinate system is set such that the x- and y-axes of the spatial coordinate system are parallel to the X'- and Y'-axes, respectively, of the plane Q (FIG. 18).

Also, in the present embodiment, it is assumed that the player uses the input device 8 almost straight in front of the screen of the television 2, and the position of the input device 8 does not change in the virtual space. Specifically, the CPU 10 performs processing without changing the position of the input device 8 in the virtual space, even though the orientation of the input device 8 changes. Thus, it is possible to unambiguously determine the position of the input device 8 in the plane Q (the position of the intersection R) based on the orientation of the input device 8.

Figure 19:
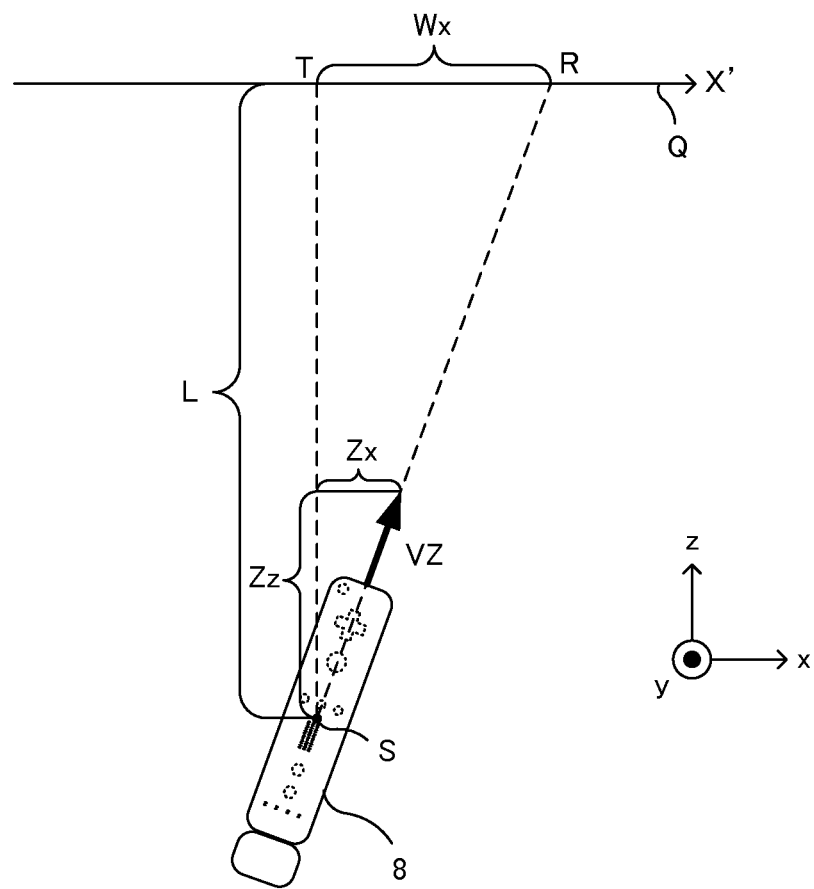
FIG. 19 illustrates the virtual space shown in FIG. 18 as viewed from the y-axis positive direction toward the negative direction.

Next, a method for calculating the position in the plane Q (the position of the intersection R) will be described in detail. FIG. 19 illustrates the virtual space shown in FIG. 18 as viewed from the y-axis positive direction toward the negative direction. In FIG. 19, a length from a point S, which represents the position of the input device 8, to a point (projection point) T in the plane Q to which the point S is projected is "L". Also, an X'-component length from the projection point T to the intersection R is "Wx". In the present embodiment, the value of the length L is set by the player at a predetermined time (e.g., when the game process is started). The main memory stores data representing the value of the length L set by the player (hereinafter, referred to as length data).

The Z-axis vector VZ is determined by the first orientation matrix M1 representing the orientation (first orientation) of the input device 8. Specifically, the Z-axis vector VZ is a vector (=(Zx,Zy,Zz)) having x-, y-, and z-components corresponding, in order, to the elements of the third row of the first orientation matrix M1. Also, as is apparent from FIG. 19, the ratio between the lengths Wx and L is equal to the ratio between the x-component (Zx) and the z-component (Zz) of the Z-axis vector VZ. Accordingly, considering this relationship, it is possible to calculate the length Wx based on the x-component Zx and the z-component Zz of the known vector VZ and the known length L. Concretely, the length Wx can be calculated by equation (14) below.

$$Wx = L \times Zx/Zz \qquad (14)$$

Also, as in the case of the X'-component length Wx, a Y'-component length Wy from the projection point T to the intersection R can be calculated by equation (15) below.

$$Wy = L \times Zy/Zz \qquad (15)$$

Obtaining the lengths Wx and Wy makes it possible to calculate a two-dimensional coordinate point representing the position of the intersection R in the plane Q. In the present embodiment, the position of the projection point T is set as the origin of the X'Y'-coordinate system. In this case, the intersection R is at the two-dimensional coordinate point (Wx,Wy).

To concretely describe the process of step S7, the CPU 10 first reads the first orientation data 68 and the length data from the main memory. Then, the lengths Wx and Wy are calculated by assigning to equations (14) and (15) the length L represented by the length data, as well as Zx, Zy, and Zz included in the first orientation matrix M1 represented by the first orientation data 68. As a result, the two-dimensional coordinate point (Wx,Wy) of the intersection R in the plane Q is obtained. The CPU 10 stores data representing the two-dimensional coordinate point to the main memory 32 as virtual plane coordinate data 77. Following step S7, the process of step S8 is performed.

As described above, in step S7, the virtual space is set in which the input device 8 and the predetermined plane Q are arranged, and the coordinates for the position of the input device 8 in the plane Q that is pointed by a predetermined axis (Z-axis) in the virtual space are calculated, so that the two-dimensional coordinate point can be obtained based on the orientation of the input device 8.

In the above embodiment, the length L can be set by the player. Here, as is apparent from equations (14) and (15), by adjusting the length L, the two-dimensional coordinate point (Wx,Wy) to be calculated can be changed. Specifically, the amount of change of the two-dimensional coordinate point (Wx,Wy) with respect to the change in orientation of the Z-axis vector VZ (i.e., the change in orientation of the input device 8) can be altered by adjusting the length L. Concretely, the amount of change increases with the length L. Therefore, a slight change in orientation of the input device 8 results in great movement of the cursor. On the other hand, the amount of change decreases with the length L. Therefore, even a great change in orientation of the input device 8 only results in slight movement of the cursor. Thus, in the above embodiment, by causing the player to set the length L, it becomes possible to allow the player to adjust the feeling of operating the input device 8 by him/herself. For example, the player may set the length L to be relatively short when requiring subtle operations of the cursor or relatively long when requiring broad movements of the cursor. In another embodiment, the length L may be a predetermined constant.

Also, in another embodiment, the length L may be calculated by the game apparatus 10 using a predetermined method. For example, the CPU 10 may calculate the actual distance from the input device 8 to the screen of the television 2, and set the calculated distance as the length L. The actual distance can be calculated, for example, based on the length between two markers 6R and 6L within a pickup image taken by the image pickup element 40 or based on the size of the maker 6R or 6L. Moreover, by setting the plane Q such that the position and the size of the plane Q in the virtual space are equal to the position and the size of the screen of the television 2 in a real space (e.g., the player may be caused to set the size of the television screen), it becomes possible to display the cursor at the position on the screen of the television 2 that corresponds to the two-dimensional coordinate point (Wx,Wy). Thus, it is possible to display the cursor at the position (on the screen) pointed by the input device 8.

In a method for obtaining the two-dimensional coordinate point using the input device 8, the aforementioned maker coordinate point (the maker coordinate data 65 shown in FIG. 13) is used to obtain the two-dimensional coordinate point. Specifically, the maker coordinate point changes in accordance with the position pointed by the input device 8, and therefore it is possible to calculate the position on the screen that is pointed by the input device 8 based on the maker coordinate point. Accordingly, so long as there is any marker portion 6, the two-dimensional coordinate point can be calculated using the maker coordinate point. However, when no marker portion 6 is available, or when the input device is provided with no image pickup element, the two-dimensional coordinate point cannot be obtained by taking an image of the marker portion 6. In the method according to the present embodiment, the two-dimensional coordinate point can be obtained even if there is no image of the marker portion 6 taken by the image pickup element 40 of the input device 8, and therefore the method is applicable to the case where no marker portion is provided or the case where the input device is provided with no image pickup element.

Also, in the present embodiment, the two-dimensional coordinate point is calculated based on the first orientation corrected by the first and second correction processes. Here, in another embodiment, the first and second correction processes may not necessarily be performed so long as the two-dimensional coordinate point is calculated based on the orientation of the input device 8 being calculated by any suitable method.

Also, in the above embodiment, assuming that the player uses the input device 8 with its Z-axis direction pointing the screen of the television 2, the plane Q is positioned in the Z-axis direction of the input device 8, which is directed to the screen of the television 2 (the marker portion 6). However, even if no image of the marker portion 6 is taken by the image pickup element 40, the two-dimensional coordinate point can be obtained as described above, and therefore the player can use the input device 8 with its Z-axis direction pointing in any direction. For example, the CPU 10 may set the plane Q in the Z-axis direction of the input device 8 at the time when the player performs a predetermined operation (e.g., when the player presses an operation button). Thus, the plane Q can be set in a suitable position in the virtual space, which accords with the direction of the input device 8, and therefore the two-dimensional coordinate point can be calculated whatever direction the input device 8 is pointed in at the time of the predetermined operation. That is, the player can use the input device 8 while pointing it to any direction.

Note that in the present embodiment, the game apparatus 3 employs the method (referred to as the first method) in which a two-dimensional coordinate point is calculated so as to take the origin (0,0) when the Z-axis direction of the input device 8 is oriented horizontally. Here, the game apparatus 3 may calculate the two-dimensional coordinate point by the second method to be described later, rather than by the first method.

Returning to the description of FIG. 14, in step S8 following step S7, the CPU 10 performs a display control process using the two-dimensional coordinate point. The display control process is a process for controlling a display range in a display target, which should be displayed on a display device (television 2), based on the two-dimensional coordinate point calculated in step S7. In the display control process, for example, the display target is scrolled up/down based on the two-dimensional coordinate point. Specifically, in the present embodiment, for example, the user can scroll up/down the screen displayed on the television 2 by changing the orientation of the input device 8. Also, the display target may be any object, e.g., a field formed in the game space (including an object(s) arranged in the field) or a map representing the game space, or it may be a Web page or an electronic program guide.

Also, in the present embodiment, the CPU 10 arranges a display target and a virtual camera in a virtual space, and controls the display range by changing the direction and/or the position of the virtual camera in the virtual space based on the virtual plane coordinate point. Note that the virtual space in which the display target is arranged differs from the virtual space in which the two-dimensional coordinate point calculated in step S7 is present. In the following descriptions, to distinguish between them, the virtual space in which the two-dimensional coordinate point is present may be referred to as the "first virtual space", and the virtual space in which the display target is arranged may be referred to as the "second virtual space".

Note that the display range control method may be any method so long as the display range is changed in accordance with the virtual plane coordinate point. For example, the CPU 10 may move the display target instead of moving the virtual camera. Also, the display range control method does not have to be a method for calculating the display range using the virtual camera in a three-dimensional space. For example, the CPU 10 may set a display range in a two-dimensional plane which is a display target, and may change the display range in accordance with the virtual plane coordinate point.

Figure 20:
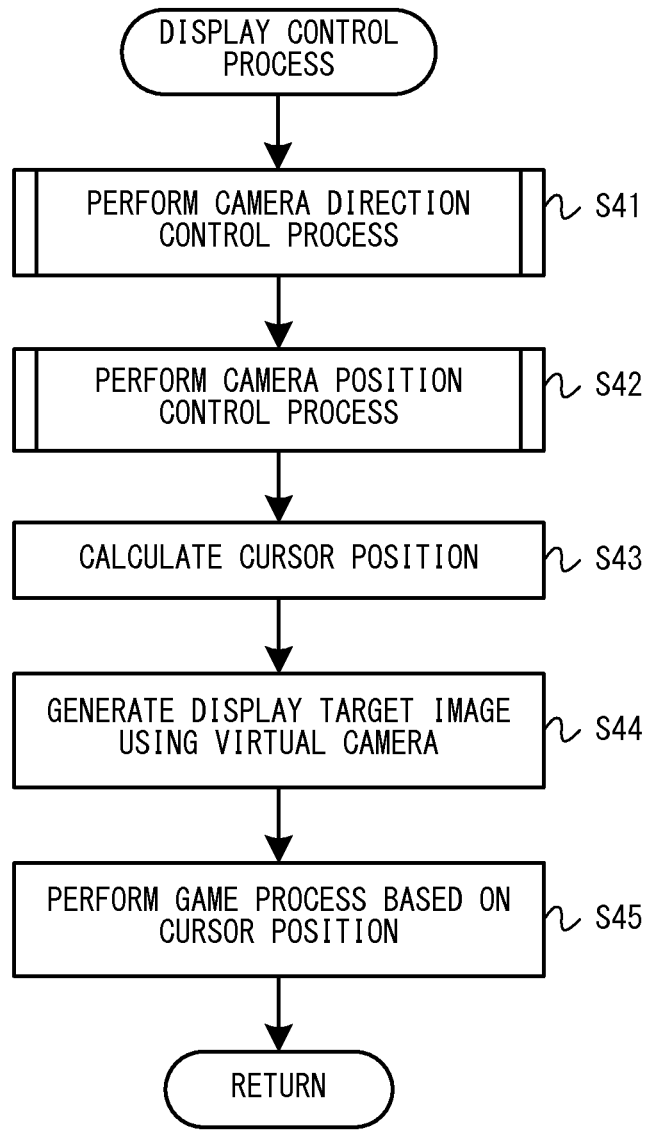
FIG. 20 is a flow chart showing a flow of a display control process (step S8) shown in FIG. 14.

Referring to FIG. 20, the display control process will be described in detail below. Note that in the following description about the display control process, the two-dimensional coordinate point calculated in step S7 will be referred to as the "virtual plane coordinate point" so as to be distinguished from a coordinate point on the display screen (screen coordinate point).

FIG. 20 is a flow chart showing a flow of the display control process (step S8) shown in FIG. 14. In the display control process of the present embodiment, initially, a camera direction control process is performed in step S41. The camera direction control process is a process for controlling the direction of the virtual camera based on the virtual plane coordinate point.

Figure 21:
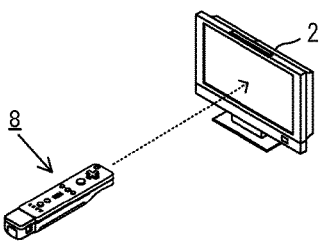
FIG. 21 is a diagram illustrating examples of the relationship between the orientation of the input device and a display range determined by a camera direction control process.
Figure 21:
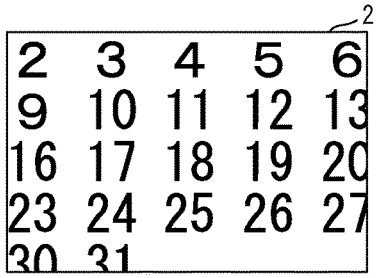
Figure 21:
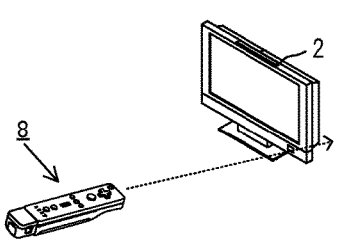
Figure 21:
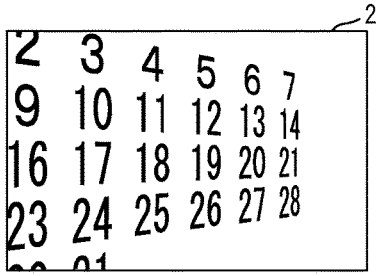
Figure 21:
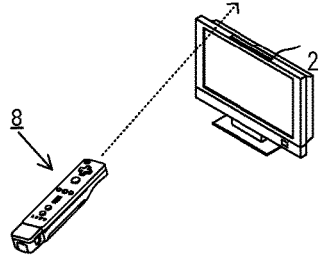
Figure 21:
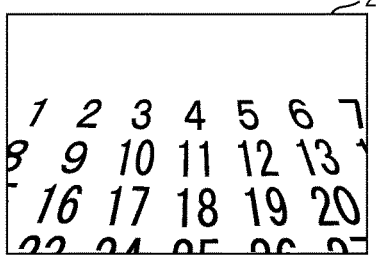

FIG. 21 is a diagram illustrating examples of the relationship between the orientation of the input device 8 and the display range determined by the camera direction control process. In FIG. 21, when the input device 8 takes a reference orientation (here, the input device 8 is oriented such that the Z-axis is directed to the screen of the television 2), a display range is set such that a calendar is partially displayed on the screen (see the upper column of FIG. 21). Here, when the input device 8 taking the reference orientation is directed rightward such that the position at which the input device 8 points deviates from the screen to the right thereof (see the middle column of FIG. 21), the display range changes to turn rightward (the image displayed on the screen moves leftward as if the line of sight to the calendar was tilted with respect to the horizontal direction). That is, in this case, the CPU 10 controls the direction of the virtual camera to move the display range rightward. Also, when the input device 8 taking the reference orientation is directed upward such that the position at which the input device 8 points deviates above the screen (see the lower column of FIG. 21), the display range changes to turn upward (the image moves downward as if the line of sight to the calendar was tilted with respect to the vertical direction). In this manner, the camera direction control process of the present embodiment allows the user to control the virtual camera such that the direction of the input device 8 corresponds to the direction of the virtual camera, and also to control the direction and the amount of image scrolling in accordance with the direction and the amount of the deviation of the input device 8 from the screen of the television 2. The camera direction control process will be described in detail below.

Figure 22:
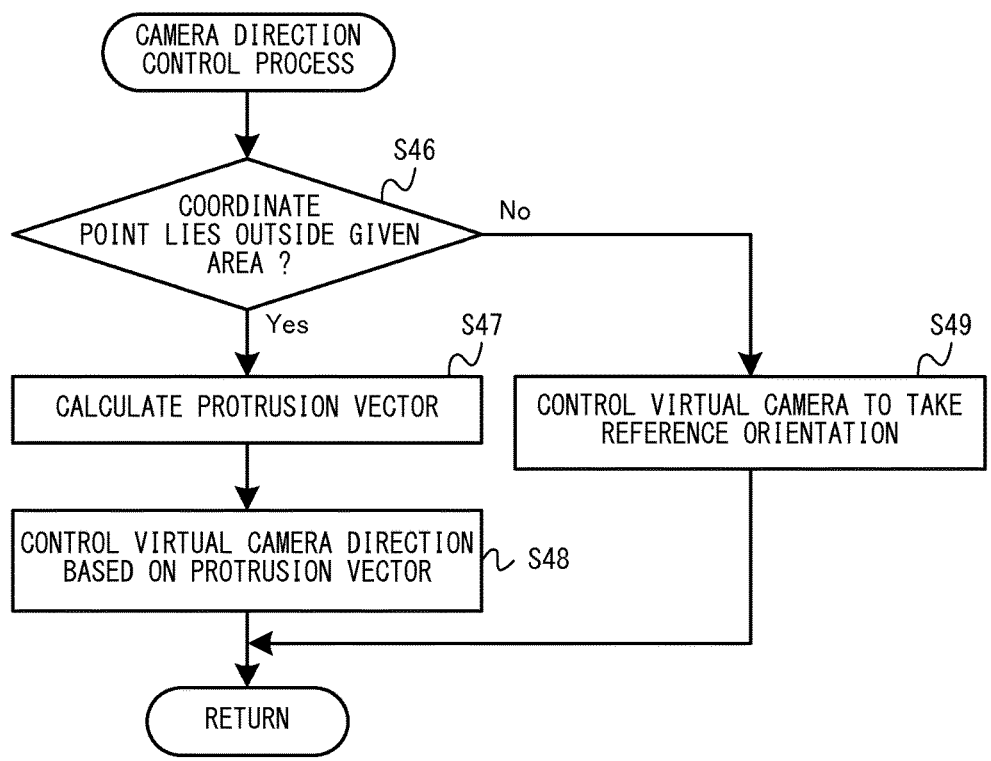
FIG. 22 is a flow chart showing a flow of a camera direction control process (step S41) shown in FIG. 20.

FIG. 22 is a flow chart showing a flow of a camera direction control process (step S41) shown in FIG. 20. In the camera direction control process, initially, in step S46, the CPU 10 determines whether or not the virtual plane coordinate point lies outside a given area. Here, the given area is an area set in the plane Q arranged within the first virtual space. FIG. 23 is a diagram illustrating the plane Q arranged within the first virtual space. In FIG. 23, an area Ar represented by one-dot chain lines is the given area. Here, the CPU 10 calculates a position (a cursor position to be described later) on the screen of the television 2 based on the virtual plane coordinate point (step S43 to be described later). The position on the screen is calculated such that the given area Ar corresponds to the screen of the television 2. For example, when the virtual plane coordinate point is positioned at the edge of the given area Ar, the position of an edge of the screen is calculated as the position on the screen. That is, in the present embodiment, the given area Ar is an area in the plane Q that corresponds to the screen area of the television 2. Note that the given area Ar preferably corresponds to the screen of the television 2 but the edge of the given area Ar does not have to strictly correspond to the edge of the screen area. Accordingly, the given area Ar is not limited to a rectangle and may be, for example, an oval or a circle. Also, in another embodiment, the given area Ar may be set in any manner.

In the present embodiment, the given area Ar is predetermined. However, the given area Ar may be changed in accordance with, for example, the user's instruction or the situation in the game. For example, the CPU 10 may change the given area Ar in accordance with the length L from the input device 8 to the plane Q in the first virtual space (see FIG. 19), such that the given area Ar corresponds to the screen area of the television 2.

The CPU 10 performs the determination of step S46 by reading data indicating the predetermined given area Ar and the virtual plane coordinate data 77 from the main memory, and determining the positional relationship between the virtual plane coordinate point and the given area Ar. When the determination result of step S46 is affirmative, the processes of steps S47 and S48 are performed. On the other hand, when the determination result of step S46 is negative, the process of step S49 to be described later is performed.

In step S47, the CPU 10 calculates a protrusion vector. The protrusion vector is a vector representing the direction and the amount of the protrusion of the virtual plane coordinate point from the given area Ar in the plane Q. Referring to FIG. 23, a method for calculating the protrusion vector will be described below. In FIG. 23, point R denotes a position indicated by the virtual plane coordinate point. Also, point P10 is the aforementioned projection point T, which corresponds to the origin of the X'Y'-coordinate system in the plane Q. In this case, the protrusion vector Vd is a vector which starts at intersection P11 between a line extending from point P10 to point R and the given area Ar and ends at point R. Accordingly, the protrusion vector Vd can be calculated based on an equation expressing the given area Ar and the virtual plane coordinate point. Concretely, the CPU 10 reads data indicating the given area Ar and the virtual plane coordinate data 77 from the main memory, and calculates the protrusion vector Vd based on the equation expressing the given area Ar and the virtual plane coordinate point. Data indicating the calculated protrusion vector Vd is stored to the main memory as protrusion vector data 78. Following step S47, the process of step S48 is performed.

Note that the protrusion vector may be any vector so long as it represents the direction and the amount of the protrusion of the virtual plane coordinate point from the given area Ar, and the protrusion vector calculation method is not limited to the method described above. For example, the protrusion vector may be calculated so as to have its origin at a midpoint of a side closest to the virtual plane coordinate point among four sides of the given area Ar (and point R of the virtual plane coordinate point as its endpoint).

In step S48, the CPU 10 controls the direction of the virtual camera based on the protrusion vector Vd. In the present embodiment, the direction of the virtual camera is controlled such that the display range moves toward a direction in accordance with the direction of the protrusion vector Vd, and by an amount in accordance with the magnitude of the protrusion vector Vd. Step S48 will be described in detail below.

Figure 24:
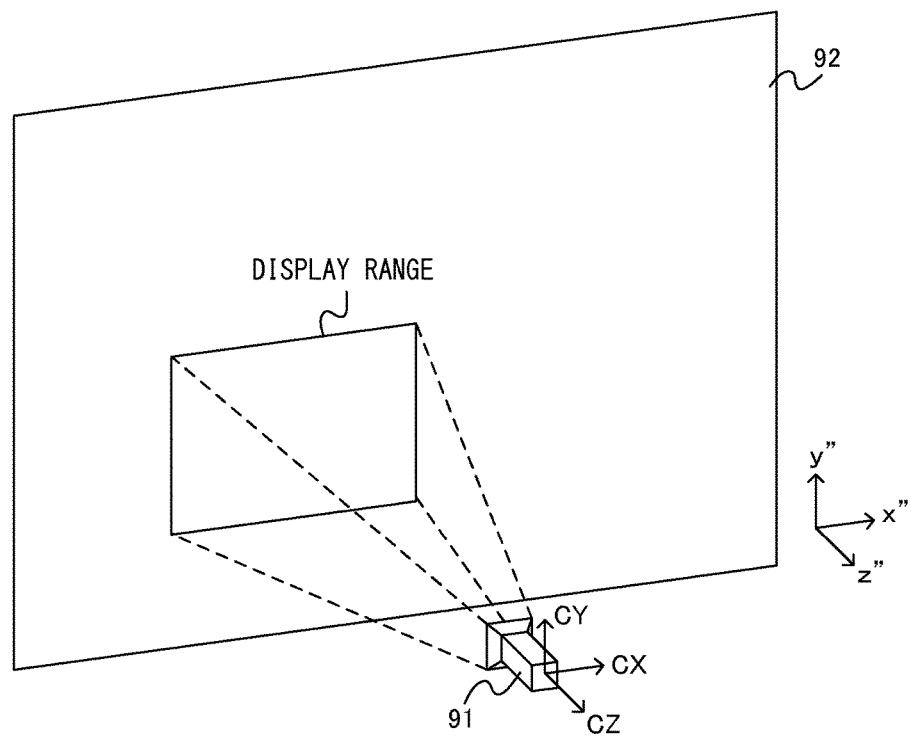
FIG. 24 is a diagram illustrating a virtual space in which a display target and a virtual camera are arranged.

First, the virtual space (second virtual space) in which the display target and the virtual camera are arranged will be described. FIG. 24 is a diagram illustrating the virtual space in which the display target and the virtual camera are arranged. In the present embodiment, the second virtual space is expressed by an x"y"z"-coordinate system. The x"y"z"-coordinate system is a coordinate system with the positive z"-, y"-, and x"-axis directions being respectively backward, upward, and rightward directions when the direction toward the display target 92 is a forward direction viewed from the front position of the planar display target 92.

The direction (orientation) of the virtual camera 91 is expressed by a 3×3 rotation matrix as in the case of the first orientation of the input device 8. This matrix consists of the following three vector components when the viewing direction of the virtual camera 91 is forward:

rightward vector (corresponding to the direction to the right of the screen) CX=(CXx,CXy,CXz);

upward vector (corresponding to the direction above the screen) CY=(CYx,CYy,CYz); and backward vector CZ=(CZx,CZy,CZz).

The matrix is a rotation matrix expressing a rotation from a given reference orientation to the current orientation of the virtual camera 91. In the present embodiment, the given reference orientation is an orientation with the three vectors CX, CY, and CZ respectively corresponding to the x"-, y"-, and z"-axis directions. That is, when the reference orientation is taken, the viewing direction of the virtual camera 91 is perpendicular to the plane of the display target 92.

In step S48, the CPU 10 initially calculates an angle (rotation angle) at which to rotate the virtual camera 91 from the reference orientation based on the protrusion vector Vd. In the present embodiment, a rotation angle rX of the virtual camera 91 about the y"-axis is calculated in accordance with the X'-component dx of the protrusion vector Vd, and a rotation angle rY of the virtual camera 91 about the x"-axis is calculated in accordance with the Y'-component dy of the protrusion vector Vd. Concretely, the CPU 10 reads the protrusion vector data 78 from the main memory, and calculates the rotation angles rX and rY in accordance with equation (16) below.

$$rX = dx \times K1$$

$$rY = dy \times K1 \tag{16}$$

In equation (16), constant K1 is predetermined. Note that the rotation angle of the virtual camera 91 increases with constant K1.

In step S48, the CPU 10 then calculates the orientation of the virtual camera 91 rotated from the reference orientation by the rotation angle. Concretely, a matrix Mc expressing the orientation of the rotated virtual camera 91 is calculated in accordance with equation (17) below.

$$Mc = \begin{bmatrix} CXx & CYx & CZx \\ CXy & CYy & CZy \\ CXz & CYz & CZz \end{bmatrix} = \tag{17}$$

$$\begin{bmatrix} \cos(rX) & \sin(rY) \times -\sin(rX) & \cos(rY) \times \sin(rX) \\ 0 & \cos(rY) & -\sin(rY) \\ \sin(rX) & \sin(rY) \times \cos(rX) & \cos(rY) \times \cos(rX) \end{bmatrix}$$

Data indicating the matrix Mc calculated by equation (17) is stored to the main memory as camera direction data 79. Following step S48, the CPU 10 ends the camera direction control process.

According to step S48, the direction of changing the orientation of the virtual camera 91 (the direction of the change from the reference orientation) is determined in accordance with the direction of the protrusion vector Vd, and the amount of changing the orientation of the virtual camera 91 (the amount of the change from the reference orientation, i.e., the rotation angle) is determined in accordance with the magnitude of the protrusion vector Vd. Therefore, the direction of changing the display range (which corresponds to the direction of changing the orientation of the virtual camera 91) is determined in accordance with the direction from the given area Ar toward the position indicated by the virtual plane coordinate point (the direction of the protrusion vector Vd). Also, the degree to which the display range changes (which corresponds to the amount of change in orientation of the virtual camera) is determined in accordance with the degree to which the position indicated by the virtual plane coordinate point is distanced from the given area Ar (the magnitude of the protrusion vector Vd).

While the process of step S48 only changes the direction (orientation) of the virtual camera, in another embodiment, both the direction and the position of the virtual camera may be changed. For example, when directing the virtual camera taking the reference orientation rightward, the CPU 10 may only change the orientation of the virtual camera 91 or may direct the orientation of the virtual camera 91 rightward and move the position thereof rightward as well.

On the other hand, in step S49, the CPU 10 controls the virtual camera 91 to take the reference orientation. The matrix expressing the reference orientation includes the variables rX and rY indicating the rotation angles which are "0" in equation (17). The CPU 10 stores data indicating the matrix expressing the reference orientation to the main memory as camera direction data 79. Following step S48, the CPU 10 ends the camera direction control process.

According the above-described camera direction control process, when the virtual plane coordinate point lies within the given area Ar, the virtual camera 91 is maintained in the reference orientation (step S49), and therefore the display range does not move. In this manner, in the present embodiment, the processes of moving the display range (steps S47 and S48) are performed when the virtual plane coordinate point indicates a position outside the given area Ar in the plane Q. On the other hand, when the virtual plane coordinate point deviates from the given area Ar, the orientation of the virtual camera 91 is controlled in accordance with the direction and the degree of the deviation of the virtual plane coordinate from the given area Ar, so that the display range moves in accordance with the direction and the degree of such deviation. Here, in the present embodiment, when the virtual plane coordinate point lies within the given area Ar, the input device 8 is directed to the screen of the television 2, i.e., the input device 8 points at a position on the screen. Also, when the virtual plane coordinate point lies outside the given area Ar, the direction of the input device 8 deviates from the screen of the television 2, i.e., the position at which the input device 8 points is not on the screen. Therefore, according to the camera direction control process, the user can move the display range by performing such an operation as to cause the direction of the input device 8 to deviate from the screen of the television 2 (see FIG. 21).

Note that in the camera direction control process, the CPU 10 determines the amount of movement of the display range based on the degree to which the virtual plane coordinate point is distanced from the given area Ar. Here, in another embodiment, the CPU 10 may determine the moving speed of the display range (the amount of movement per unit time) based on the aforementioned degree. Specifically, when the virtual plane coordinate exits the given area Ar, the CPU 10 may rotate the virtual camera at an angular rate in accordance with the degree. As a result, the user can change the display range by rotating the virtual camera even when the input device 8 is kept still while being directed so as to deviate from the screen of the television 2.

Returning to the description of FIG. 20, in step S42, the CPU 10 performs a camera position control process. The camera position control process is a process for controlling the position of the virtual camera based on the virtual plane coordinate point. Referring to FIGS. 25 to 31, the camera position control process will be described below.

Figure 25:
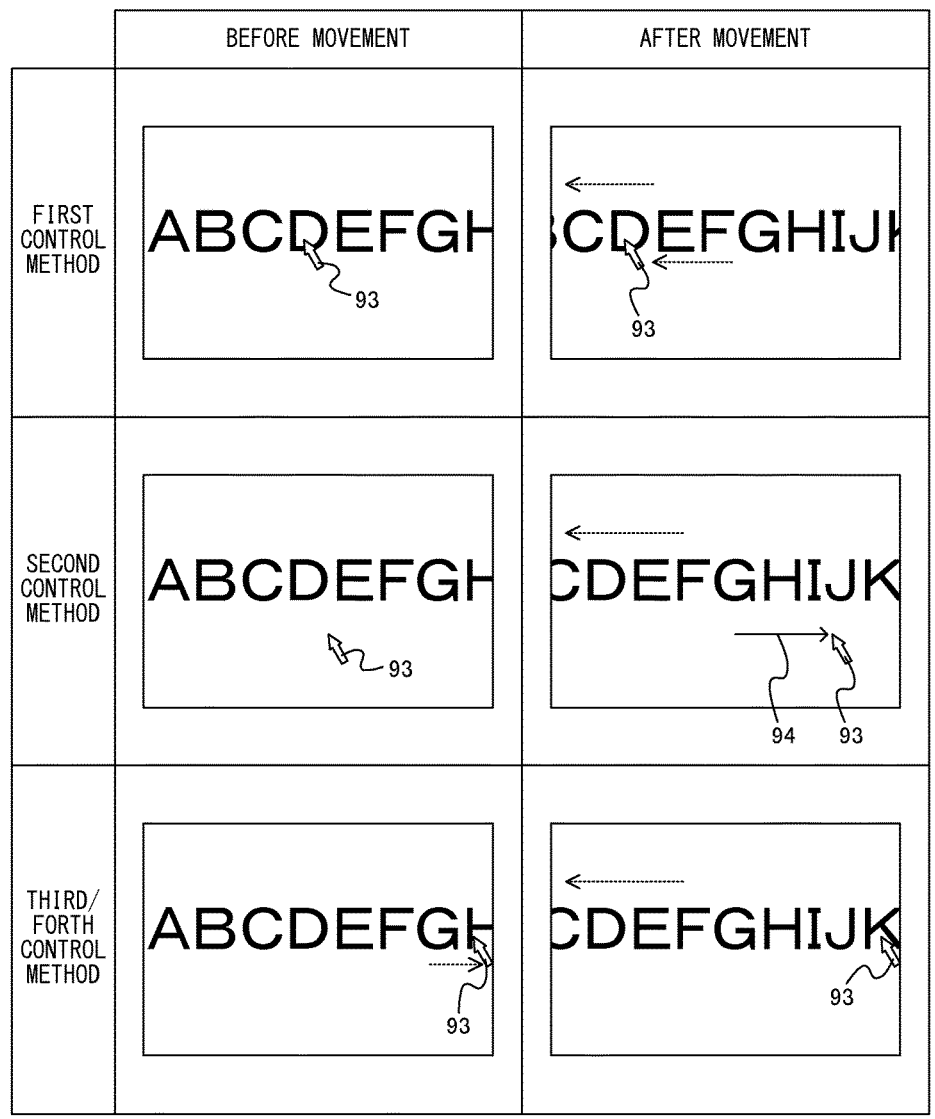
FIG. 25 is a diagram illustrating first to fourth control methods for controlling the position of the virtual camera.

While there are various possible control methods for use in the camera position control process, four control methods will be described below by way of example. FIG. 25 is a diagram illustrating first to fourth control methods for controlling the position of the virtual camera. Note that in FIG. 25, the CPU 10 displays a cursor 93 in the position of a screen coordinate point calculated from the virtual plane coordinate point.

The first control method is a method for controlling the position of the virtual camera in accordance with the amount and the direction of movement of the virtual plane coordinate point. In the first control method, the virtual camera is moved by an amount corresponding to the amount of movement of the virtual plane coordinate point (in a given period of time) in a direction corresponding to the direction of movement of the virtual plane coordinate point. Note that in the present embodiment, the virtual camera is moved by the first control method only in a period of time specified by the user (e.g., a period of time the user is pressing a given button of the input device 8). According to the first control method, when the user presses a given button at a certain time point and moves the cursor 93 leftward (moves the virtual plane coordinate point in the negative X'-axis direction) with the given button being pressed, as shown in the upper column of FIG. 25, an image displayed on the screen is moved along with the cursor 93 (i.e., the display range moves rightward). At this time, in the present embodiment, the position of the virtual camera is controlled such that the position of the display target at which the cursor 93 points (in FIG. 25, the position of the letter "D") remains the same before and after the movement of the display range. That is, in the present embodiment, the display range can be moved with the position of the display target at which the cursor 93 points being fixed.

The second control method is a method for continuously moving the virtual camera from a given reference position toward the virtual plane coordinate point. In the second control method, the direction of movement of the virtual camera is controlled in accordance with the direction from the reference position toward the position indicated by the virtual plane coordinate point. Also, in the present embodiment, the moving speed of the virtual camera is controlled in accordance with the distance from the reference position to the position indicated by the virtual plane coordinate point (see an arrow 94 shown in FIG. 25). Note that the given reference position is the position of the virtual plane coordinate point, for example, at the time the user presses (or starts pressing) a given button of the input device 8. However, the given reference position may be any position, e.g., a predetermined position. According to the second control method, when the user presses a given button at a certain time point, and then moves the cursor 93 rightward, the display range continuously moves rightward (see the upper column of FIG. 25). Note that in the present embodiment, the moving speed increases with the above-described distance. Also, in the present embodiment, the virtual camera is moved by the second control method only in a period of time specified by the user, as in the case of the first control method.

The third and fourth control methods are methods for moving the camera when the virtual plane coordinate point lies outside the given area Ar. In the present embodiment, the virtual camera is moved in a direction corresponding to the direction from the given area Ar toward the position indicated by the virtual plane coordinate point. According to the third and fourth control methods, when the position at which the input device 8 points is moved from inside the screen to the outside, the display range moves in the same direction as the position moving outside the screen. For example, when the position at which the input device 8 points is moved to the right of the screen, the display range moves rightward, as shown in the lower column of FIG. 25.

Note that the third and fourth control methods differ in calculation of the moving speed of the virtual camera. Specifically, in the third control method, the moving speed of the virtual camera is calculated based on the degree to which the virtual plane coordinate point is distanced from the given area Ar. On the other hand, in the fourth control method, the moving speed of the virtual camera is calculated based on the moving speed of the virtual plane coordinate point while the virtual plane coordinate point is positioned outside the given area Ar.

Figure 26:
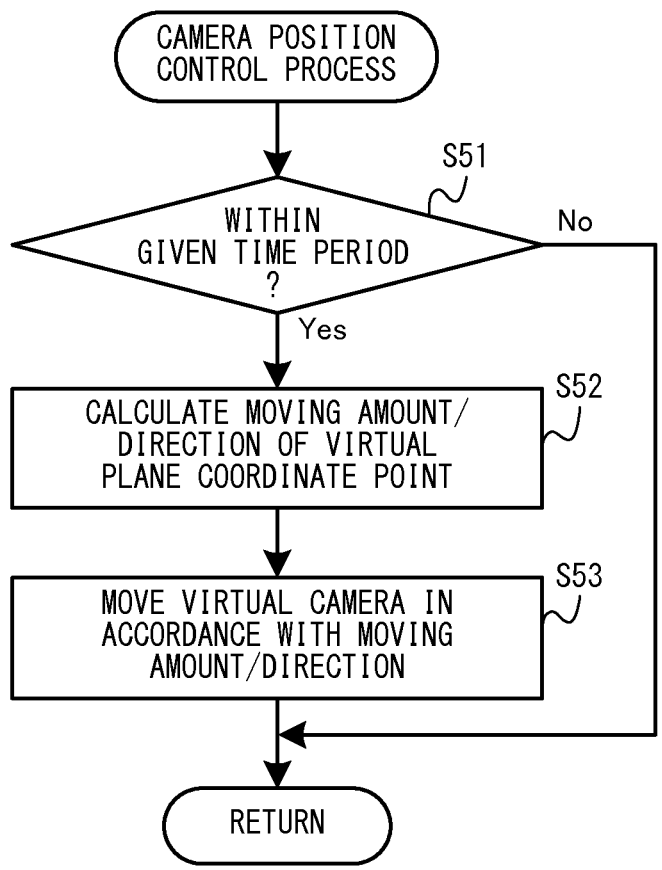
FIG. 26 is a flow chart showing a flow of a camera position control process (step S42) where the first control method is employed.

Referring next to FIG. 26, the first control method will be described in detail. FIG. 26 is a flow chart showing a flow of the camera position control process (step S42) where the first control method is employed. In this case, initially, in step S51, the CPU 10 determines whether or not the current time point falls within a given period of time in which to move the camera position. The given period of time is a period of time specified by the user, and in the present embodiment, it is a period of time in which the B button 32$i$ of the input device 8 is being pressed. Specifically, the CPU 10 refers to the operation button data 66 stored in the main memory, and determines whether or not the B button 32$i$ is being pressed. When the determination result of step S51 is affirmative, the processes of steps S52 and S53 are performed. On the other hand, when the determination result of step S51 is negative, the CPU 10 ends the camera position control process. That is, while the B button 32$i$ is not being pressed, the position of the virtual camera is not moved. In this manner, in the present embodiment, the CPU 10 moves the display range based on the virtual plane coordinate point only in the period of time specified by the user using the input device 8.

In step S52, the CPU 10 calculates the amount/direction of movement of the virtual plane coordinate point. The amount/direction of movement refers to the moving speed of the virtual plane coordinate point, and is calculated as a difference between the virtual plane coordinate point in the current process loop of steps S3 to S9 and the virtual plane coordinate point in the previous process loop. Specifically, the CPU 10 calculates a speed vector having the previous virtual plane coordinate point as a start point and the current virtual plane coordinate point as an end point. Following step S52, the process of step S53 is performed.

In step S53, the CPU 10 moves the virtual camera in accordance with the amount/direction of movement of the virtual plane coordinate point. In the present embodiment, the CPU 10 causes the position of the display target at which the cursor 93 points to remain the same before and after the movement of the virtual camera. Concretely, first, a vector (movement vector) Cv is calculated representing the amount and the direction by and in which the virtual camera is to be moved. When the speed vector calculated in step S52 is taken as (Vrx,Vry), the movement vector Cv=(Cvx,Cvy) is calculated in accordance with equation (18) below.

$$Cvx = Vrx$$

$$Cvy = Vry \quad (18)$$

As shown in equation (18), here, the virtual camera is moved such that the X'-axis in the plane Q of the first virtual space corresponds to the x"-axis in the second virtual space, and the Y'-axis in the plane Q of the first virtual space corresponds to the y"-axis in the second virtual space. Here, the X'Y'-coordinate system in the plane Q is equal in size to the x"y"z"-coordinate system in the second virtual space (the length of 1 in the X'Y'-coordinate system corresponds to the length of 1 in the x"y"z"-coordinate system).

Once the movement vector Cv is calculated, the virtual camera is moved in accordance with the movement vector Cv. Specifically, the CPU 10 reads the camera position data 80 from the main memory, and calculates a position obtained through movement by the movement vector Cv of the position indicated by the camera position data. The calculated position corresponds to the position of the moved virtual camera. Data indicating the calculated position is stored to the main memory as new camera position data 80. Following step S53, the CPU 10 ends the camera position control process.

According to the processes of steps S51 to S53, the virtual camera is moved by an amount/in a direction of movement corresponding to the amount/direction of movement of the virtual plane coordinate point. Therefore, according to the first control method, the user can move the display range in the direction of changing the orientation of the input device 8 by an amount corresponding to the angle of change (FIG. 25). In the first control method, the amount of change of the input device 8 corresponds to the amount of movement of the display range, and therefore when the first control method is employed, the user can control the amount of movement of the display range in detail. Therefore, the first control method is particularly effective when it is necessary to adjust the amount of movement of the display range in detail and control the position of the display range with accuracy.

Also, in the present embodiment, the position of the display target at which the cursor 93 points is not changed by the above-described process, and therefore the process can move the display range without changing the target at which the cursor 93 points. Note that in another embodiment, the position of the display target at which the cursor 93 points does not have to remain the same before and after the movement of the virtual camera.

Also, in the present embodiment, the CPU 10 performs the process for moving the virtual camera only in a given period of time specified by the user, and therefore, the virtual camera is not moved in any periods of time other than the given period of time. Accordingly, as will be described in detail later, in periods of time other than the given period of time, only the position of the cursor on the screen is controlled in accordance with the operation of the input device 8. Thus, in the present embodiment, the operation of the input device 8 can be used for controlling both the virtual camera (movement of the display range) and the cursor. The user can move both the cursor and the display range using the input device 8, and therefore the present embodiment makes it possible to provide an operation method which significantly facilitates easy operation.

Note that in step S51, the given period of time is a period of time during which the B button 32$i$ of the input device 8 is being pressed, but in another embodiment, it may be any period of time specified by the user. For example, the given period of time may be a period of time after an operation by the user but before a subsequent operation (e.g., a period of time after the B button 32$i$ is pressed but before the next time the B button 32$i$ is pressed), or it may be a period of time after an operation by the user but before a predetermined given period of time passes.

Figure 27:
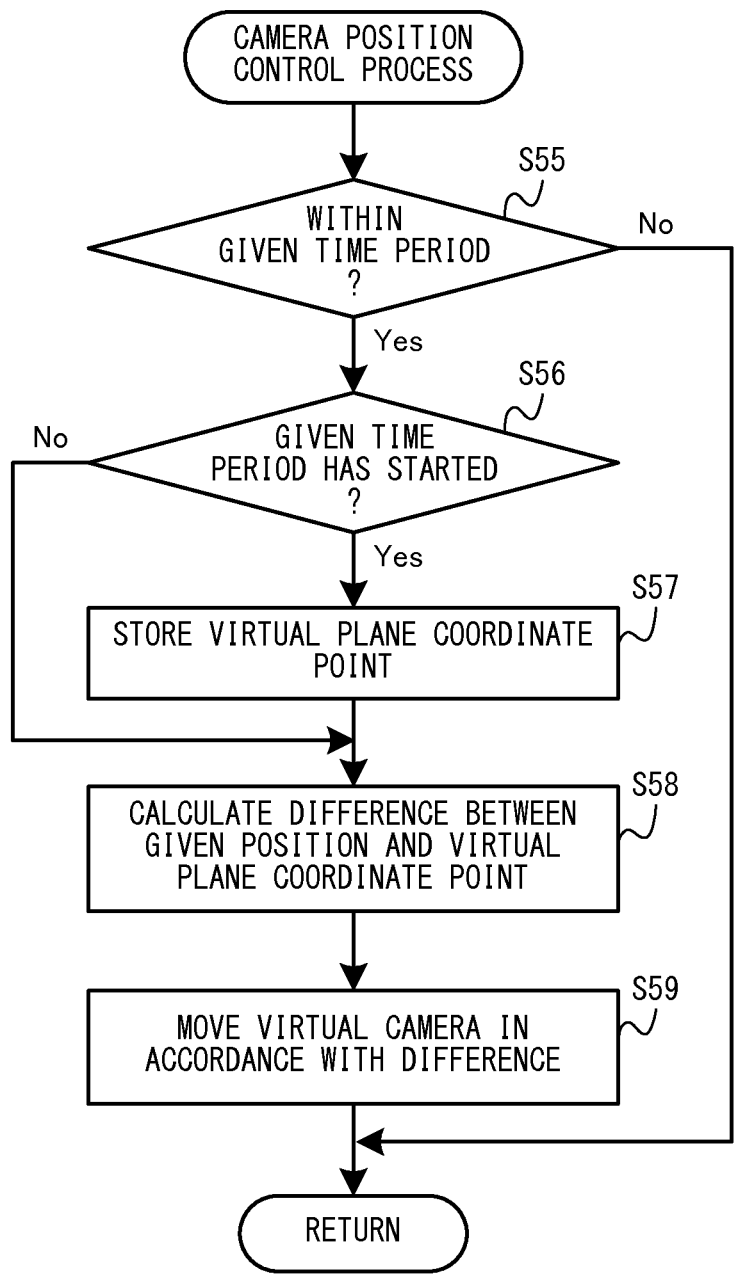
FIG. 27 is a flow chart showing a flow of a camera position control process (step S42) where the second control method is employed.

Referring next to FIG. 27, the second control method will be described in detail. FIG. 27 is a flow chart showing a flow of a camera position control process (step S42) where the second control method is employed. In this case, initially, in step S55, the CPU 10 determines whether or not the current time point falls within a given period of time in which to move the camera position. The process of step S55 is the same as that of step S51. When the determination result of step S55 is affirmative, the processes of steps S56 and S57 are performed. On the other hand, when the determination result of step S55 is negative, the CPU 10 ends the camera position control process.

In step S56, the CPU 10 determines whether or not the given period of time has started. The determination of step S56 can be made with reference to the determination result of step S55 in the previous process loop. Specifically, when the determination result of step S55 in the previous process loop is negative, the given period of time can be determined to have started in the current process loop. When the determination result of step S56 is affirmative, the process of step S57 is performed. On the other hand, when the determination result of step S56 is negative, the process of step S57 is skipped and the process of step S58 is performed.

In step S57, the CPU 10 stores the virtual plane coordinate point calculated in step S7 to the main memory as a coordinate point indicating a given reference position. In this manner, in the present embodiment, the position of the virtual plane coordinate point at the time when the given period of time has started is set as the given reference position. Note that in another embodiment, the given reference position may be predetermined, and for example, the position of the projection point T may be set as the given reference position. Following step S57, the process of step S58 is performed.

In step S58, the CPU 10 calculates the difference between the given reference position and the position indicated by the virtual plane coordinate point. Concretely, the CPU 10 reads data stored in step S57, which indicates the given reference position, and the virtual plane coordinate data 77 from the main memory. Then, the difference is calculated by subtracting a coordinate value representing the given reference position from the value for the virtual plane coordinate point. Following step S58, the process of step S59 is performed.

In step S59, the CPU 10 moves the virtual camera in accordance with the difference calculated in step S58. Concretely, first, a movement vector Cv is calculated as in step S53. In the second control method, the movement vector Cv=(Cvx,Cvy) is calculated in accordance with equation (19) below.

$$Cvx = \Delta x \times K2$$

$$Cvy = \Delta y \times K2 \qquad (19)$$

In equation (19), variable Δx is the X'-component of the difference, and variable Δy is the Y'-component of the difference. Constant K2 is predetermined. Note that the moving speed of the virtual camera increases with constant K2. Also, according to equation (19), when the difference is excessively significant, the movement vector Cv becomes excessively significant as well, so that the display range might move excessively fast. Accordingly, in another embodiment, an upper limit may be set for the movement vector Cv, and the CPU 10 may correct the movement vector Cv so as not to exceed the upper limit.

Once the movement vector Cv is calculated, the virtual camera is moved in accordance with the movement vector Cv. In step S59, the position of the moved virtual camera is calculated based on the movement vector Cv in the same manner as in step S53. Data indicating the calculated position of the moved virtual camera is stored to the main memory as new camera position data 80. Following step S59, the CPU 10 ends the camera position control process.

According to the processes of steps S55 to S59, the virtual camera is moved by an amount/in a direction of movement corresponding to the difference between the given reference position and the virtual plane coordinate point. Therefore, according to the second control method, the user can move the display range in a direction to which the orientation of the input device 8 is changed from the reference orientation (of the input device 8) corresponding to the reference position, and at a speed corresponding to the amount of change (FIG. 25). In the second control method, the user can move the display range while keeping the input device 8 still, so long as the input device 8 is tilted from the reference orientation. Thus, the second control method is particularly effective when the display range needs to be moved by a large amount because the display target is extremely large.

Also, in the second control method of the present embodiment, the CPU 10 performs the process for moving the virtual camera only in the given period of time specified by the user as in the first control method. Accordingly, also in the case where the second control method is employed, the user can move both the cursor and the display range using the input device 8, resulting in an operation method that facilitates easy operation.

Figure 28:
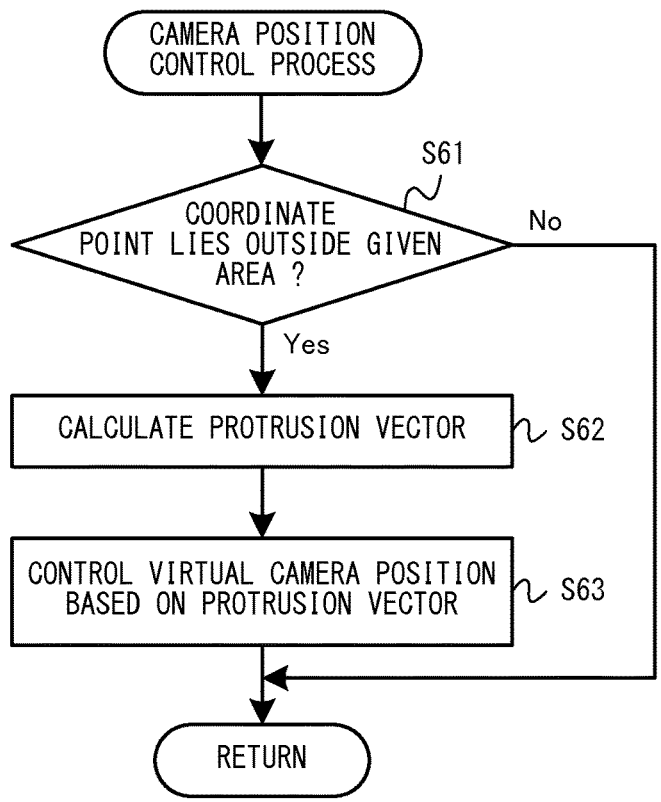
FIG. 28 is a flow chart showing a flow of a camera position control process (step S42) where the third control method is employed.

Referring next to FIG. 28, the third control method will be described in detail. FIG. 28 is a flow chart showing a flow of a camera position control process (step S42) where the third control method is employed. In this case, initially, in step S61, the CPU 10 determines whether or not the virtual plane coordinate point lies outside the given area Ar. The process of step S61 is the same as that of step S46. When the determination result of step S61 is affirmative, the process of step S62 is performed. When the determination result of step S61 is negative, the CPU 10 ends the camera position control process. That is, in the third control method, the virtual camera is controlled such that the display range moves only when the virtual plane coordinate point lies outside the given area Ar, as in the virtual camera direction control process (steps S46 to S48).

In step S62, the CPU 10 calculates a protrusion vector Vd. The process of step S62 is the same that of step S47. In step S63 following step S62, the CPU 10 controls the position of the virtual camera based on the protrusion vector Vd. In the third control method, the virtual camera is moved in a direction corresponding to the direction of the protrusion vector Vd at a speed (by an amount of movement) corresponding to the magnitude of the protrusion vector Vd. Concretely, the CPU 10 calculates the movement vector Cv=(Cvx,Cvy) in accordance with equation (20) below.

$$Cvx = dx \times K3$$

$$Cvy = dy \times K3 \qquad (20)$$

In equation (20), variables dx and dy are the X'- and Y'-components, respectively, of the protrusion vector Vd. Also, constant K3 is predetermined. Note that the moving speed of the virtual camera increases with constant K3.

After calculating the movement vector Cv, the CPU 10 moves the virtual camera in accordance with the movement vector Cv. The position of the moved virtual camera is calculated based on the movement vector Cv in the same manner as in, for example, step S53. Data indicating the calculated position of the moved virtual camera is stored to the main memory as new camera position data 80. Following step S63, the CPU 10 ends the camera position control process.

As described above, according to the processes of steps S61 to S63, when the virtual plane coordinate point lies outside the given area Ar, the virtual camera is moved in a direction corresponding to the direction from the given area Ar toward the virtual plane coordinate point. Accordingly, in the third control method, the user can move the display range by controlling the input device 8 to be directed outside the screen of the television 2 (see FIG. 25), as in the virtual camera direction control process (steps S46 to S48).

Also, according to the processes of steps S61 to S63, the amount of movement of the virtual camera (the magnitude of the movement vector Cv) is determined in accordance with the distance from the given area Ar to the virtual plane coordinate point (the magnitude of the protrusion vector Vd). Accordingly, the virtual camera moves even when the virtual plane coordinate point is static, and therefore the user can move the display range without moving the input device 8 (so long as the input device 8 is directed outside the screen). Thus, as with the second control method, the third control method is particularly effective, for example, when the display range needs to be moved by a large amount because the display target is significantly large.

Note that in the third control method of the present embodiment, the CPU 10 determines the moving speed of the display range (the amount of movement per unit time) based on the degree to which the virtual plane coordinate point is distanced from the given area Ar. Here, in another embodiment, the CPU 10 may determine the amount of movement of the display range based on that degree. Specifically, the CPU 10 may move the display range by an amount corresponding to the aforementioned degree when the virtual plane coordinate point exits the given area Ar, and may stop moving the display range when the virtual plane coordinate point stops moving.

Figure 29:
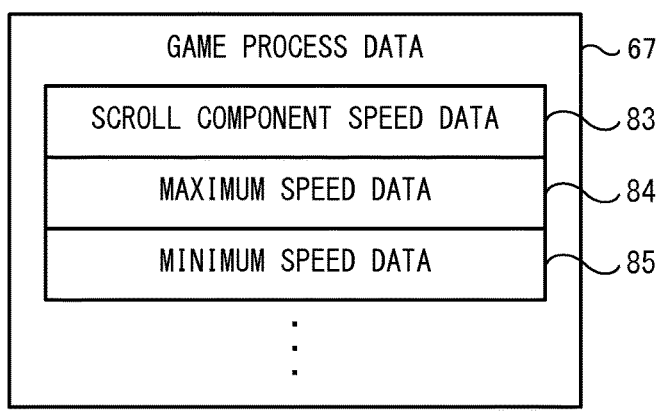
FIG. 29 is a diagram showing game process data to be stored to a main memory of the game apparatus where the fourth control method is employed.
Figure 30:
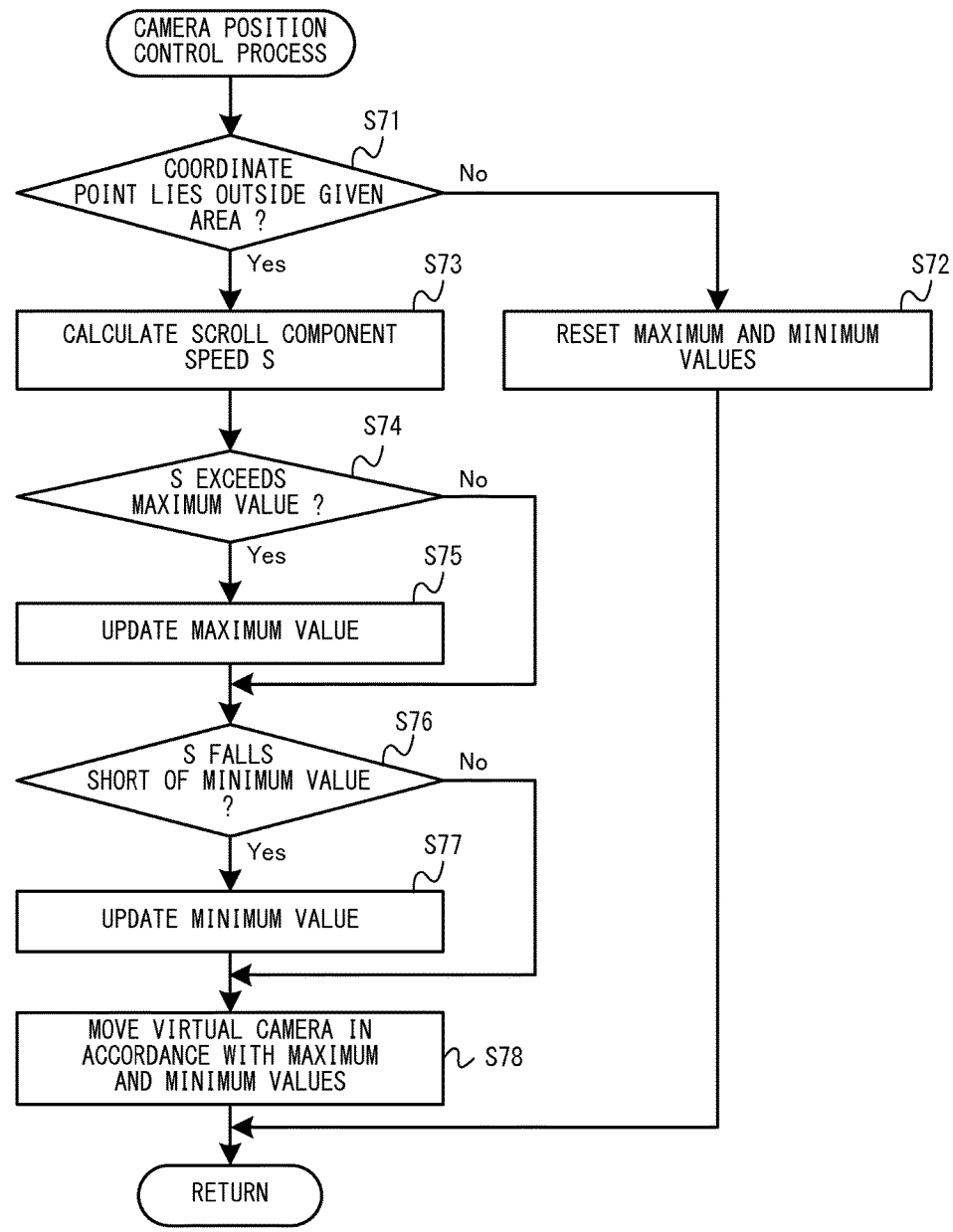
FIG. 30 is a flow chart showing a flow of a camera position control process (step S42) where the fourth control method is employed.
Figure 31:
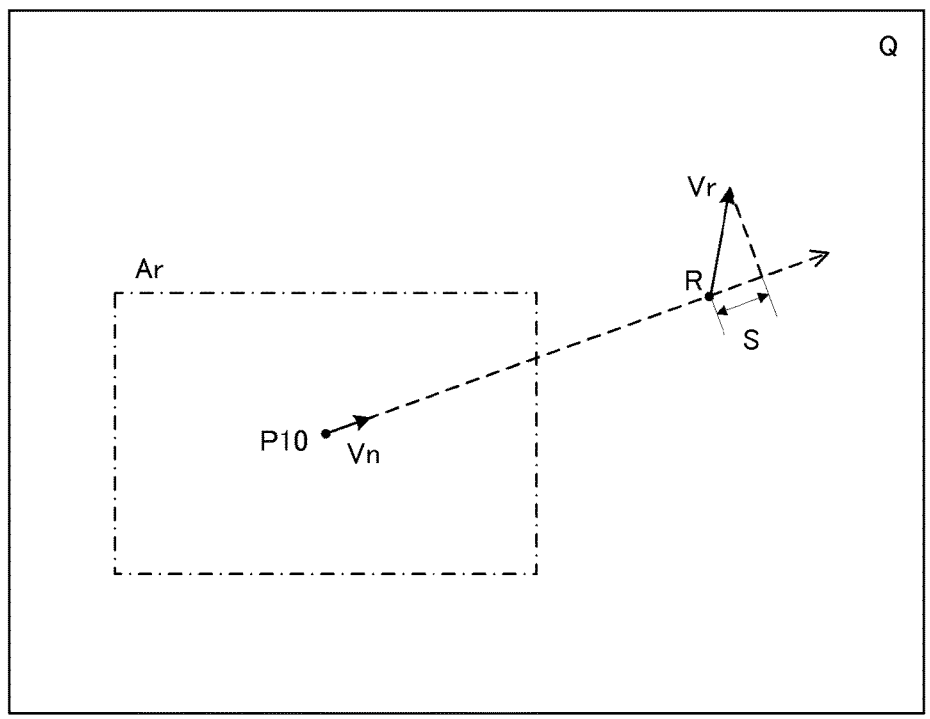
FIG. 31 is a diagram illustrating a scroll component speed S in the plane Q.

Referring next to FIGS. 29 to 31, the fourth control method will be described in detail. FIG. 29 is a diagram showing the game process data 67 to be stored to the main memory of the game apparatus 3 where the fourth control method is employed. Although omitted in FIG. 29, the data shown in FIG. 13 is also stored in the main memory when the fourth control method is employed.

As shown in FIG. 29, when the fourth control method is employed, the game process data 67 further includes, in addition to the data shown in FIG. 13, scroll component speed data 83, maximum speed data 84, and minimum speed data 85.

The scroll component speed data 83 is data indicating a scroll component speed S of the virtual plane coordinate point. Here, the scroll component speed S of the virtual plane coordinate point represents the level of a component (referred to as a "scroll component") of the moving speed of the virtual plane coordinate point in the direction from the given area Ar toward the virtual plane coordinate point (see FIG. 31). As will be described in detail, in the present embodiment, the direction from the given area Ar toward the virtual plane coordinate point corresponds to the moving direction of the display range, i.e., the direction in which the image is scrolled up/down. Accordingly, in the following descriptions, the direction from the given area Ar toward the virtual plane coordinate point is referred to as the "scrolling direction".

The maximum speed data 84 is data indicating the maximum value of the scroll component speed S during a period of time in which the virtual plane coordinate point lies outside the given area Ar. Also, the minimum speed data 85 indicates the minimum value of the scroll component speed S during the same period of time. Note that the maximum and minimum values are erased (reset) when the virtual plane coordinate point enters the given area Ar.

FIG. 30 is a flow chart showing a flow of a camera position control process (step S42) where the fourth control method is employed. In this case, initially, in step S71, the CPU 10 determines whether or not the virtual plane coordinate point lies outside the given area Ar. The process of step S71 is the same as that of step S46. When the determination result of step S71 is negative, the process of step S72 is performed. On the other hand, when the determination result of step S71 is affirmative, the process of step S73 to be described later is performed.

In step S72, the CPU 10 resets the maximum and minimum values Smax and Smin of the scroll component speed. Concretely, the CPU 10 stores data indicating "0" to the main memory as maximum speed data 84, and also stores another piece of data indicating "0" as minimum speed data 85. Note that when the process of step S72 has already been performed as well during the previous process loop (when the values indicated by the maximum speed data 84 and the minimum speed data 85 have already been set to "0"), the process of step S72 may be omitted in the current process loop.

Following step S72, the CPU 10 ends the camera position control process. That is, when the virtual plane coordinate point lies inside the given area Ar, the process for controlling the position of the virtual camera (step S78) is not performed, so that the display range is not moved. In this manner, in the fourth control method, the virtual camera is controlled such that the display range is moved only when the virtual plane coordinate point lies outside the given area Ar, as in the virtual camera direction control process (steps S46 to S48).

On the other hand, in step S73, the CPU 10 calculates the scroll component speed S. The scroll component speed S is calculated based on the position and the moving speed of the virtual plane coordinate point, as well as the given area Ar. Referring to FIG. 31, a method for calculating the scroll component speed S will be described below.

FIG. 31 is a diagram illustrating the scroll component speed S in the plane Q. Note that in FIG. 31, a vector Vn represents the scrolling direction, and a vector Vr represents the moving speed of the virtual plane coordinate point. In step S73, the scrolling direction vector Vn is calculated first. The scrolling direction vector Vn is a unit vector directed from point P10 (projection point T at the origin of the X'Y'-coordinate system) toward point R represented by the virtual plane coordinate point. Note that the scrolling direction vector Vn may be any vector representing the direction of the virtual plane coordinate point with respect to the given area Ar. For example, in another embodiment, the scrolling direction vector Vn may be calculated so as to represent a direction toward the virtual plane coordinate point from the midpoint of one of four sides of the given area Ar that is closest to the virtual plane coordinate point.

Following the calculation of the scrolling direction vector Vn, the scroll component speed S is calculated. As shown in FIG. 31, the scroll component speed S represents the level of a component of the moving speed (vector Vr) of the virtual plane coordinate point in the scrolling direction (i.e., the direction of the vector Vn). Specifically, where the scrolling direction vector Vn=(nx,ny) and the moving speed of the virtual plane coordinate point Vr=(Vrx,Vry), the scroll component speed S is calculated in accordance with equation (21) below.

$$S = nx \times Vrx + ny \times Vry \tag{21}$$

Data indicating the scroll component speed S calculated in accordance with equation (21) is stored to the main memory as scroll component speed data 83. Note that as is apparent from FIG. 31 and equation (21), the scroll component speed S takes a positive value when the virtual plane coordinate point is moving away from the given area Ar and a negative value when the virtual plane coordinate point is moving toward the given area Ar. Following step S73, the process of step S74 is performed.

In step S74, the CPU 10 determines whether or not the scroll component speed S calculated in step S73 exceeds the maximum value Smax. Specifically, the CPU 10 reads the scroll component speed data 83 and the maximum speed data 84 from the main memory, and compares the scroll component speed S to the maximum value Smax. When the determination result of step S73 is affirmative, the process of step S75 is performed. On the other hand, when the determination result of step S73 is negative, the process of step S75 is skipped, and the process of step S76 is performed.

In step S75, the CPU 10 updates the maximum value Smax of the scroll component speed S. Specifically, the maximum value Smax is updated to the value of the scroll component speed S calculated in the current process loop. Concretely, the CPU 10 stores data indicating the same value as the scroll component speed data 83 to the main memory as new maximum speed data 84. Following step S75, the process of step S76 is performed.

In step S76, the CPU 10 determines whether or not the scroll component speed S calculated in step S73 falls short of the minimum value Smin. Specifically, the CPU 10 reads the scroll component speed data 83 and the minimum speed data 85 from the main memory, and compares the scroll component speed S to the minimum value Smin. When the determination result of step S76 is affirmative, the process of step S77 is performed. On the other hand, when the determination result of step S76 is negative, the process of step S77 is skipped, and the process of step S78 is performed.

In step S77, the CPU 10 updates the minimum value Smin of the scroll component speed S. Specifically, the minimum value Smin is updated to the value of the scroll component speed S calculated in the current process loop. Concretely, the CPU 10 stores data indicating the same value as the scroll component speed data 83 to the main memory as new minimum speed data 85. Following step S77, the process of step S78 is performed.

In step S78, the CPU 10 moves the virtual camera in accordance with the maximum and minimum values Smax and Smin. In the fourth control method, the virtual camera is moved in a direction corresponding to the scrolling direction at a speed (by an amount of movement) corresponding to the sum of the maximum and minimum values Smax and Smin. Specifically, in the fourth control method, the movement vector Cv=(Cvx,Cvy) is calculated in accordance with equation (22) below.

$$Cvx = nx \times (Smax+Smin)$$

$$Cvy = ny \times (Smax+Smin) \quad (22)$$

As is apparent from equation (22), the movement vector Cv points to a direction corresponding to the scrolling direction vector Vn=(nx,ny), and has a magnitude corresponding to the sum of the maximum and minimum values Smax and Smin. Note that in another embodiment, the direction of the movement vector Cv may be equal to the moving direction of the virtual plane coordinate point. However, when the movement vector Cv is oriented in the same direction as the moving direction of the virtual plane coordinate point, the direction of the input device 8 with respect to the screen does not match the moving direction of the display range, and therefore the user might perceive the operation to be unnatural. On the other hand, in the present embodiment, the display range is moved in a direction corresponding to the direction of the virtual plane coordinate point with respect to the given area Ar, so that the direction of the input device 8 with respect to the screen can correspond to the moving direction of the display range, resulting in improved operability.

After calculating the movement vector Cv, the CPU 10 moves the virtual camera in accordance with the movement vector Cv. The position of the moved virtual camera is calculated based on the movement vector Cv in the same manner as in steps S53 and S59. Data indicating the calculated position of the moved virtual camera is stored to the main memory as new camera position data 80. Following step S78, the CPU 10 ends the camera position control process.

As described above, according to the processes of steps S71 to S78, when the virtual plane coordinate point exits the given area Ar, the virtual camera is moved in a direction corresponding to the direction from the given area Ar toward the virtual plane coordinate point. Accordingly, in the fourth control method, the user can move the display range by controlling the input device 8 to be directed outside the screen of the television 2 (see FIG. 25), as in the virtual camera direction control process (steps S46 to S48).

Note that according to equation (22) in step S78, when the aforementioned sum takes a negative value, the movement vector Cv points to a direction opposite to the scrolling direction vector Vn, and therefore the display range is moved in a direction opposite to the moving direction for the case where the sum takes a positive value. That is, when the sum takes a negative value, the direction of the input device 8 (where the direction toward the television 2 is the forward direction) is opposite to the moving direction of the display range. For example, when the user directs the input device 8 to the right of the screen, the display range is moved leftward. Accordingly, when the sum takes a negative value, the user might perceive the operation to be unnatural. Therefore, in step S78, the CPU 10 may set the movement vector Cv to "0" when the sum takes a negative value. That is, when the sum takes a negative value, the display range may be stopped from moving. As a result, the input device 8 is not directed in a direction opposite to the moving direction of the display range, and therefore the user can be prevented from perceiving the operation to be unnatural.

Also, according to the processes of steps S71 to S78, the amount of movement of the virtual camera (the magnitude of the movement vector Cv) is determined based on the sum of the maximum and minimum values Smax and Smin of the scroll component speed S, rather than directly based on the moving speed of the virtual plane coordinate point. Therefore, the virtual camera is moved even when the virtual plane coordinate point is static, so that the user can move the display range without moving the input device 8 (so long as the input device 8 is directed outside the screen). Thus, as with the second control method, the fourth control method is particularly effective when the display range needs to be moved by a large amount because the display target is significantly large.

Note that in the processes of steps S71 to S78, the determination as to whether or not the virtual plane coordinate point lies outside the given area Ar is made within a two-dimensional plane of the X'Y'-coordinate system. Here, in another embodiment, the determination may be made independently for each of the X'- and Y'-axes. For example, when the virtual plane coordinate point lies outside the given area Ar with respect to the X'-axis direction but inside the given area Ar with respect to the Y'-axis direction, the CPU 10 may move the virtual camera in a direction (x"-axis direction) corresponding to the X'-axis direction but not in a direction (y"-axis direction) corresponding to the Y'-axis direction.

Here, in the third control method, the moving speed of the display range is a speed corresponding to the distance from the given area Ar to the virtual plane coordinate point. Therefore, when the display range starts moving (i.e., immediately after the virtual plane coordinate point exits the given area Ar), the moving speed always takes a value close to 0. Thus, when the user is moving the input device 8 rapidly, a gap occurs between the rapid movement of the input device 8 and the moving speed of the display range, so that the user might perceive the operation to be unnatural at the beginning of the movement of the display range.

On the other hand, according to the fourth control method, when the display range starts moving, the moving speed of the display range roughly approximates the moving speed of the virtual plane coordinate point at that time point. That is, when moving the display range, if the user moves the input device 8 rapidly, the display range moves rapidly as well, and if the user moves the input device 8 slowly, the display range moves slowly as well. Accordingly, no gap occurs between the rapid movement of the input device 8 and the moving speed of the display range, and therefore the user does not perceive the operation to be unnatural at the beginning of the movement of the display range. In this manner, the fourth control method makes it possible to provide a more user-friendly operation method. In particular, when a cursor is displayed in a position on the screen in accordance with the virtual plane coordinate point (step S43 to be described later), as in the present embodiment, the moving speed of the cursor is the same before and after the start of the movement of the display range. Therefore, the user is enabled to experience natural and smooth switching from the state where the cursor moves on the screen to the state where the display range moves, so that the user can feel more comfortable about operation.

Also, in the third control method, when the user wishes to move the display range at low speed, the input device 8 needs to be static while being oriented such that the virtual plane coordinate point lies slightly outside the given area Ar, which makes the operation difficult. On the other hand, according to the fourth control method, when the user wishes to move the display range at low speed, the user is simply required to slowly change the orientation of the input device 8, and therefore the display range can be readily moved at low speed.

Note that in the fourth control method of the present embodiment, the CPU 10 determines the moving speed of the display range based on the scroll component speed S. Here, in another embodiment, the CPU 10 may determine the amount of movement of the display range based on the scroll component speed S. Specifically, when the virtual plane coordinate point exits the given area Ar, the CPU 10 moves the display range by an amount corresponding to the sum of the maximum and minimum values Smax and Smin of the scroll component speed S, and when the virtual plane coordinate point stops moving, the display range may be stopped from moving.

Also, in the fourth control method of the present embodiment, the CPU 10 determines the degree to which the display range is changed (the moving speed of the display range) based on the scroll component speed S. Here, in another embodiment, the CPU 10 may determine that degree using any method so long as it is determined based on the moving speed of the virtual plane coordinate point positioned outside the given area Ar. For example, the aforementioned degree may be determined in accordance with the maximum value Smax of the scroll component speed S. Alternatively, the degree may be determined in accordance with the scroll component speed S or the moving speed of the virtual plane coordinate point (in this case, the display range is stopped from moving when the virtual plane coordinate point stops moving).

Also, in the fourth control method of the present embodiment, the CPU 10 determines the moving speed of the display range in accordance with the maximum and minimum values of the scroll component speed S during a period of time in which the virtual plane coordinate point lies outside the given area Ar. Here, the period of time in which the maximum and minimum values of the scroll component speed S are determined does not have to span the entire period of time in which the virtual plane coordinate point lies outside the given area Ar, and may only constitute a part of such a period of time. For example, the CPU 10 may determine the maximum and minimum values from among values of the scroll component speed S within a (predetermined) given period of time since the virtual plane coordinate point has exited the given area Ar. This also results in no gap between the rapid movement of the input device 8 and the moving speed of the display range, as in the above embodiment, and therefore the user can be prevented from perceiving the operation to be unnatural at the beginning of the movement of the display range.

While four control methods have been described above by way of example of the camera position control process in step S42, positional control of the virtual camera is not limited to these control methods. The camera position control process may be performed by any method so long as the position of the virtual camera is controlled using the virtual plane coordinate point.

Also, in the above embodiment, both the direction and the position of the virtual camera are controlled (steps S41 and S42), but in another embodiment, only one of the direction and the position of the virtual camera may be controlled. That is, the CPU 10 may perform only one of steps S41 and S42.

Also, in the camera direction control process (step S41) of the above embodiment, the CPU 10 controls the direction of the virtual camera based on the degree to which the virtual plane coordinate point is distanced from the given area Ar, but in another embodiment, the direction of the virtual camera may be controlled based on other information about the virtual plane coordinate point. For example, the direction of the virtual camera may be controlled in accordance with: (1) the amount and the direction of movement of the virtual plane coordinate point, as in the first control method; (2) the difference between a given reference position and a position indicated by the virtual plane coordinate point, as in the second control method; or (3) the moving speed of the virtual plane coordinate point positioned outside the given area Ar, as in the fourth control method. That is, in another embodiment, the display range may be changed by controlling the direction of the virtual camera, rather than by controlling the position of the virtual camera as is controlled in the first, second, and fourth control methods.

Also, in the above embodiment, the CPU 10 controls the display range using only the orientation of the input device 8 (virtual plane coordinate point), but in another embodiment, in addition to information about the orientation of the input device 8, the display range may be controlled using information obtained by another input method. For example, the CPU 10 may control the display range additionally using operation data concerning the cross button 32a of the input device 8. Concretely, in the display control process shown in FIG. 20, the process for controlling the position of the virtual camera may be performed in accordance with a directional instruction using the cross button 32a, instead of performing the camera position control process of step S42. More specifically, in the above process, the CPU 10 may control the position of the virtual camera such that the display range moves in a direction in accordance with a pressed portion of the cross button 32a, i.e., any of the up, down, left, and right keys. This allows the user to change the position of the virtual camera using the cross button 32a, and also to change the direction of the virtual camera by changing the direction of the input device 8. That is, the display range can be changed using two methods, and therefore the display range can be adjusted more freely, resulting in improved operability.

Note that the input method used for controlling the display range together with the input method using the orientation of the input device 8 is not limited to the input method using the cross button 32a, and another input method may be used. However, the input method preferably uses operation means provided in the input device 8. This allows the user to use only one hand to perform both the operation to change the orientation of the input device 8 and the operation of the operation means. For example, the input device 8 may include operation means such as a stick and a touch pad, in place of the cross button 32a, and the CPU 10 may control the display range in accordance with a direction instruction through such operation means. Also, in another embodiment, the CPU 10 may control the position of the virtual camera based on the virtual plane coordinate point, and may also control the direction of the virtual camera in accordance with a directional instruction through the operation means.

Returning to the description of FIG. 20, in step S43, the CPU 10 calculates a position (cursor position) in which to display the cursor on the screen of the television 2 based on the virtual plane coordinate point. In the present embodiment, the cursor position is calculated such that the given area Ar in the plane Q within the first virtual space corresponds to the screen area of the television 2. That is, the CPU 10 calculates the cursor position such that the positional relationship of the virtual plane coordinate point with respect to the given area Ar is equalized with the positional relationship of the cursor position with respect to the screen area. Note that when the virtual plane coordinate point lies outside the given area Ar, the CPU 10 may identify a position around the given area Ar that is closest to the virtual plane coordinate point, and may calculate a position at the edge of the screen that corresponds to the identified position as the cursor position. Data indicating the calculated cursor position is stored to the main memory as cursor position data 81. Following step S43, the process of step S44 is performed.

In step S44, the CPU 10 generates an image of the display target to be displayed on the television 2 based on the position and the direction of the virtual camera. Concretely, the CPU 10 generates the image of the display target by performing a conversion process, such as perspective projection conversion, on the display target using the position of the virtual camera as a viewpoint position and the direction of the virtual camera as a sightline direction. As a result, the display range is determined using the virtual camera since the generated image represents a portion of the display target. The image generated in step S44 is displayed on the screen of the television 2.

Also, the CPU 10 displays an image of the cursor in the cursor position overlapping with the image of the display target. The cursor is displayed in the position corresponding to the orientation of the input device 8, and therefore the player can perform an operation of moving the cursor by changing the orientation of the input device 8. Note that when the virtual plane coordinate point lies outside the given area Ar, the CPU 10 may or may not display the cursor. For example, when any of the second to fourth control methods is employed in the process of step S42, the CPU 10 may display the cursor at the edge of the screen such that the user can readily recognize the moving direction of the display range. On the other hand, in the case where the first control method is employed in the process of step S42, if the cursor is displayed at the edge of the screen when the virtual plane coordinate point lies outside the given area Ar, the position of the display target at which the cursor points changes. Accordingly, in such a case, the CPU 10 may display no cursor (as if the cursor lies outside the screen). Note that in the case where the second control method is employed in the process of step S42, the CPU 10 may display a vector (the arrow 94 shown in FIG. 25) representing the difference between the reference position and the virtual plane coordinate point, such that the user can readily recognize the moving direction of the display range. Following step S44, the process of step S45 is performed.

In step S45, the CPU 10 performs a game process based on the cursor position. For example, when a given operation (e.g., an operation of pressing a given button of the input device 8) is performed with the cursor pointing at a button image representing a given instruction, the CPU 10 performs a game process in accordance with the given instruction. Note that the game process in step S45 may be any process so long as the cursor position is used as a user input. For example, the game process may be a process for drawing a line along the movement trajectory of the cursor position. Step S45 allows the user to use the input device 8 as a pointing device for specifying a position on the screen.

Note that in another embodiment, the game process in step S45 may be any process so long as it reflects the two-dimensional coordinate point in game results as an input value. For example, the game process may be a process for moving an object within a virtual game space to a position in the game space that corresponds to the two-dimensional coordinate point or a process for controlling the object to be displayed while moving at a speed in accordance with the magnitude and the direction of a two-dimensional vector represented by the two-dimensional coordinate point. Following step S45, the CPU 10 ends the display control process shown in FIG. 20.

Following the display control process (step S8), in step S9, the CPU 10 determines whether or not the game is to be ended. The determination of step S9 is performed based on, for example, whether or not the game has been cleared, whether or not the game is over, or whether or not the player has given an instruction to stop the game. When the determination result of step S9 is negative, the process of step S3 is performed again. Thereafter, the process loop of steps S3 to S9 is repeated until it is determined in step S9 that the game is to be ended. On the other hand, when the determination result of step S9 is affirmative, the CPU 10 ends the game process shown in FIG. 14. This is the end of the description of the game process.

As described above, in the present embodiment, the first orientation of the input device 8 is calculated based on the angular rates detected by the gyroscopes 55 and 56 (step S4), and the first orientation is corrected in the first correction process (S5) and the second correction process (S6). The game process is performed using the corrected first orientation (steps S7 and S8), and therefore the CPU 10 is allowed to perform the game process based on an accurate orientation of the input device 8. Therefore, for example, the orientation of the input device 8 can be accurately reflected in the position of the cursor on the screen, which enhances the operability of the game.

[Second Method for Calculating the Coordinate Point]

Hereinafter, referring to FIGS. 32 to 37, a description will be given regarding the second method in which a position on the screen is calculated from an orientation of the input device 8. Note that in the above embodiment, the game process may be performed using the second method to be described below, rather than using the first method as described earlier. Also, in the following descriptions, a coordinate point in the plane Q within the virtual space will be referred to as a "first coordinate point", a coordinate point indicating a position on the screen to be calculated from the first coordinate point will be referred to as a "screen coordinate point", and a coordinate (to be described in detail later) indicating a position on the screen to be calculated from the marker coordinate point will be referred to as a "second coordinate point".

Figure 32:
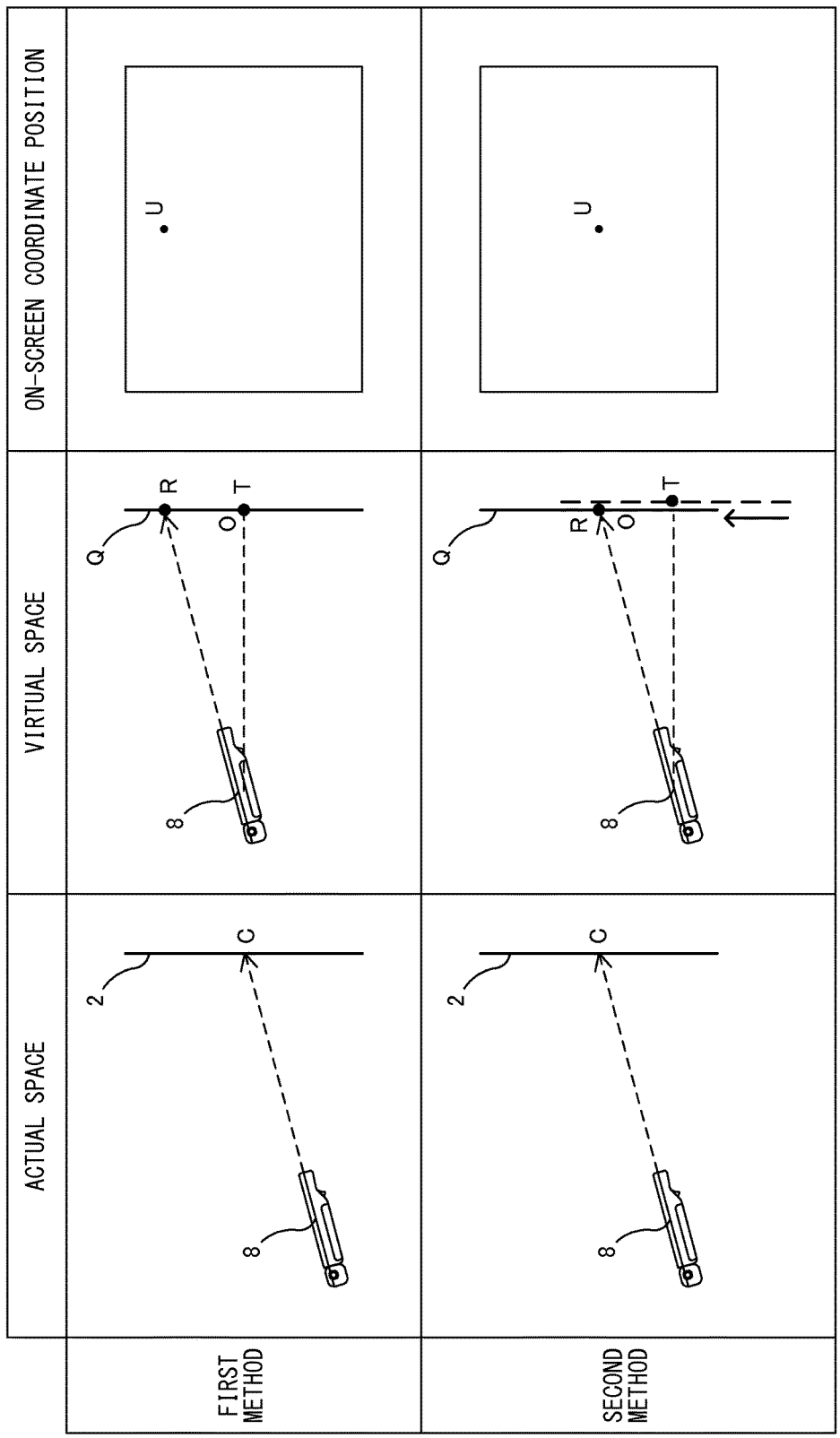
FIG. 32 is a diagram illustrating comparison between first and second methods.

FIG. 32 is a diagram illustrating comparison between the first and second methods. In FIG. 32, by way of example, the input device 8 in an actual space is positioned below the center of the screen of the television 2, and a position on the screen (hereinafter, referred to as a "specified position (of the input device)") at which the Z-axis direction of the input device 8 points corresponds to the center of the screen (see the upper left column of FIG. 32).

In the first method, the coordinate system for the first coordinate point (the X'Y'-coordinate system in the plane Q within the virtual space) always has its origin O located at the projection point T at which the position of the input device 8 is projected onto the plane Q. Specifically, the first coordinate point is calculated so as to take the origin (0,0) when the Z-axis direction of the input device 8 is oriented horizontally (when the Z-axis direction points at the projection point T). Accordingly, when the Z-axis direction of the input device 8 points slightly upward as shown in FIG. 32, the position R of the first coordinate point is above the origin O (see the upper center column of FIG. 32). As a result, the position U of the screen coordinate point that is calculated from the first coordinate point is above the center of the screen (see the upper right column of FIG. 32).

In the case shown in FIG. 32 for the first method, while the Z-axis direction of the input device 8 in actuality (in the actual space) points at the center of the screen, the position on the screen is calculated as a position above the center. In this manner, in the case of the first method, a deviation occurs between the position at which the user points using the input device 8 (the specified position of the input device) and the position of the calculated screen coordinate point, so that the user might perceive the operation to be unnatural.

Note that, in actuality, the height of the input device 8 relative to the screen is expected to vary depending on, for example, the situation where the television 2 is installed (e.g., whether it is placed on the floor or on a cabinet) or the state of the user using the input device 8 (e.g., whether the input device 8 is used while standing or sitting). When the height changes, the relationship between the specified position and the orientation of the input device 8 changes, and the orientation of the input device 8 where the specified position of the input device 8 corresponds to the center of the screen also changes. However, in the case of the first method, the origin of the X'Y'-coordinate system is fixed in position without considering the specified position of the input device 8, and therefore the position on the screen cannot be calculated appropriately, so that the user might perceive the operation using the input device 8 to be unnatural.

Therefore, in the second method, the game apparatus 3 corrects the first coordinate point calculated by the first method such that a predetermined value (specifically, (0,0)) is taken when the input device 8 is oriented with its Z-axis direction pointing at the center of the screen (when the specified position coincides with the center of the screen). Concretely, the game apparatus 3 first determines whether or not the input device 8 is oriented such that its Z-axis direction points at the center of the screen. The determination can be made with reference to the marker coordinate point. Specifically, the game apparatus 3 calculates coordinates (a second coordinate point) indicating the specified position on the screen based on the marker coordinate point, and determines whether or not the second coordinate point (approximately) represents the center of the screen.

When the determination result indicates that the second coordinate point coincides with the center of the screen, the game apparatus 3 determines a correction amount (offset) for correcting the first coordinate point. The offset is determined such that the position of the screen coordinate point corresponding to the first coordinate point calculated (by the first method) at the time the second coordinate point coincides with the center of the screen is the same as the position of the second coordinate point. Specifically, the offset is determined as a correction amount that allows the first coordinate point at that time to take the value (0,0) of the origin. Note that determining the offset means dislocating the X'Y'-coordinate system within the plane Q. In the example of FIG. 32, the input device 8 points upward relative to the horizontal direction, and therefore the X'Y'-coordinate system is moved upward from the position where projection point T coincides with the origin (the position indicated by the dotted line in FIG. 32; see the lower center column of FIG. 32). In this manner, the first coordinate point takes the value of the origin, so that the position U on the screen that corresponds to the first coordinate point coincides with the center of the screen (see the upper right column of FIG. 32). Accordingly, the specified position of the input device 8 (the position of the second coordinate point) matches the calculated position at the center of the screen. In this manner, the second method makes it possible to prevent the deviation between the position at which the user points using the input device 8 and the calculated position, thereby preventing the user from perceiving the operation to be unnatural.

Also, in the present embodiment, the game apparatus 3 corrects the first coordinate point only for the Y'-component in the X'Y'-coordinate system. That is, the first coordinate point (and the screen coordinate point) is corrected only in the vertical direction of the screen, and is not corrected in the horizontal direction. In the present embodiment, the height (the position in the vertical direction) of the input device 8 relative to the screen cannot be recognized based on the orientation of the input device 8, while the position in the horizontal direction of the input device 8 relative to the screen can be recognized simply based on the orientation of the input device 8, and no "deviation" as described in conjunction with FIG. 32 occurs in the horizontal direction. However, in another embodiment, the first coordinate point may be corrected for the horizontal direction as well as the vertical direction.

Figure 33:
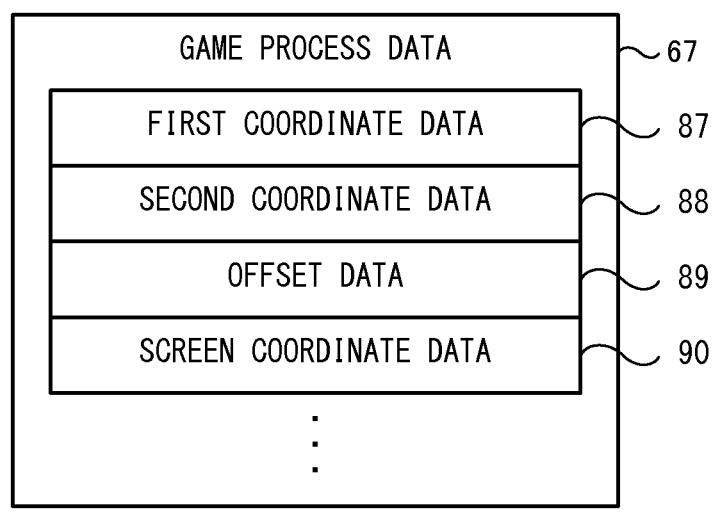
FIG. 33 is a diagram illustrating main data to be stored to the main memory of the game apparatus employing the second method.

Next, referring to FIGS. 33 to 37, a description will be given regarding a detailed process to be performed by the game apparatus 3 employing the second method. FIG. 33 is a diagram illustrating main data to be stored to the main memory of the game apparatus 3 employing the second method. Note that in FIG. 33, the same types of data as in FIG. 13 are denoted by the same reference characters as in FIG. 13, and any detailed descriptions thereof will be omitted.

As shown in FIG. 33, in the case of the second method, in addition to the data shown in FIG. 13, the main memory has stored therein first coordinate data 87, second coordinate data 88, offset data 89, and screen coordinate data 90.

The first coordinate data 87 represents the first coordinate point calculated based on the orientation of the input device 8. Specifically, the first coordinate data 87 indicates coordinates of the position in the plane Q within the virtual space.

The second coordinate data 88 indicates coordinates (second coordinate point) representing the position on the screen calculated based on the marker coordinate point. The second coordinate point represents the position on the screen at which the Z-axis direction of the input device 8 points. The second coordinate point ideally represents an intersectional position between an extended line of the Z-axis of the input device 8 and the screen but may approximately represent the intersectional position.

The offset data 79 indicates an offset for correcting the first coordinate point. In the present embodiment, the first coordinate point corrected in accordance with the offset corresponds to a coordinate point obtained by moving the first coordinate point calculated by the first method in accordance with that offset.

The screen coordinate data 90 indicates coordinates (screen coordinate point) representing the position on the screen calculated based on the first coordinate point. In the second method, the screen coordinate point is calculated based on the first coordinate point corrected in accordance with the offset.

Figure 34:
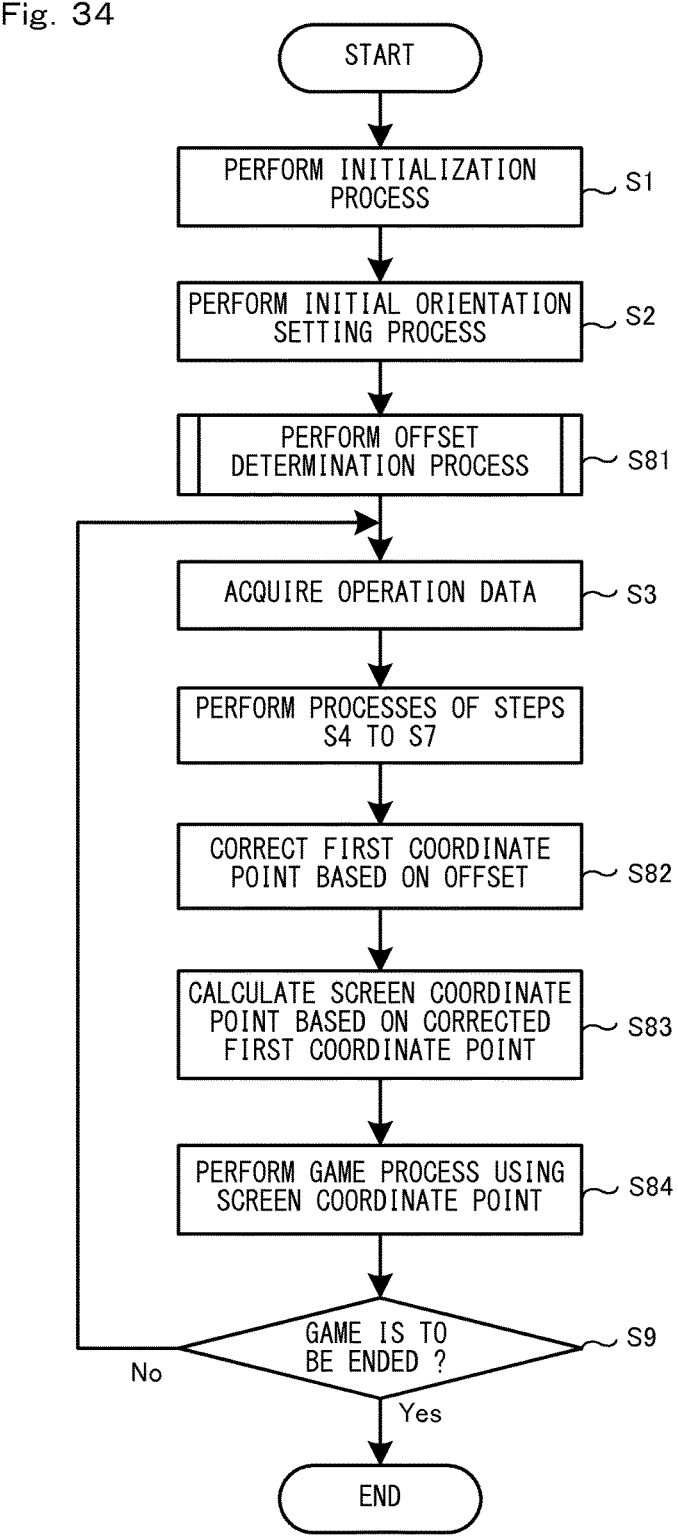
FIG. 34 is a main flow chart showing a flow of a process performed by the game apparatus employing the second method.

FIG. 34 is a main flow chart showing a flow of a process performed by the game apparatus 3 employing the second method. Note that in FIG. 34, the same process steps as in FIG. 14 will be denoted by the same step numbers as in FIG. 14, and any detailed descriptions thereof will be omitted.

In the case where the second method is employed, an initial orientation setting process is performed in step S2, and then the process of step S81 is executed. In step S81, the CPU 10 executes an offset determination process. The offset determination process is a process for determining an offset for correcting the first coordinate point. The offset determination process will be described in detail below with reference to FIG. 35.

Figure 35:
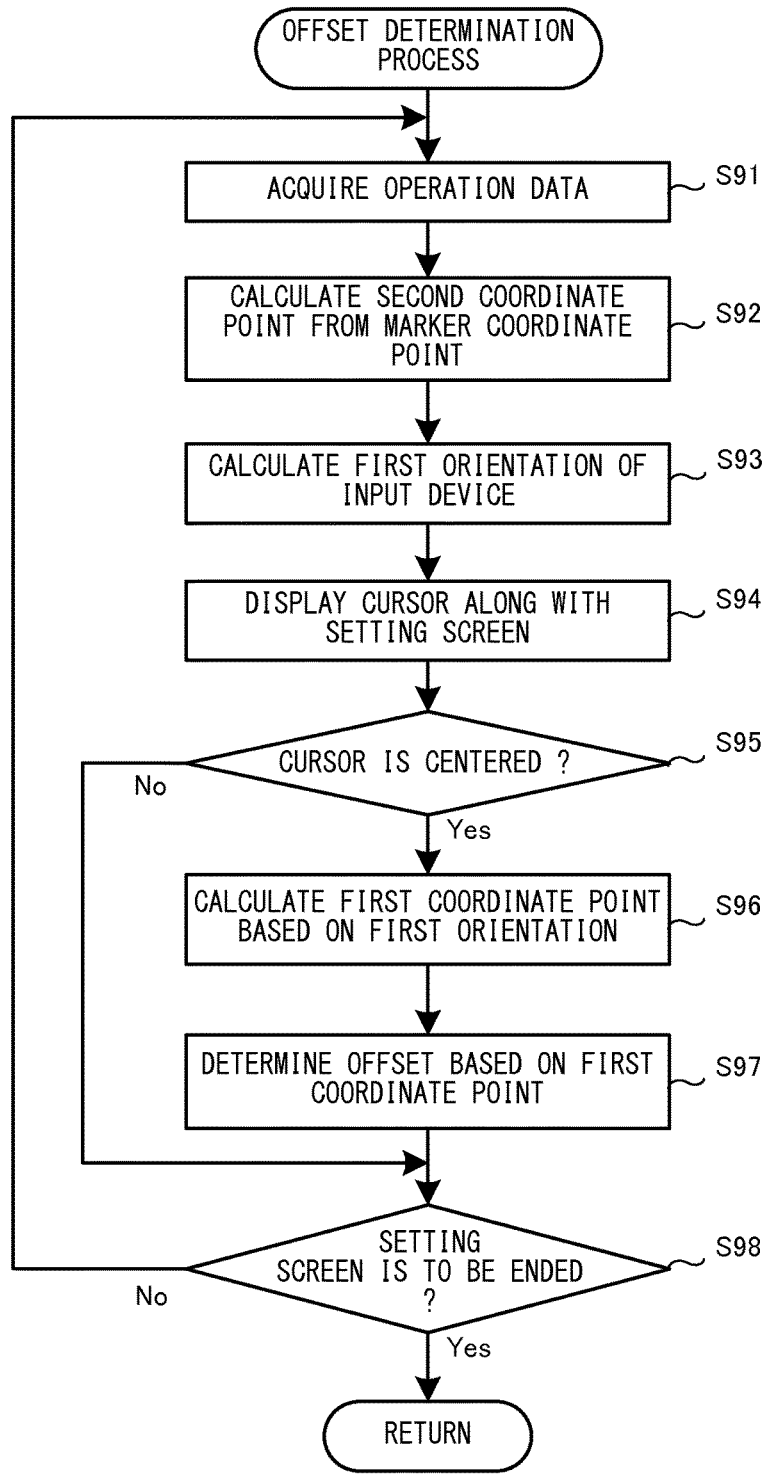
FIG. 35 is a flow chart showing a flow of an offset determination process (step S41) shown in FIG. 34.

FIG. 35 is a flow chart showing a flow of the offset determination process (step S81) shown in FIG. 34. In the offset determination process, initially, the CPU 10 acquires operation data in step S91. The process of step S91 is the same as the process of step S3. Following step S91, the process of step S92 is performed.

In step S92, the CPU 10 calculates the second coordinate point representing the specified position of the input device 8. The second coordinate point is calculated based on the marker coordinate point acquired in step S91. Specifically, the CPU 10 reads the marker coordinate point data 65 from the main memory, and calculates the second coordinate point based on the marker coordinate point. Any method may be employed for calculating the second coordinate point from the marker coordinate point. For example, coordinates (px, py) to be calculated in step S33 are calculated from the marker coordinate point, so that the second coordinate point can be calculated based on the coordinates (px,py). Concretely, the specified position in the horizontal direction of the screen can be obtained by inverting the sign of the x-component of the coordinates (px,py) and scaling the component at a predetermined rate (e.g., at such a rate as to allow the length of the x-axis direction of a pickup image to match the length of the horizontal direction of the screen of the television 2). Also, the specified position in the vertical direction of the screen can be obtained by inverting the sign of the y-component of the coordinates (px,py) and scaling the component at a predetermined rate (e.g., at such a rate as to allow the length of the y-axis direction of the pickup image to match the length of the vertical direction of the screen of the television 2). Note that as for the vertical direction, it is preferable that the offset be suitably set depending on whether the marker portion 6 is provided in the upper or lower section of the television 2. Note that the CPU 10 stores data indicating the calculated second coordinate point into the main memory as the second coordinate data 88. Following the process of step S92, the process of step S93 is performed.

In step S93, the CPU 10 calculates the first orientation of the input device 8. The process of step S93 is similar to the processes of steps S4 to S6. Note that in the present embodiment, the process for calculating the first orientation is performed per frame (per process loop of steps S91 to S98), but the process may be performed only when the determination result of step S94 is affirmative. Following step S93, the process of step S94 is performed.

Figure 36:
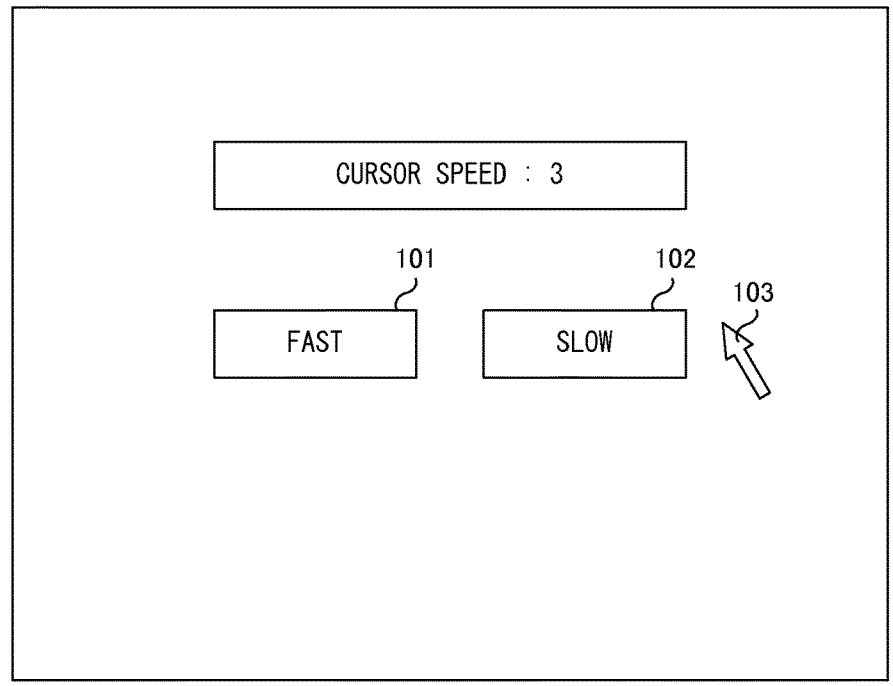
FIG. 36 is a diagram illustrating an exemplary setting screen.

In step S94, the CPU 10 causes a predetermined setting screen and a cursor to be displayed on the television 2. The setting screen is a screen including button images for the user to give predetermined instructions. FIG. 36 is a diagram illustrating an exemplary setting screen. In FIG. 36, the predetermined instructions are instructions to adjust the speed (sensitivity) of the cursor, and button images 101 and 102 are shown for respective instructions to increase and decrease the speed of the cursor. Note that the cursor to be adjusted here is not a currently displayed cursor 103 but a cursor to be used in subsequent game operations, and the position of the cursor is determined based on the first coordinate point (screen coordinate point). Also, the predetermined instructions may consist of any instructions, including instructions for other cursor adjustments (e.g., adjustments on the cursor's capability of following the operation of the input device 8, adjustments on set play in the cursor, and adjustments on hand jiggle prevention functions), instructions to end setting operations on the setting screen, and instructions to start the game.

Also, the cursor 103 is displayed on the television 2, along with the setting screen. Specifically, the CPU 10 reads the second coordinate data 88 from the main memory, and causes the cursor 103 to be displayed in a position indicated by the second coordinate point data 78. In this manner, the position of the cursor 103 displayed in step S94 is calculated based on the marker coordinate point, and the cursor 103 is controlled by a method based on the marker coordinate point. Although not shown in FIG. 35, when the button image 101 or 102 is specified (when a predetermined button on the input device 8 is pressed with the cursor 103 pointing at the button image), the CPU 10 performs an adjustment process in accordance with the specified button image. Following step S94, the process of step S95 is performed.

Returning to the description of FIG. 35, in step S95, the CPU 10 determines whether or not the cursor 103 is positioned at the center of the screen in the vertical direction. The determination can be made based on the second coordinate point. Concretely, the CPU 10 reads the second coordinate data 88 from the main memory, and determines whether or not the position indicated by the second coordinate data 88 is within the area where the button image 101 or 102 is displayed. That is, the CPU 10 determines whether the cursor 103 is positioned within the area where the button image 101 or 102 is displayed. When the determination result of step S95 is affirmative, the process of step S96 is performed. On the other hand, when the determination of step S95 is negative, the processes of steps S96 and S97 are skipped, and the process of step S98 to be described later is performed.

Note that in step S95, the determination is not made as to whether or not the second coordinate point (cursor 103) is positioned at the exact center of the screen, but as to whether the second coordinate point is positioned at the approximate center (within the area where the button image is displayed). The reason for this is that exemplary embodiments of the present invention aim to prevent the user from perceiving the operation to be unnatural, and therefore it is not necessary to cause the specified position of the input device to strictly match the position of the screen coordinate point. Also, if the determination in step S95 is made as to whether the second coordinate point is positioned at the exact center of the screen, the possibility that the determination result of step S95 is affirmative diminishes, so that the offset might not be determined.

In step S96, the CPU 10 calculates the first coordinate point based on the first orientation. The calculation process of step S96 is similar to that of step S7. That is, the CPU 10 calculates the first coordinate point based on the first orientation calculated in step S93 in accordance with the first method. The calculated first coordinate point is stored to the main memory 32 as the first coordinate data 87. Following step S96, the process of step S97 is performed.

Figure 37:
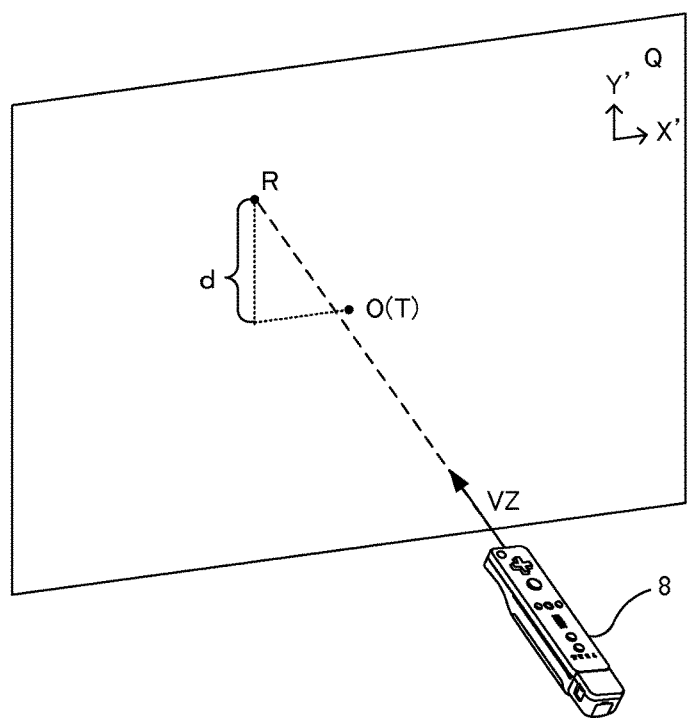
FIG. 37 is a diagram illustrating a method for determining an offset.

In step S97, the CPU 10 determines an offset based on the first coordinate point calculated in step S96. FIG. 37 is a diagram illustrating the method for determining the offset. Note that FIG. 37 shows the orientation of the input device 8 when the specified position of the input device 8 is at the center of the screen in the vertical direction (when the determination result of step S95 is Yes). Also, the origin O is of the X'Y'-coordinate system for the first method, and corresponds to the position of the projection point T. Also, the point R indicates the position of the first coordinate point calculated in step S96.

The offset is determined such that the Y'-component of the first coordinate point at the time matches the value (0) of the origin. Specifically, as for the vertical direction, the position R of the first coordinate point is determined so as to correspond to the position of the origin. Accordingly, the offset is determined to be "−d" which is obtained by inverting the sign of the value "d" of the Y'-component of the first coordinate point (see FIG. 37). The CPU 10 reads the first coordinate data 87 from the main memory, and determines the offset as the value obtained by inverting the sign of the Y'-component of the first coordinate point indicated by the first coordinate data 87. Data indicating the determined offset is stored to the main memory as the offset data 89. Note that in the process to be described later for correcting the first coordinate point (step S82), the first coordinate point calculated by the first method is corrected to have coordinates obtained through movement by the offset. Accordingly, it can be said that the process of step S97 for calculating the offset is a process for dislocating the X'Y'-coordinate system by the offset (to the direction in which the sign of the offset is inverted). Following step S97, step S98 is performed.

In step S98, the CPU 10 determines whether or not to end the setting screen. The determination of step S98 is made, for example, based on whether or not the user instructed to end the setting screen. When the determination result of step S98 is negative, the process of step S91 is performed again. Thereafter, the processes of steps S91 to S98 will be repeated until the determination result of step S98 is affirmative. On the other hand, when the determination result of step S98 is affirmative, the CPU 10 ends the offset determination process.

As described above, in the offset determination process, the offset is determined such that the Y'-component of the first coordinate point calculated when the input device 8 points at the center of the screen (in the vertical direction) corresponds to the value (0) of the origin. Here, determining the offset in the offset determination process requires the input device 8 to point at the center of the screen (in the vertical direction). In the present embodiment, to cause such a situation to occur, the button images 101 and 102 for predetermined instructions are displayed at the center of the screen (in the vertical direction) (FIG. 36). As a result, in order to make a predetermined instruction, the user naturally operates the input device 8 to cause such a situation, and therefore the user can naturally perform the operation of determining the offset unconsciously. Note that the predetermined instruction can be any instruction, but it is preferable that the predetermined instruction be an instruction that is always given once by the user (e.g., an instruction to end the setting screen or to start the game) in order to ensure that the process for determining the offset is performed. Also, as in the present embodiment, it is conceivable that an instruction to adjust the cursor is made as the predetermined instruction, thereby determining the offset simultaneously with the adjustment of the cursor. As a result, the offset can be determined without causing the user to feel "as though performing an extra operation (to determine the offset)".

Returning to the description of FIG. 34, the process of step S3 is performed in the same manner as in the above embodiment, following the offset determination process of step S81. Furthermore, following step S3, the processes of steps S4 to S7 are performed in the same manner as in the above embodiment. Note that the process of step S7 is a process for calculating the first coordinate point by the first method. In the second method, the process of step S82 is performed following the process of step S7.

In step S82, the CPU 10 corrects the first coordinate point calculated in step S7 in accordance with the offset. Specifically, the CPU 10 reads the first coordinate data 87 and the offset data 78 from the main memory, and corrects the first coordinate point to be a value obtained by adding the offset "D" to the Y'-component. Data indicating the corrected first coordinate point is stored to the main memory as new first coordinate data 87.

Note that in the present embodiment, the process for calculating the first coordinate point by the first method (step S7) has been described as being independent of the process for correcting the first coordinate point (step S82), but the CPU 10 may perform these two processes in a batch manner. That is, in step S7, the CPU 10 may calculate the first coordinate point in accordance with equation (23) below, rather than equation (15) as mentioned earlier.

$$Wy = L \times Zy/Zz + D \quad (23)$$

In equation (23), variable D denotes an offset the value of which is "−d" obtained by inverting the sign of the Y'-component (d) of the first coordinate point calculated in step S96. When equation (23) is used, the first coordinate point can be calculated simultaneously with the correction process.

Following step S82, the processes of steps S83 and S84 are performed. The processes of steps S83 and S84 as a whole are the same as the process of step S8, but in FIG. 34, the process of step S8 is divided into two steps S83 and S84, which will be described individually.

In step S83, the CPU 10 calculates coordinates (screen coordinate point) representing a position on the screen of the television 2. The screen coordinate point is calculated based on the first coordinate point corrected in step S82. Specifically, the CPU 10 reads the first coordinate data 87 from the main memory, and calculates the screen coordinate point based on the first coordinate point indicated by the first coordinate data 87. The screen coordinate point is calculated to be at the center of the screen when the first coordinate point takes the value (0,0) of the origin. Also, the screen coordinate point is calculated such that the direction from the center of the screen to the screen coordinate point matches the direction from the origin to the first coordinate point, and the length between the center of the screen and the screen coordinate point matches the length between the origin and the first coordinate point. Accordingly, when the Z-axis of the input device 8 is directed to the center of the screen, the screen coordinate point represents the center of the screen (i.e., the screen coordinate point matches the specified position), and the screen coordinate point in that state is moved in a direction in accordance with a change of direction of the Z-axis of the input device 8. Data indicating the screen coordinate point thus calculated is stored to the main memory as the screen coordinate data 90. Following step S83, the process of step S84 is performed.

In step S84, the CPU 10 performs a game process using the screen coordinate point calculated in step S83. The game process in step S84 may be any process so long as the process is based on the screen coordinate point. For example, the process may cause a cursor or a game object to be displayed in the position of the screen coordinate point or may move an object in accordance with the positional relationship between the object and the screen coordinate point. Alternatively, the game process in step S84 may be the display control process of step S8. In this case, in the display control process, the display range may be controlled based on the first coordinate point (virtual plane coordinate point) corrected in step S82. Specifically, in the processes of steps S41 and S42, the direction and the position of the virtual camera may be controlled based on the first coordinate point corrected in step S82. Also, in step S43, the position of the screen coordinate point calculated in step S83 is set as a cursor position. Note that in the case where the first method is employed, when a certain image is displayed at the screen coordinate point, it is highly probable that the user would perceive the operation to be unnatural as described above because the user can visually recognize the position of the screen coordinate point. Accordingly, in such a case, the second method is particularly effective. Following step S84, the process of step S9 is performed in the same manner as in the above embodiment. This is the end of the description about the second method.

As described above, in the second method, when displaying the setting screen, the game apparatus 3 detects the state of the input device 8 pointing at the center of the screen in the vertical direction (step 54), and determines an offset based on the first coordinate point for that state (step S97). Then, in the subsequent game process, the first coordinate point calculated by the first method is corrected in accordance with the offset (step S82). Accordingly, when the input device 8 points at the center of the screen in the vertical direction, the Y'-component of the first coordinate point is 0, so that the screen coordinate point represents the center position of the screen in the vertical direction. Accordingly, in the case of the second method, when the user points at the center of the screen with the input device 8, the screen coordinate point represents the center of the screen, and therefore the screen coordinate point can be appropriately calculated without causing the user to perceive the operation to be unnatural.

Note that in the above embodiment, when the specified position is at the center of the screen, the position of the screen coordinate point matches the specified position. On the other hand, when the specified position matches another position, the position of the screen coordinate point does not necessarily match the specified position depending on the length L or suchlike. The reason for this is that when the position of the screen coordinate point matches the specified position at the center of the screen, the user conceivably perceives the operation to be only slightly unnatural, and therefore there is almost no disadvantage in that the screen coordinate point does not match the specified position but another position as described above. Also, conceivably, there is an advantage that surpasses the aforementioned disadvantage, in that the screen coordinate point is determined in accordance with the orientation of the input device 8 (an advantage of suitably setting the degree of change of the screen coordinate point relative to change of the orientation).

Note that when the orientation of the input device 8 pointing at the center of the screen is set as a reference orientation, the process for determining the origin at that time, namely, the process of step S97 for determining the orientation of the input device 8 where the first coordinate point takes the origin, can be said to be "a process for determining the reference orientation". Also, the direction from the origin to the corrected first coordinate point corresponds to the direction of the change from the reference orientation to the current orientation (rotational direction), and the distance from the origin to the corrected first coordinate point corresponds to the amount of change (amount of rotation) from the reference orientation to the current orientation. Accordingly, the processes for calculating the corrected first coordinate point (steps S7 and S742) can be said to be "processes for calculating the first coordinate point in accordance with the direction and the amount of the change from the reference orientation to the current orientation". Thus, the second method includes the processes to be performed for: (a) determining the reference orientation for the time at which the input device 8 points at the center of the screen; and (b) calculating the first coordinate point in accordance with the direction and the change from the reference orientation to the current orientation (and further calculating the screen coordinate point). Accordingly, through processes (a) and (b), the second method makes it possible to calculate the screen coordinate point that always takes a specific value (in the present embodiment, the value for the center of the screen) for the reference orientation, thereby preventing the user from perceiving the operation to be unnatural.

[Variants]

(Variant on the Second Method)

In the above embodiment, the processes (steps S2 and S3) prior to the start of the game use a cursor (second cursor) displayed in the position of the second coordinate point based on the marker coordinate point, rather than a cursor (first cursor) associated with the orientation of the input device 8. In this manner, the game apparatus 3 may use two types of cursors different in calculation method. Note that if the two types of cursors do not match in any position on the screen (the state of the input device 8 varies even when the two types of cursors do not match in position), the user might feel a complete change of cursor operation methods at the time of switching from one cursor to the other, and therefore the user might perceive the operation to be unnatural and user-unfriendly. On the other hand, in the above embodiment, the two types of cursors match at the center of the screen (the cursors match in the state of the input device 8 when they are positioned at the center of the screen). Thus, there is little chance of the user's perceiving the operation to be unnatural at the time of switching between the two types of cursors, and therefore it is possible to prevent the user from being confused about cursor operations.

Also, in the above embodiment, since the offset for the first cursor is determined when the user performs an operation using the second cursor, the behavior of the second cursor being displayed does not change in accordance with the determination of the offset. Thus, the game apparatus 3 makes it possible to determine the offset without causing the user to perceive the operation to be unnatural due to a sudden change in behavior of the cursor.

Note that in another embodiment, the game apparatus 3 does not necessarily require the use of the second cursor for determining the offset. For example, the game apparatus 3 may display the message "press the A button with the controller pointing at the center of the screen" (but does not display the cursor), and perform the processes of steps S96 and S97 when the A button is pressed. Even in this case, the screen coordinate point is positioned at the center of the screen while causing the user to feel that "the input device 8 is pointing at the center of the screen", and therefore it is possible to allow the user to perceive the operation to be less unnatural as in the aforementioned embodiment. Also, the game apparatus 3 does not have to display the screen prompting offset determination, and the offset may be determined, for example, when a game image is being displayed.

Also, in the above embodiment, the game apparatus 3 performs the process for determining the offset (step S97) prior to the process using the screen coordinate point as an input (step S84). Here, in another embodiment, when the process using the screen coordinate point as an input is repeatedly performed, the process for determining the offset (again) may be performed while the process is being repeatedly performed. Taking the above embodiment as an example, the process for determining the offset may be performed while the process loop of steps S3 to S9 is being repeatedly performed during the game. For example, the game apparatus 3 may perform the process for determining the offset at the time the setting screen is displayed during the game or may perform the process at predetermined time intervals or at the time the user gives an instruction to perform the process. In this manner, by redetermining the offset during the game, the offset can be redetermined appropriately even when the state of the user holding the input device changes during the game (e.g., when the user playing the game while standing sits down during the game). Note that when the process of redetermining the offset is performed, the change of the offset might cause the screen coordinate point to change in a manner not intended by the user, thereby causing the user to perform game operations unsuccessfully. Therefore, it is preferable that the game apparatus 3 perform the process for redetermining the offset as little as possible while the process using the screen coordinate point as an input is being performed (e.g., while the cursor is being used for a game operation). Also, when performing the redetermination process, it is preferable that it be performed where changing the screen coordinate point has little impact (e.g., during a pause in the game or when the menu screen is being displayed).

In the above embodiment, the game apparatus 3 calculates the first coordinate point from the orientation of the input device 8 using the plane Q being set within the virtual space, and also calculates the screen coordinate point from the first coordinate point. Here, the method for calculating the screen coordinate point from the orientation of the input device 8 may be any method so long as the position of the screen coordinate point changes in accordance with the orientation of the input device 8. For example, the game apparatus 3 may directly calculate the screen coordinate point from the orientation of the input device 8 without calculating the first coordinate point (i.e., the first coordinate point may be a coordinate point representing the position on the screen). Concretely, the game apparatus 3 may set the screen coordinate point so as to be positioned at the center of the screen when the input device 8 takes a predetermined reference orientation, and may also calculate the screen coordinate point so as to represent a position away (from the screen coordinate point positioned at the center) at a distance relative to an angle of rotation from a reference orientation in a rotational direction from the reference orientation. Also, for example, the game apparatus 3 may set the X'- and Y'-coordinates so as to conform with the coordinate system for the screen coordinate point, and directly calculate the screen coordinate point from the orientation of the input device 8.

Also, in the above embodiment, the game apparatus 3 uses the offset to correct the first coordinate point, thereby indirectly correcting the screen coordinate point, but in another embodiment, the screen coordinate point may be directly corrected. Concretely, the game apparatus 3 further calculates the screen coordinate point from the first coordinate point in step S96, and an offset for the screen coordinate point may be calculated in step S97. In this case, in steps S82 and S83, the game apparatus 3 may calculate the screen coordinate point from the first coordinate point calculated by the first method, and correct the calculated screen coordinate point in accordance with the offset, thereby obtaining a final screen coordinate point.

Figure 38:
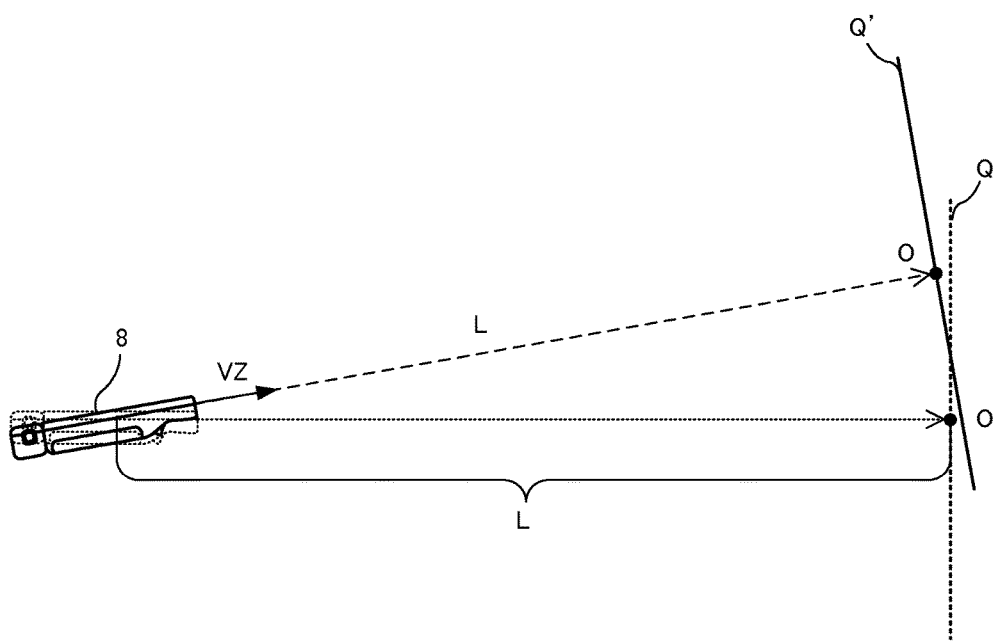
FIG. 38 is a diagram illustrating a variant on correction by the second method.

Also, in the above embodiment, the game apparatus 3 corrects the first coordinate point by setting an offset for the first coordinate point, i.e., by displacing the X'Y'-coordinate system within the plane Q (FIGS. 32 and 37). Here, in another embodiment, the first coordinate point may be corrected by rotating the X'Y'-coordinate system about the position of the input device 8 in the virtual space. FIG. 38 is a diagram illustrating a variant on correction by the second method. FIG. 38 shows a side view of the plane Q in the virtual space, in which the dotted line indicates the plane Q to be used in the first method, and the solid line indicates plane Q' after correction. In the variant illustrated in FIG. 38, the CPU 10 performs the following process, in place of the processes of steps S96 and S97 shown in FIG. 35. Specifically, the CPU 10 sets the X'Y'-coordinate system for post-correction based on the orientation of the input device 8 (first orientation M1). The X'Y'-coordinate system is set in the plane Q' vertical to the Z-axis vector VZ for the input device 8, with its origin in a position at a distance of length L in the direction of the Z-axis vector VZ. Also, during the game, the CPU 10 calculates the first coordinate point represented by the X'Y'-coordinate system in the plane Q', instead of performing steps S7 and S82 shown in FIG. 34. In the variant, since the distance from the position of the input device 8 in the virtual space is kept constant, the first coordinate point (screen coordinate point) can be calculated more accurately. For example, in the case where the screen of the television 2 is actually installed to tilt relative to the vertical direction (e.g., in the case where the television 2 is installed on the ceiling with the screen facing downward from the horizontal direction), the screen coordinate point can be calculated more accurately. On the other hand, in the correction method of the above embodiment, the X'Y'-coordinate system is set within a plane fixed with respect to the position of the input device 8, and therefore calculations for correction can be simplified. Accordingly, in the situation where the screen of the television 2 is assumed to be installed not to significantly tilt relative to the vertical direction or in the case where reduction in processing load on the CPU 10 takes precedence, the correction method of the embodiment is preferably taken.

(Variant on Image Pickup Means)

In the above embodiment, to detect that the input device 8 is directed to the center of the screen, the game apparatus 3 uses an image (marker coordinate point) taken by the image pickup means provided in the input device 8. Here, the game apparatus 3 may perform the detection based on other information in place of the pickup image, so long as it is possible to know the direction of the input device 8 viewed from a predetermined position in the space. For example, in the case where a camera is installed around the television 2, the game apparatus 3 may perform the detection based on an image of the input device 8 taken by the camera. Also, any method can be employed to perform the detection, and for example, a device for generating a signal, such as radio wave or ultrasonic wave, may be installed around the input device 8, so that based on the signal detected by the input device 8, the game apparatus 3 can detect the direction of the input device 8 viewed from a predetermined position in the space.

(Variant on Calculation of the Orientation of the Input Device 8)

Note that in the above embodiment, the game apparatus 3 calculates the orientation of the input device 8 based on detection results by the gyroscopes 55 and 56, the acceleration sensor 37, and the image pickup element 40 (steps S3 to S6). Here, any method can be employed to calculate the orientation of the input device 8. For example, the orientation of the input device 8 may be calculated based on only the detection results by the gyroscopes or the detection result by the acceleration sensor.

While the above embodiment has been described with respect to an example where the gyroscopes for detecting angular rates about three axes are used for calculating a three-dimensional orientation, the present invention is also applicable to the case where a two-dimensional orientation is calculated. For example, assuming that no rotation is made in the roll direction, a two-dimensional orientation associated with rotations in the pitch and yaw directions may be calculated by a two-axis gyroscope detecting angular rates about two axes. Furthermore, the screen coordinate point may be calculated from the two-dimensional orientation.

Further, in another embodiment, the second correction process may be performed only when it is assumed that the input device 8 has taken an image of the marker section 6. Specifically, the CPU 10 determines whether or not the input device 8 (the image pickup means) is oriented to a direction in which an image of the marker section 6 can be taken, before the second correction process is performed. This determination can be performed using the first orientation or the second orientation. For example, it may be determined whether the imaging direction of the input device 8 in the first (or second) orientation is the same as or opposite to the direction from the input device 8 to the marker section 6. Further, the first orientation used for the determination may be the first orientation having been subjected to the first and the second correction processes in the immediately preceding process loop or may be the first orientation having been calculated and subjected to the first correction process in the current process loop.

When the CPU 10 determines that the input device 8 is oriented to the direction in which an image of the marker section 6 can be taken, the second correction process is performed, and when the CPU 10 determines that the input device 8 is not oriented to the direction in which an image of the marker section 6 can be taken, the second correction process is skipped. Some entity other than the marker section 6 (for example, electric light in a room, or sunlight outside a window) may be erroneously detected as the marker section 6, and when the third orientation is calculated using a marker coordinate point obtained through such erroneous detection, and the second correction process is performed using such a third orientation, the correction cannot be accurately made. On the other hand, when the determination process as described above is performed, it is possible to prevent the second correction process from being performed using the third orientation calculated from the marker coordinate point having been erroneously detected. Therefore, the second correction process can be performed with enhanced accuracy.

As described above, exemplary embodiments of the present invention are intended to, for example, control a display range to be displayed on a display device using an output from a gyroscope, and can be used as, for example, an information processing apparatus for displaying a Web page or an electronic program guide on the display device or a game apparatus for displaying a game image on the display device.

While the invention has been described in detail, the foregoing description is in all aspects illustrative and not restrictive. It is understood that numerous other modifications and variations can be devised without departing from the scope of the invention.

What is claimed is:

1. A coordinate calculation apparatus having a processor for calculating a coordinate point, representing a position on a display screen, based on an orientation of an input device, the processor performing:
    calculating the orientation of the input device in a predetermined space; and
    calculating a first coordinate point representing a position on the display screen at a point in time, wherein the first coordinate point takes a predetermined reference value when the input device takes a reference orientation, and the first coordinate point is calculated in accordance with a direction and an amount of change from the reference orientation to the orientation of the input device calculated at the point in time, the first coordinate point being calculated based on the orientation of the input device calculated at the point in time and the reference value, the reference orientation being an orientation of the input device calculated at a point in time when the predetermined condition is satisfied, wherein, the first coordinate point is a coordinate point representing an intersectional position between a line extending from a predetermined reference point toward a direction of a vector indicating the orientation of the input device and a predetermined plane, the processor sets a coordinate system within the predetermined plane such that the first coordinate point takes the reference value in the case of the reference orientation, the first coordinate point is represented by the set coordinate system, and the processor calculates the position on the display screen based on the calculated first coordinate point.

2. The coordinate calculation apparatus according to claim 1, wherein, the processor repeatedly calculates the first coordinate point based on the orientation of the input device, the processor stores, as information representing the reference orientation, reference information representing the first coordinate point calculated based on the orientation of the input device calculated at a point in time when the predetermined condition is satisfied, and when the first coordinate point is calculated based on the orientation of the input device, the processor corrects the calculated first coordinate point such that the first coordinate point represented by the reference information takes a predetermined reference value.

3. The coordinate calculation apparatus according to claim 1, wherein, the processor obtains a direction of the input device as viewed from a predetermined position in the predetermined space, and calculates a second coordinate point on the display screen based on the direction of the input device, the reference orientation is determined such that a position on the display screen that corresponds to the reference value matches a position represented by the second coordinate point calculated at a point in time when the predetermined condition is satisfied.

4. The coordinate calculation apparatus according to claim 3, wherein the processor determines a correction amount in accordance with a difference between a position determined by the first coordinate point calculated at a point in time when the predetermined condition is satisfied and a position represented by the second coordinate point calculated at the point in time, and the processor corrects the first coordinate point in accordance with the correction amount.

5. The coordinate calculation apparatus according to claim 4, wherein, the processor performs predetermined information processing in which the position on the display screen is used as an input, the processor determines the correction amount prior to the predetermined information processing in response to satisfaction of the predetermined condition, the processor calculates the first coordinate point while the predetermined information processing is being repeatedly performed, and the processor corrects the first coordinate point in accordance with the correction amount each time the first coordinate point is calculated.

6. The coordinate calculation apparatus according to claim 4, wherein, the processor displays a predetermined instruction image in a position represented by the second coordinate point on the display screen, and when the instruction image is placed within a predetermined range on the screen, the processor determines the correction amount based on the first coordinate point calculated at the time of placement of the instruction image within the predetermined range and the second coordinate point corresponding to a predetermined position within the predetermined range.

7. The coordinate calculation apparatus according to claim 6, wherein, the processor displays a button image within the predetermined range on the screen allowing the user to give a predetermined instruction, and the processor performs a process for determining the correction amount only when the button image is displayed.

8. The coordinate calculation apparatus according to claim 3, wherein, the input device includes an image pickup device, and the processor acquires, as the information representing the direction of the input device, information representing a position of a predetermined imaging target within an image taken by the image pickup device.

9. The coordinate calculation apparatus according to claim 1, wherein, the first coordinate point is a two-dimensional coordinate point, and the processor corrects the first coordinate point only for one component.

10. The coordinate calculation apparatus according to claim 1, wherein, the input device includes an acceleration sensor and/or an angular rate sensor, and the processor calculates the orientation of the input device based on a detection result or results by the acceleration sensor and/or the angular rate sensor.

11. The coordinate calculation apparatus according to claim 10, wherein, the processor calculates the orientation of the input device based on an angular rate detected by the angular rate sensor, and corrects the orientation based on an acceleration rate detected by the acceleration sensor.

12. The coordinate calculation apparatus according to claim 10, wherein, the input device includes an image pickup device, and the processor calculates the orientation of the input device based on an angular rate detected by the angular rate sensor, and corrects the orientation at least for a rotation about a gravitational direction based on a position of a predetermined imaging target within an image taken by the image pickup device.

13. The coordinate calculation apparatus according to claim 1, wherein the processor sets the predetermined plane within a plane set to be fixed with respect to the reference point.

14. The coordinate calculation apparatus according to claim 1, wherein the processor sets the predetermined plane to be maintained at a constant distance from the reference point.

15. A coordinate calculation apparatus having a processor for calculating a coordinate point, representing a position on a display screen, based on an orientation of an input device, the input device including a sensor for outputting a value according to a change of orientation, wherein the processor:
sets an initial orientation of the input device by using an output value of the sensor in response to a user performing a predetermined operation;
calculates the orientation of the input device by using the initial orientation of the input device and the output value of the sensor after the initial orientation of the input device is set; and
calculates the coordinate point based on the orientation of the input device, wherein,
the coordinate point is a coordinate point representing an intersectional position between a line extending from a predetermined reference point toward a direction of a vector indicating the orientation of the input device and a predetermined plane,
the processor sets a coordinate system within the predetermined plane such that the coordinate point takes the reference value in the case of the reference orientation,
the coordinate point is represented by the set coordinate system, and
the processor calculates the position on the display screen based on the calculated coordinate point.

16. The coordinate calculation apparatus according to claim 15, wherein,
the processor performs a game process using the coordinate position as an input, and
the initial orientation is set before start of the game process.

17. The coordinate calculation apparatus according to claim 15, wherein,
the processor performs a game process using the coordinate position as an input, and
the initial orientation is set during the game process.

18. A non-transitory computer-readable storage medium having stored therein a coordinate calculation program to be executed by a computer in a coordinate calculation apparatus for calculating a coordinate point, representing a position on a display screen, based on an orientation of an input device, the program causing the computer to perform:
calculating an orientation of the input device in a predetermined space; and
calculating a first coordinate point for determining the position on the display screen at a point in time, wherein the first coordinate point takes a predetermined reference value when the input device takes a reference orientation, and the first coordinate point is in accordance with a direction and an amount of change from the reference orientation to the orientation of the input device calculated at the point in time, the first coordinate point being calculated based on the orientation of the input device calculated at the point in time and the reference value, the reference orientation being an orientation of the input device calculated at a point in time when a predetermined condition is satisfied, wherein,
the first coordinate point is a coordinate point representing an intersectional position between a line extending from a predetermined reference point toward a direction of a vector indicating the orientation of the input device and a predetermined plane,
the program causes the computer to perform setting a coordinate system within the predetermined plane such that the first coordinate point takes the reference value in the case of the reference orientation,
the first coordinate point is represented by the set coordinate system, and
the program causes the computer to perform calculating the position on the display screen based on the calculated first coordinate point.

19. A coordinate calculation system having at least one processor for calculating a coordinate point, representing a position on a display screen, based on an orientation of an input device, wherein the at least one processor:
calculates an orientation of the input device in a predetermined space; and
calculates a first coordinate point for determining the position on the display screen at a point in time, wherein the first coordinate point takes a predetermined reference value when the input device takes a reference orientation, and the first coordinate point is in accordance with a direction and an amount of change from the reference orientation to the orientation of the input device calculated at the point in time, the first coordinate point being calculated based on the orientation calculated at the point in time and the reference value, the reference orientation being an orientation of the input device calculated at a point in time when a predetermined condition is satisfied, and wherein,
the first coordinate point is a coordinate point representing an intersectional position between a line extending from a predetermined reference point toward a direction of a vector indicating the orientation of the input device and a predetermined plane,
the processor sets a coordinate system within the predetermined plane such that the first coordinate point takes the reference value in the case of the reference orientation,
the first coordinate point is represented by the set coordinate system, and
the processor calculates the position on the display screen based on the calculated first coordinate point.

20. A coordinate calculation method for calculating a coordinate point, representing a position on a display screen, based on an orientation of an input device, the coordinate calculation method comprising:
calculating an orientation of the input device in a predetermined space;
calculating a first coordinate point for determining the position on the display screen at a point in time, wherein the first coordinate point takes a predetermined reference value when the input device takes a reference orientation, and the first coordinate point is in accordance with a direction and an amount of change from the reference orientation to the orientation of the input device calculated at the point in time, the first coordinate point being calculated based on the orientation calculated at the point in time and the reference value, the reference orientation being an orientation of the input device calculated at a point in time when a predetermined condition is satisfied, the first coordinate point being a coordinate point representing an intersectional position between a line extending from a predetermined reference point toward a direction of a vector indicating the orientation of the input device and a predetermined plane,
setting a coordinate system within the predetermined plane such that the first coordinate point takes the reference value in the case of the reference orientation, wherein the first coordinate point is represented by the set coordinate system, and calculating the position on the display screen based on the calculated first coordinate point.

* * * * *